United States Patent
Edwin et al.

(10) Patent No.: US 12,498,575 B2
(45) Date of Patent: Dec. 16, 2025

(54) SYSTEMS AND METHODS FOR OPERATING A DISPLAY SYSTEM BASED ON USER PERCEPTIBILITY

(71) Applicant: Magic Leap, Inc., Plantation, FL (US)

(72) Inventors: Lionel Ernest Edwin, Hollywood, FL (US); Ivan Li Chuen Yeoh, Wesley Chapel, FL (US); Samuel A. Miller, Hollywood, FL (US); Edwin Joseph Selker, Palo Alto, CA (US); Adam Charles Carlson, Miami, FL (US); Bjorn Nicolaas Servatius Vlaskamp, Plantation, FL (US); Paul M. Greco, Parkland, FL (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

(21) Appl. No.: 18/395,195

(22) Filed: Dec. 22, 2023

(65) Prior Publication Data
US 2024/0126086 A1    Apr. 18, 2024

Related U.S. Application Data

(60) Division of application No. 17/376,514, filed on Jul. 15, 2021, now Pat. No. 11,892,636, which is a
(Continued)

(51) Int. Cl.
*G02B 27/01*     (2006.01)
*G06T 19/00*     (2011.01)
(Continued)

(52) U.S. Cl.
CPC ..... *G02B 27/0172* (2013.01); *G02B 27/0179* (2013.01); *G06T 19/006* (2013.01);
(Continued)

(58) Field of Classification Search
CPC ............ G02B 27/0172; G02B 27/0179; G02B 2027/011; G02B 2027/0138;
(Continued)

(56) References Cited

U.S. PATENT DOCUMENTS

| 6,850,221 B1 | 2/2005 | Tickle |
| 8,483,450 B1 | 7/2013 | Derakhshani et al. |

(Continued)

FOREIGN PATENT DOCUMENTS

| JP | 2015167712 | * | 9/2015 |
| WO | WO 2009101696 A1 | | 8/2009 |

(Continued)

OTHER PUBLICATIONS

ARToolKit: htpps://web.archive.org/web/20051013062315/http://www.hitl.washington.edu:80/artoolkit/documentation/hardware.htm, archived Oct. 13, 2005.

(Continued)

*Primary Examiner* — Phuc N Doan
(74) *Attorney, Agent, or Firm* — Seed Intellectual Property Law Group LLP

(57) ABSTRACT

Systems and methods are disclosed for operating a head-mounted display system based on user perceptibility. The display system may be an augmented reality display system configured to provide virtual content on a plurality of depth planes by presenting the content with different amounts of wavefront divergence. Some embodiments include obtaining an image captured by an imaging device of the display system. Whether a threshold measure or more of motion blur is determined to be exhibited in one or more regions of the image. Based on a determination that the threshold measure or more of motion blur is exhibited in one or more regions of the image, one or more operating parameters of the wearable display are adjusted. Example operating parameter (Continued)

adjustments comprise adjusting the depth plane on which content is presented (e.g., by switching from a first depth plane to a second depth plane), adjusting a rendering quality, and adjusting power characteristics of the system.

8 Claims, 29 Drawing Sheets

Related U.S. Application Data continuation of application No. 16/389,529, filed on Apr. 19, 2019, now Pat. No. 11,067,805.

(60) Provisional application No. 62/702,153, filed on Jul. 23, 2018, provisional application No. 62/660,180, filed on Apr. 19, 2018.

(51) Int. Cl.
*G06V 40/19* (2022.01)
*G09G 5/00* (2006.01)

(52) U.S. Cl.
CPC .............. *G06V 40/19* (2022.01); *G09G 5/003* (2013.01); *G02B 2027/011* (2013.01); *G02B 2027/0138* (2013.01); *G02B 2027/014* (2013.01); *G02B 2027/0178* (2013.01); *G02B 2027/0187* (2013.01); *G09G 2354/00* (2013.01)

(58) Field of Classification Search
CPC ...... G02B 2027/014; G02B 2027/0178; G02B 2027/0187; G06K 9/00604; G06T 19/006; G09G 5/003; G09G 2354/00; G06V 10/40; G06V 10/44; G06V 40/18; G06V 40/171; G06V 40/19; G06V 40/193; G06V 40/168; G06V 40/382
See application file for complete search history.

(56) References Cited

U.S. PATENT DOCUMENTS

| | | |
|---|---|---|
| 9,081,426 B2 | 7/2015 | Armstrong |
| 9,215,293 B2 | 12/2015 | Miller |
| 9,348,143 B2 | 5/2016 | Gao et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,671,566 B2 | 6/2017 | Abovitz et al. |
| 9,740,006 B2 | 8/2017 | Gao |
| 9,791,700 B2 | 10/2017 | Schowengerdt |
| 9,851,563 B2 | 12/2017 | Gao et al. |
| 9,857,591 B2 | 1/2018 | Welch et al. |
| 9,874,749 B2 | 1/2018 | Bradski et al. |
| 9,900,510 B1 | 2/2018 | Karafin et al. |
| 10,242,501 B1 | 3/2019 | Pusch et al. |
| 2006/0028436 A1 | 2/2006 | Armstrong |
| 2006/0147094 A1 | 7/2006 | Yoo |
| 2007/0081123 A1 | 4/2007 | Lewis |
| 2009/0327777 A1 | 12/2009 | Vasquez et al. |
| 2010/0245093 A1 | 9/2010 | Kobetski et al. |
| 2011/0150334 A1 | 6/2011 | Du et al. |
| 2012/0127062 A1 | 5/2012 | Bar-Zeev et al. |
| 2012/0162448 A1 | 6/2012 | Au et al. |
| 2012/0162549 A1 | 6/2012 | Gao et al. |
| 2013/0002813 A1 | 1/2013 | Vaught et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2013/0278631 A1 | 10/2013 | Border et al. |
| 2014/0003734 A1 | 1/2014 | Umansky et al. |
| 2014/0071539 A1 | 3/2014 | Gao |
| 2014/0177023 A1 | 6/2014 | Gao et al. |
| 2014/0192147 A1 | 7/2014 | Mack et al. |
| 2014/0218468 A1 | 8/2014 | Gao et al. |
| 2014/0267420 A1 | 9/2014 | Schowengerdt et al. |
| 2014/0306866 A1 | 10/2014 | Miller et al. |
| 2015/0016777 A1 | 1/2015 | Abovitz et al. |
| 2015/0103306 A1 | 4/2015 | Kaji et al. |
| 2015/0123820 A1 | 5/2015 | Merle et al. |
| 2015/0178939 A1 | 6/2015 | Bradski et al. |
| 2015/0205126 A1 | 7/2015 | Schowengerdt |
| 2015/0215517 A1 | 7/2015 | Kusaka |
| 2015/0222883 A1 | 8/2015 | Welch |
| 2015/0222884 A1 | 8/2015 | Cheng |
| 2015/0234254 A1 | 8/2015 | Schowengerdt |
| 2015/0268415 A1 | 9/2015 | Schowengerdt et al. |
| 2015/0294148 A1* | 10/2015 | Mohanakrishnan ........................ G06V 40/193 382/103 |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | Tekolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0070105 A1 | 3/2016 | Tannoudiji et al. |
| 2016/0077337 A1 | 3/2016 | Raffle et al. |
| 2016/0134863 A1 | 5/2016 | Horesh |
| 2016/0139402 A1 | 5/2016 | Lapstun |
| 2016/0274660 A1 | 9/2016 | Publicover et al. |
| 2017/0004648 A1 | 1/2017 | Li |
| 2017/0068119 A1 | 3/2017 | Antaki et al. |
| 2017/0108697 A1* | 4/2017 | El-Ghoroury ...... G02B 27/0081 |
| 2017/0109580 A1* | 4/2017 | Kaehler ............... G06V 40/197 |
| 2017/0148215 A1 | 5/2017 | Aksoy et al. |
| 2017/0154464 A1 | 6/2017 | Lanier et al. |
| 2017/0180705 A1 | 6/2017 | Erickson |
| 2017/0206412 A1 | 7/2017 | Kaehler |
| 2017/0214907 A1 | 7/2017 | Lapstun |
| 2017/0285344 A1 | 10/2017 | Benko et al. |
| 2018/0008141 A1 | 1/2018 | Krueger |
| 2018/0220060 A1 | 8/2018 | Kusaka |
| 2019/0005679 A1 | 1/2019 | Nie |
| 2019/0200862 A1 | 7/2019 | Krueger |

FOREIGN PATENT DOCUMENTS

| | | |
|---|---|---|
| WO | WO 2016149416 A1 | 9/2016 |
| WO | WO 2019204765 A1 | 10/2019 |

OTHER PUBLICATIONS

Azuma, "A Survey of Augmented Reality," *In Presence: Teleoperators and Virtual Environments* 6(4):355-385, http://www.cs.unc.edu/~azuma, Aug. 1997.

Azuma, "Predictive Tracking for Augmented Reality," Dissertation, TR95-007, Doctor of Philosophy, Department of Computer Science, UNC-Chapel Hill, NC, Feb. 1995. (262 pages).

Bimber et al., "Spatial Augmented Reality—Merging Real and Virtual Worlds," 2005. (393 pages).

International Preliminary Report on Patentability, dated Oct. 20, 2020, for International Application No. PCT/US2019/028376. (10 pages).

International Search Report and Written Opinion, dated Aug. 19, 2019, for International Application No. PCT/US2019/028376. (22 pages).

Invitation to Pay Additional Fees, dated Jun. 7, 2019, for International Application No. PCT/US2019/028376. (4 pages).

Jacob, "Eye Tracking in Advanced Interface Design," *Virtual Environments and Advanced Interface Design*, ed. by W Barfield and TA Furness, Oxford University Press, New York, Human-Computer Interaction Lab Naval Research Laboratory, Washington, D.C., 1995, pp. 258-288.

Juusola et al., "Microsaccadic Sampling of Moving Image Information Provides *Drosophila* Hyperacute Vision," eLife Sciences 6(e26117), Sep. 2017. (149 pages).

(56) References Cited

OTHER PUBLICATIONS

Leube et al., "Sampling Rate Influences Saccade Detection in Mobile Eye Tracking of a Reading Task," Journal of Eye Movement Research 10(3):3, Jun. 2017. (11 pages).

Lokhande et al., "Identification of Parameters and Restoration of Motion Blurred Images," Proceedings of the 2006 ACM Symposium on Applied Computing (SAC), Dijon, France, Apr. 23-27, 2006. (6 pages).

Ramakrishnan, "Detection and Estimation of Image Blur," Masters Thesis, Master of Science in Electrical Engineering, Missouri University of Science and Technology, Graduate School, Missouri, USA, Missouri S&T Library and Learning Resources, Fall 2010. (83 pages).

Rosebrock, "Blur Detection with OpenCV," Navigation, pyimagesearch, https://pyimagesearch.com/2015/09/07/blur-detection-with-opencv/, Sep. 7, 2015.

Shi et al., "Discriminative Blur Detection Features," 2014 IEEE Conference on Computer Vision and Pattern Recognition (CVPR), Columbus, OH, USA, Jun. 23-28, 2014, pp. 2965-2972.

Su et al., "Blurred Image Region Detection and Classification," Proceedings of the 19th International Conference on Multimedea (MM'11), Scottsdale, Arizona, USA, Nov. 28-Dec. 1, 2011. (4 pages).

Tanriverdi et al., "Interacting with Eye Movements in Virtual Environments," Department of Electrical Engineering and Computer Science, Tufts University, Medford, MA, *ACM CHI 2000 Human Factors in Computing Systems Conference*, The Hague, The Netherlands, Apr. 1-6, 2000, Association for Computing Machinery Press, pp. 265-272.

Translation of patent KR20160092670A, Kim et al., "Apparatus and Method for Measuring Motion Blur and Removing Motion Blur Based Gaze Tracking System," Aug. 5, 2016. (6 pages).

Yitzhaky et al., "Direct Method for Restoration of Motion-blurred Images," Journal of the Optical Society of America A 15(6): 1512-1519, Jun. 1996.

Yousaf et al., "Approach to Metric and Discrimination of Blur Based on its Invariant Features," 2013 IEEE International Conference on Imaging Systems and Techniques (IST), Beijing, China, Oct. 22-23, 2013, pp. pp. 274-279.

* cited by examiner

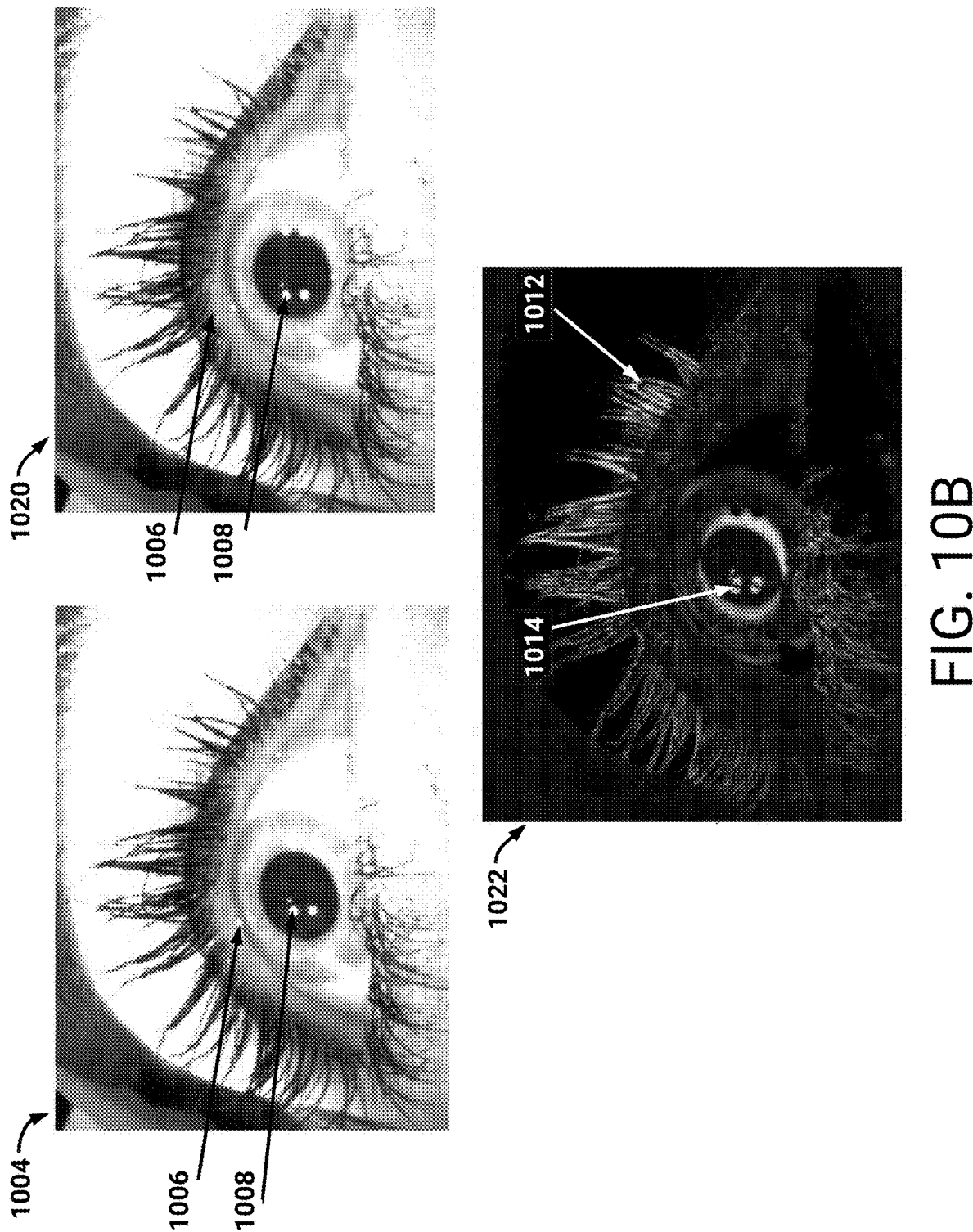

SYSTEMS AND METHODS FOR OPERATING A DISPLAY SYSTEM BASED ON USER PERCEPTIBILITY

PRIORITY CLAIM

This application is a divisional of U.S. patent application Ser. No. 17/376,514, filed Jul. 15, 2021, which is a continuation of U.S. patent application Ser. No. 16/389,529, filed Apr. 19, 2019; now U.S. Pat. No. 11,067,805, which claims priority to U.S. Patent Prov. App. 62/660,180, entitled SYSTEMS AND METHODS FOR ADJUSTING OPERATIONAL PARAMETERS OF A HEAD-MOUNTED DISPLAY SYSTEM BASED ON USER SACCADES, filed Apr. 19, 2018; and U.S. Patent Prov. App. 62/702,153, entitled SYSTEMS AND METHODS FOR DEPTH PLANE SWITCHING IN A MULTI-DEPTH PLANE DISPLAY SYSTEM, filed Jul. 23, 2018. Each of the above-noted applications is incorporated herein by reference in its entirety.

INCORPORATION BY REFERENCE

This application incorporates by reference the entirety of each of the following patent applications and publications: U.S. application Ser. No. 14/555,585 filed on Nov. 27, 2014, published on Jul. 23, 2015 as U.S. Publication No. 2015/0205126; U.S. application Ser. No. 14/690,401 filed on Apr. 18, 2015, published on Oct. 22, 2015 as U.S. Publication No. 2015/0302652; U.S. application Ser. No. 14/212,961 filed on Mar. 14, 2014, now U.S. Pat. No. 9,417,452 issued on Aug. 16, 2016; U.S. application Ser. No. 14/331,218 filed on Jul. 14, 2014, published on Oct. 29, 2015 as U.S. Publication No. 2015/0309263; U.S. application Ser. No. 15/927,808 filed on Mar. 21, 2018; U.S. application Ser. No. 15/291,929 filed on Oct. 12, 2016, published on Apr. 20, 2017 as U.S. Publication No. 2017/0109580; and U.S. application Ser. No. 15/408,197 filed on Jan. 17, 2017, published on Jul. 20, 2017 as U.S. Publication No. 2017/0206412; U.S. application Ser. No. 15/673,135, filed on Aug. 9, 2017, published on Feb. 15, 2018 as U.S. Publication No. 2018/0045963; U.S. application Ser. No. 15/923,511, filed on Mar. 16, 2018, published on Sep. 20, 2018 as U.S. Publication No. 2018/0268220; U.S. application Ser. No. 15/467,851, filed on Mar. 23, 2017, published on Oct. 19, 2017 as U.S. Publication No. 2017/0301133; U.S. application Ser. No. 15/274,823, filed on Sep. 23, 2016, published on Mar. 30, 2017 as U.S. Publication No. 2017/0091996; U.S. application Ser. No. 16/353,989 filed on Mar. 14, 2019.

BACKGROUND

Field

The present disclosure relates to display systems, including augmented reality imaging and visualization systems.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 10 is depicted. The user of an AR technology sees a real-world park-like setting 20 featuring people, trees, buildings in the background, and a concrete platform 30. The user also perceives that he/she "sees" "virtual content" such as a robot statue 40 standing upon the real-world platform 30, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

Systems and methods disclosed herein address various challenges related to AR and VR technology.

SUMMARY

According to some embodiments, a display system comprises a wearable display configured to present virtual content to a user; an imaging device facing away from the wearable display, the imaging device configured to capture images; and at least one processor communicatively coupled to the wearable display and the imaging device, the at least one processor configured to: obtain an image captured by the imaging device; determine whether a threshold measure or more of motion blur is exhibited in one or more regions of the image; and in response to a determination that the threshold measure or more of motion blur is exhibited in one or more regions of the image, adjust one or more operating parameters of the wearable display.

According to some embodiments, a display system comprises a wearable display configured to present virtual content to a user; an imaging device configured to capture images of an eye of the user; at least one processor communicatively coupled to the wearable display and the imaging device, the at least one processor configured to: obtain an image of the user's eye captured by the imaging device; identify a region of the image corresponding to a target portion of the user's eye; determine whether the identified region of the image contains a threshold measure or more of motion blur; and in response to a determination that the identified region contains the threshold measure or more, adjust one or more operating parameters of the wearable display.

According to some embodiments, a display system comprises a head-mounted display configured to present virtual content to a user; an imaging device configured to capture images of an eye of the user, the imaging device configured to capture images using a static frame rate and variable exposure time; and at least one processor communicatively coupled to the head-mounted display and the imaging device, the at least one processor configured to: control the imaging device to dynamically adjust the exposure time based on one or more conditions of the head-mounted display or the user.

According to some embodiments, a display system comprises a head-mounted display configured to present virtual content to a user; an imaging device facing away from the head-mounted display, the imaging device configured to capture images using a static frame rate and variable exposure time; and at least one processor communicatively coupled to the head-mounted display and the imaging device, the at least one processor configured to use images captured by the imaging device to perform any of a plurality of different processes, wherein to perform each process in the plurality of different processes, the at least one processor is configured to: identify the process to be performed; select, from among a plurality of different exposure times corresponding to the plurality of different processes, respectively, an exposure time that corresponds to the identified process; control the imaging device to capture images using the selected exposure time; and use the images captured by the imaging device using the selected exposure time to perform the identified process.

According to some embodiments, a display system comprises a head-mounted display configured to present virtual content to a user; two or more imaging devices facing away from the head-mounted display, each of which is controllable to alternate between using two different exposure times to capture one or more images on a periodic basis; and at least one processor communicatively coupled to the head-mounted display and the plurality of imaging devices, the at least one processor configured to: control the two or more imaging devices to alternate between using the two different exposure times out of phase with one another.

According to some embodiments, an augmented reality system comprises a head-mounted display configured to present virtual content to a user; an imaging device configured to capture images of an eye of the user; at least one processor communicatively coupled to the head-mounted display and the imaging device, the at least one processor configured to: obtain first and second consecutively-captured images of the user's eye captured by the imaging device; in response to obtaining the second image of the user's eye: identify a region of the second image corresponding to a target portion of the user's eye; evaluate the identified region of the second image against a predetermined set of criteria; based on the evaluation of the second image, determine whether the second image shows the user's eye engaged in saccadic movement; and in response to a determination that the second image shows the user's eye engaged in saccadic movement, adjust one or more operating parameters of the head-mounted display.

According to some embodiments, an augmented reality system comprises a head-mounted display configured to present virtual content to a user; an imaging device facing away from the head-mounted display, the imaging device configured to capture images; at least one processor communicatively coupled to the head-mounted display and the imaging device, the at least one processor configured to: obtain a first image captured by the imaging device; in response to obtaining the first image: detect a first quantity of identifiable features in the first image; obtain a second image captured after the first image by the imaging device; in response to obtaining the second image: detect a second quantity of identifiable features in the second image, the second quantity being different from the first quantity; determine whether the second quantity of identifiable features is less than the first quantity of identifiable features by at least a predetermined threshold quantity of identifiable features; and in response to a determination that the second quantity of identifiable features is less than the first quantity of identifiable features by at least the predetermined threshold quantity of identifiable features, adjust one or more operating parameters of the head-mounted display.

According to some embodiments, an augmented reality display system comprises a head-mounted display configured to present virtual content to a user; an imaging device configured to capture images of an eye of the user; at least one processor communicatively coupled to the head-mounted display and the imaging device, the at least one processor configured to: obtain first and second consecutively-captured images of the user's eye captured by the imaging device; in response to obtaining the first image: detect one or more eye features in the first image; based on detection of the one or more eye features in the first image, determine whether the first image contains at least a first quantity of identifiable eye features; in response to obtaining the second image: detect one or more eye features in the second image; based on detection of the one or more eye features in the second image, determine whether the second image contains a second quantity or more of identifiable eye features different from the first quantity of identifiable eye features; determine whether the second quantity of identifiable eye features is less than the first quantity of identifiable eye features by at least a predetermined threshold quantity of identifiable eye features; based at least on a determination that the second quantity of identifiable eye features is less than the first quantity of identifiable eye features by at least the predetermined threshold quantity of identifiable eye features, determine that the second image shows the user's eye engaged in saccadic movement; and in response to a determination that the image shows the user's eye engaged in saccadic movement, adjust one or more operating parameters of the head-mounted display.

According to some embodiments, a method may be implemented by a display system comprising one or more processors, with the display system presenting augmented reality virtual content to a user. The method comprises obtaining an image of an eye of the user; determining one or more measures associated with motion blur represented in the image; determining, based on the one or more measures, that the image shows performance of a saccade; and performing, by the display system, one or more actions in response, the actions being associated with a reduction in visual perceptibility.

According to some embodiments, an augmented reality system comprises a head-mounted display configured to present virtual content by outputting light to a user; one or more sensors; at least one processor communicatively coupled to the head-mounted display and the one or more sensors, the at least one processor configured to: obtain information indicative of movement of the head-mounted display; determine one or more measures associated with movement; in response to determining that the measures exceed a movement threshold, change a wavefront divergence of the outputted light forming the virtual content.

According to some embodiments, an augmented reality system comprises a head-mounted display configured to present virtual content by outputting light to a user; an imaging device configured to capture images of an eye of the user; at least one processor communicatively coupled to the head-mounted display and the imaging device, the at least one processor configured to: cause presentation of virtual content, the virtual content being configured to be perceived as presented at one or more depths away from the user; adjust a perceived depth of the virtual content; determine an accommodation vergence mismatch; and in response to determining that the accommodation vergence mismatch exceeds a threshold, change a wavefront divergence of the outputted light forming the virtual content.

According to some embodiments, an augmented reality system comprises a head-mounted display configured to present virtual content by outputting light to a user; an imaging device configured to capture images of eyes of the user; at least one processor communicatively coupled to the head-mounted display and the imaging device, the at least one processor configured to: cause presentation of the virtual content, the virtual content being configured to be perceived as presented at a three-dimensional location; determine a fixation point at which eyes of the user are fixating; determine information indicative of a difference between the three-dimensional location of the virtual content and the fixation point; and in response to determining that the difference exceeds one or more thresholds, change a wavefront divergence of the outputted light forming the virtual content.

Additional examples of embodiments are enumerated below.

Example 1. A display system comprising:
a wearable display configured to present virtual content to a user;
an imaging device facing away from the wearable display, the imaging device configured to capture images; and
at least one processor communicatively coupled to the wearable display and the imaging device, the at least one processor configured to:
obtain an image captured by the imaging device;
determine whether a threshold measure or more of motion blur is exhibited in one or more regions of the image; and
in response to a determination that the threshold measure or more of motion blur is exhibited in one or more regions of the image, adjust one or more operating parameters of the wearable display.

Example 2. The display system of Example 1, wherein the imaging device faces the user, the imaging device configured to capture images of an eye of the user.

Example 3. The display system of Example 2, wherein to determine whether the threshold measure or more of motion blur is exhibited in one or more regions of the image, the at least one processor is configured to:
identify a target region of the image corresponding to a target portion of the user's eye; and
determine whether the threshold measure or more of motion blur is exhibited in the identified region of the image.

Example 4. The display system of Example 3, further comprising an infrared light source,
wherein the target portion of the user's eye comprises an illuminated portion of the user's eye, wherein the illuminated portion is illuminated by the light source.

Example 5. The display system of Example 4, wherein the illuminated portion comprises a cornea of the eye, wherein the at least one processor is configured to detect infrared glint within the illuminated portion.

Example 6. The display system of Example 4, wherein the illuminated portion comprises a band of infrared illumination spanning a limbic boundary of the user's eye.

Example 7. The display system of Example 3, wherein the target portion of the user's eye comprises the pupil.

Example 8. The display system of Example 3, wherein the target portion of the user's eye comprises the pupil and at least a portion of an iris.

Example 9. The display system of Example 3, wherein the target portion of the user's eye comprises a portion of a limbic boundary.

Example 10. The display system of Example 1, wherein to determine whether the threshold measure or more of motion blur is exhibited in one or more regions of the image, the at least one processor is configured to:
convolving at least the one or more regions with one or more image kernels; and
determining, based on the convolution, whether the threshold measure or more of motion blur is exhibited in the one or more regions of the image.

Example 11. The display system of Example 1, wherein to determine whether the threshold measure or more of motion blur is exhibited in one or more regions of the image, the at least one processor is configured to:
extracting frequency information from the image; and
determining, based on the frequency information, whether the threshold measure or more of motion blur is exhibited in the one or more regions of the image.

Example 12. The display system of Example 1, wherein the processor is further configured to determine a direction associated with motion blur exhibited in one or more regions of the image.

Example 13. The display system of Example 11, wherein the processor is further configured to determine a magnitude associated with motion blur exhibited in one or more regions of the image.

Example 14. The display system of Example 1, wherein the one or more operating parameters comprise one or more power settings of the display system.

Example 15. The display system of Example 1, wherein the one or more operating parameters comprise one or more settings for displaying content on the wearable display.

Example 16. The display system of Example 1, wherein the one or more operating parameters comprise one or more virtual content rendering settings.

Example 17. The display system of Example 1, wherein the at least one processor is configured to change a depth plane on which virtual content is presented in response to the determination that the identified region contains the threshold measure or more.

Example 18. The display system of Example 1, wherein the imaging device faces away from the user, the imaging device configured to capture images of a real-world environment.

Example 19. A display system comprising:
a head-mounted display configured to present virtual content to a user;
an imaging device configured to capture images of an eye of the user, the imaging device configured to capture images using a static frame rate and variable exposure time; and
at least one processor communicatively coupled to the head-mounted display and the imaging device, the at least one processor configured to:
control the imaging device to dynamically adjust the exposure time based on one or more conditions of the head-mounted display or the user.

Example 20. The display system of Example 19, wherein the head-mounted display is an augmented reality display comprising a stack of waveguides, wherein one or more of the waveguides are configured to output light with different amounts of wavefront divergence than others of the waveguides.

Example 21. The display system of Example 19, wherein the at least one processor is configured to control the imaging device to switch between:
  (i) a short exposure time mode in which the imaging device is configured to capture images at the static frame rate using a first exposure time; and
  (ii) a long exposure time mode in which the imaging device is configured to capture images at the static frame rate using a second exposure time that is longer in duration than the first exposure time.

Example 22. The display system of Example 21, wherein the at least one processor is configured to use images captured by the imaging device to perform one or more biometric authentication processes.

Example 23. The display system of Example 22, wherein the at least one processor is configured to control the imaging device to operate in the short exposure mode in response to initiation of one or more biometric authentication processes.

Example 24. The display system of Example 21, wherein the at least one processor is configured to use images captured by the imaging device to perform one or more saccade detection processes to determine whether the user's eye is engaged in saccadic movement.

Example 25. The display system of Example 24, wherein the at least one processor is configured to control the imaging device to operate in the long exposure mode in response to initiation of one or more saccade detection processes.

Example 26. The display system of Example 19, wherein to control the imaging device to dynamically adjust the exposure time based on one or more conditions of the head-mounted display or the user, the at least one processor is configured to:
  select a particular exposure time from among a predetermined range of exposure times based on one or more conditions of the head-mounted display or the user; and
  control the imaging device to shift its exposure time to the particular exposure time.

Example 27. The display system of Example 19, wherein the at least one processor is further configured to:
  use images captured by the imaging device to determine a fixation depth of the user, the fixation depth of the user being a depth at which eyes of the user are fixating, and
  wherein to control the imaging device to dynamically adjust the exposure time based on one or more conditions of the head-mounted display or the user, the at least one processor is configured to:
    control the imaging device to dynamically adjust the exposure time based at least in part on the determined fixation depth of the user.

Example 28. The display system of Example 27, wherein the at least one processor is further configured to:
  determine an accommodation vergence mismatch based at least in part on the determined fixation depth of the user, and
  wherein to control the imaging device to dynamically adjust the exposure time based at least in part on the determined fixation depth of the user, the at least one processor is configured to:
    control the imaging device to dynamically adjust the exposure time based at least in part on the determined accommodation vergence mismatch.

Example 29. The display system of Example 19, wherein the at least one processor is configured to control the imaging device to alternate between two different exposure times on a frame-by-frame basis.

Example 30. The display system Example 29, wherein the at least one processor is configured to control the imaging device to dynamically adjust one of the two different exposure times based on one or more conditions of the head-mounted display or the user, while maintaining the other of the two different exposure times at a fixed duration of time.

Example 31. The display system of Example 29, wherein the system further comprises another imaging device configured to capture images of another eye of the user.

Example 32. The display system of Example 31, wherein the at least one processor is configured to:
  control the other imaging device to alternate between the two different exposure times on a frame-by-frame basis; and
  control the imaging device and the other imaging device to alternate between the two different exposure times out of phase with one another.

Example 33. A display system comprising:
  a head-mounted display configured to present virtual content to a user;
  an imaging device facing away from the head-mounted display, the imaging device configured to capture images using a static frame rate and variable exposure time; and
  at least one processor communicatively coupled to the head-mounted display and the imaging device, the at least one processor configured to use images captured by the imaging device to perform any of a plurality of different processes, wherein to perform each process in the plurality of different processes, the at least one processor is configured to:
    identify the process to be performed;
    select, from among a plurality of different exposure times corresponding to the plurality of different processes, respectively, an exposure time that corresponds to the identified process;
    control the imaging device to capture images using the selected exposure time; and
    use the images captured by the imaging device using the selected exposure time to perform the identified process.

Example 34. The display system of Example 33, wherein the plurality of different processes comprise a process to determine whether the user is experiencing reduced visual perceptibility and at least one other process.

Example 35. The display system of Example 34, wherein the at least one processor is configured to:
  use images captured by the imaging device using a first exposure time to perform the process to determine whether the user is experiencing reduced visual perceptibility; and
  use images captured by the imaging device using a second exposure time to perform the at least one other process, the second exposure time being shorter in duration than the first exposure time.

Example 36. The display system of Example 35, wherein the imaging device faces the user, the imaging device configured to capture images of an eye of the user.

Example 37. The display system of Example 36, wherein to determine whether the user is experiencing reduced visual perceptibility, the at least one processor is configured to:
  determine whether the user's eye is engaged in saccadic movement.

Example 38. The display system of Example 35, wherein the imaging device faces away from the user, the imaging device configured to capture images of a real-world environment.

Example 39. The display system of Example 38, wherein to determine whether the user is experiencing reduced visual perceptibility, the at least one processor is configured to:
determine whether the user's head is engaged in a threshold measure or more of movement.

Example 40. A display system comprising:
a head-mounted display configured to present virtual content to a user;
two or more imaging devices facing away from the head-mounted display, each of which is controllable to alternate between using two different exposure times to capture one or more images on a periodic basis; and
at least one processor communicatively coupled to the head-mounted display and the plurality of imaging devices, the at least one processor configured to:
control the two or more imaging devices to alternate between using the two different exposure times out of phase with one another.

Example 41. The display system of Example 40, wherein the two different exposure times comprise a first exposure time and a second exposure time, the first exposure time being longer in duration than the second exposure time, and wherein the at least one processor is further configured to:
use images captured by the two imaging devices using the first exposure time to perform a first process; and
use images captured by the two imaging devices using the second exposure time to perform a second process different from the first process.

Example 42. The display system of Example 41, wherein to use images captured by the two imaging devices using the first exposure time to perform the first process, the at least one processor is configured to:
use images captured by the two imaging devices using the first exposure time to determine whether the user is experiencing reduced visual perceptibility.

Example 43. The display system of Example 42, wherein the at least one processor is further configured to:
adjust one or more operating parameters of the head-mounted display in response to a determination that the user is experiencing reduced visual perceptibility.

Example 44. An augmented reality system comprising:
a head-mounted display configured to present virtual content to a user;
an imaging device configured to capture images of an eye of the user;
at least one processor communicatively coupled to the head-mounted display and the imaging device, the at least one processor configured to:
obtain first and second consecutively-captured images of the user's eye captured by the imaging device;
in response to obtaining the second image of the user's eye:
identify a region of the second image corresponding to a target portion of the user's eye;
evaluate the identified region of the second image against a predetermined set of criteria;
based on the evaluation of the second image, determine whether the second image shows the user's eye engaged in saccadic movement; and
in response to a determination that the second image shows the user's eye engaged in saccadic movement, adjust one or more operating parameters of the head-mounted display.

Example 45. The augmented reality system of Example 44, wherein the at least one processor is configured to:
access a kernel from a memory of the augmented reality display system; and
convolve the identified region of the image with the kernel to obtain one or more measurements of motion blur contained within the identified region of the image.

Example 46. The augmented reality system of Example 44, wherein the at least one processor is configured to generate a confidence score indicating a level of confidence that the user's eyes are engaged in saccadic movement.

Example 47. The augmented reality system of Example 44, wherein the at least one processor is configured to determine whether the second image shows the user's eye engaged in saccadic movement based on the evaluation of the second image and irrespective of the first image.

Example 48. An augmented reality system comprising:
a head-mounted display configured to present virtual content to a user;
an imaging device facing away from the head-mounted display, the imaging device configured to capture images;
at least one processor communicatively coupled to the head-mounted display and the imaging device, the at least one processor configured to:
obtain a first image captured by the imaging device;
in response to obtaining the first image:
detect a first quantity of identifiable features in the first image;
obtain a second image captured after the first image by the imaging device;
in response to obtaining the second image:
detect a second quantity of identifiable features in the second image, the second quantity being different from the first quantity;
determine whether the second quantity of identifiable features is less than the first quantity of identifiable features by at least a predetermined threshold quantity of identifiable features; and
in response to a determination that the second quantity of identifiable features is less than the first quantity of identifiable features by at least the predetermined threshold quantity of identifiable features, adjust one or more operating parameters of the head-mounted display.

Example 49. The augmented reality system of Example 48, wherein the imaging device faces the user, the imaging device configured to capture images of an eye of the user.

Example 50. The augmented reality system of Example 49, wherein the identifiable features comprise identifiable eye features.

Example 51. The augmented reality system of Example 50, wherein the eye features include one or more iris features.

Example 52. The augmented reality system of Example 51, wherein the one or more iris features include a texture, a pattern, a key point in the iris, or a combination thereof.

Example 53. The augmented reality system of Example 50, wherein the eye features include one or more scleral features.

Example 54. The augmented reality system of Example 53, wherein the one or more scleral features include a blood vessel.

Example 55. The augmented reality system of Example 48, wherein the imaging device faces away from the user, the imaging device configured to capture images of a real-world environment.

Example 56. The augmented reality system of Example 55, wherein the identifiable features comprise fixed features of one or more objects in the real-world environment.

Example 57. The augmented reality system of Example 56, wherein the fixed features comprise corners of one or more objects in the real-world environment.

Example 58. The augmented reality system of Example 56, wherein the fixed features comprise edges of one or more objects in the real-world environment.

Example 59. The augmented reality system of Example 48, wherein the first and second images comprise first and second consecutively-captured images.

Example 60. A method implemented by a display system comprising one or more processors, the display system presenting augmented reality virtual content to a user, and the method comprising:
   obtaining an image of an eye of the user;
   determining one or more measures associated with motion blur represented in the image;
   determining, based on the one or more measures, that the image shows performance of a saccade; and
   performing, by the display system, one or more actions in response, the actions being associated with a reduction in visual perceptibility.

Example 61. The method of Example 60, wherein determining a measure associated with motion blur comprises:
   extracting frequency information from the image; and
   determining a magnitude of motion blur based on the frequency information, the magnitude being utilized as the measure of motion blur.

Example 62. The method of Example 61, wherein determining a measure associated with motion blur comprises:
   convolving one or more image kernels with at least a portion of the image; and
   determining the measure based on the convolution.

Example 63. The method of Example 60, wherein a plurality of measures are determined, each measure being associated with a respective motion blur determination scheme; and
   wherein determining that the image shows performance of a saccade is based on the plurality of measures.

Example 64. The method of Example 60, wherein the measures are averaged, and wherein determining that the image shows performance of a saccade comprises determining that the average exceeds a predetermined threshold value.

Example 65. The method of Example 60, wherein determining that the image shows performance of a saccade comprises determining that a threshold number of the measures exceed respective predetermined threshold values.

Example 66. The method of Example 65, wherein the threshold number is a majority of the measures or a user-selectable threshold number.

Example 67. The method of Example 60, further comprising:
   determining a magnitude and direction associated with the motion blur.

Example 68. The method of Example 60, further comprising:
   accessing information identifying a three-dimensional fixation point associated with the user, the fixation point representing a gaze of the user; and
   estimating an updated three-dimensional fixation point based on the determined magnitude and direction, the updated three-dimensional fixation point representing a gaze of the user subsequent to the saccade.

Example 69. An augmented reality system comprising:
   a head-mounted display configured to present virtual content by outputting light to a user;
   one or more sensors;
   at least one processor communicatively coupled to the head-mounted display and the one or more sensors, the at least one processor configured to:
      obtain information indicative of movement of the head-mounted display;
      determine one or more measures associated with movement;
      in response to determining that the measures exceed a movement threshold, change a wavefront divergence of the outputted light forming the virtual content.

Example 70. The augmented reality system of Example 69, wherein the one or more sensors comprise one or more accelerometers, gyroscopes, magnetometers, or a combination thereof.

Example 71. The augmented reality system of Example 69, wherein the movement threshold indicates a threshold angular velocity.

Example 72. The augmented reality system of Example 69, wherein the one or more sensors comprise one or more outward facing cameras.

Example 73. The augmented reality system of Example 72, wherein the process is further configured to:
   obtain, via the outward facing cameras, images of a real-world environment; and
   determine the measures associated with movement based on the obtained images.

Example 74. The augmented reality system of Example 73, wherein process is further configured to determine the measures by actions comprises:
   monitoring movement of one or more fixed features as included in a first image and a subsequent, second image; or
   determining measures associated with motion blur in an obtained image, the measures indicating one or more of a direction and magnitude of the motion blur.

Example 75. An augmented reality system comprising:
   a head-mounted display configured to present virtual content by outputting light to a user;
   an imaging device configured to capture images of an eye of the user;
   at least one processor communicatively coupled to the head-mounted display and the imaging device, the at least one processor configured to:
      cause presentation of virtual content, the virtual content being configured to be perceived as presented at one or more depths away from the user;
      adjust a perceived depth of the virtual content;
      determine an accommodation vergence mismatch; and
      in response to determining that the accommodation vergence mismatch exceeds a threshold, change a wavefront divergence of the outputted light forming the virtual content.

Example 76. The augmented reality device of Example 75, wherein adjusting the perceived depth of the virtual content comprises adjusting vergence cues associated with the virtual content.

Example 77. The augmented reality device of Example 75, wherein the accommodation vergence mismatch is based on user preference information associated with a user of the augmented reality device.

Example 78. The augmented reality device of Example 75, wherein the head-mounted display is an augmented reality display comprising a stack of waveguides, wherein one or more of the waveguides are configured to output light with different amounts of wavefront divergence than others of the waveguides.

Example 79. The augmented reality device of Example 78, wherein the stack of waveguides are associated with respective accommodation cues.

Example 80. The augmented reality device of Example 79, wherein the virtual content is presented via a first waveguide associated with a first accommodation cue, and wherein adjusting the perceived depth of the virtual content comprises adjusting vergence cues associated with the virtual content.

Example 81. The augmented reality device of Example 80, wherein determining that the accommodation-vergence mismatch exceeds a threshold is based on a difference associated with the first accommodation cue and vergence cues exceeding the threshold.

Example 82. An augmented reality system comprising:
  a head-mounted display configured to present virtual content by outputting light to a user;
  an imaging device configured to capture images of eyes of the user;
  at least one processor communicatively coupled to the head-mounted display and the imaging device, the at least one processor configured to:
    cause presentation of the virtual content, the virtual content being configured to be perceived as presented at a three-dimensional location;
    determine a fixation point at which eyes of the user are fixating;
    determine information indicative of a difference between the three-dimensional location of the virtual content and the fixation point;
    in response to determining that the difference exceeds one or more thresholds, change a wavefront divergence of the outputted light forming the virtual content.

Example 83. The augmented reality system of Example 82, wherein determining that the difference exceeds one or more thresholds comprises determining that the fixation point is greater than a threshold angular distance from the three-dimensional location.

Example 84. The augmented reality system of Example 82, wherein the augmented reality system is configured to use images captured by the imaging device to determine a fixation depth of the user, the fixation depth of the user being a depth at which eyes of the user are fixating.

Example 85. The augmented reality system of Example 84, wherein determining that the difference exceeds one or more thresholds comprises determining that the fixation depth is outside of a volume of three-dimensional space which includes the three-dimensional location.

Example 86. The augmented reality display system of Example 82, wherein virtual content is presented in a zone of a plurality of zones, each zone representing a volume of real-world space, and wherein determining that the difference exceeds one or more thresholds is based on a particular zone that includes the virtual content being greater than a threshold number of zones from a different zone which includes the fixation point.

Example 87. A method implemented by an augmented reality system, the method comprising:
  presenting virtual content to a user of the augmented reality system, the virtual content being configured to be perceived as presented at a three-dimensional location;
  monitoring for occurrences of one or more of: an indication of performance of a saccade by the user, an indication of performance of a blink by the user, movement of the augmented reality system, an indication that an accommodation-vergence mismatch associated with the presented virtual content exceeds one or more thresholds, and an indication that a difference between the three-dimensional location of the virtual content and a fixation point at which the user is fixating exceeds one or more thresholds; and based on the monitoring, changing a wavefront divergence of outputted light forming the virtual content.

Example 88. The method of Example 87, further comprising:
  determining whether to change the wavefront divergence based on the monitoring, wherein the determination is based on a precedence network.

BRIEF DESCRIPTION OF THE DRAWINGS

FIG. 10B illustrates additional example images of a user's eye.

DETAILED DESCRIPTION

Figure 1:
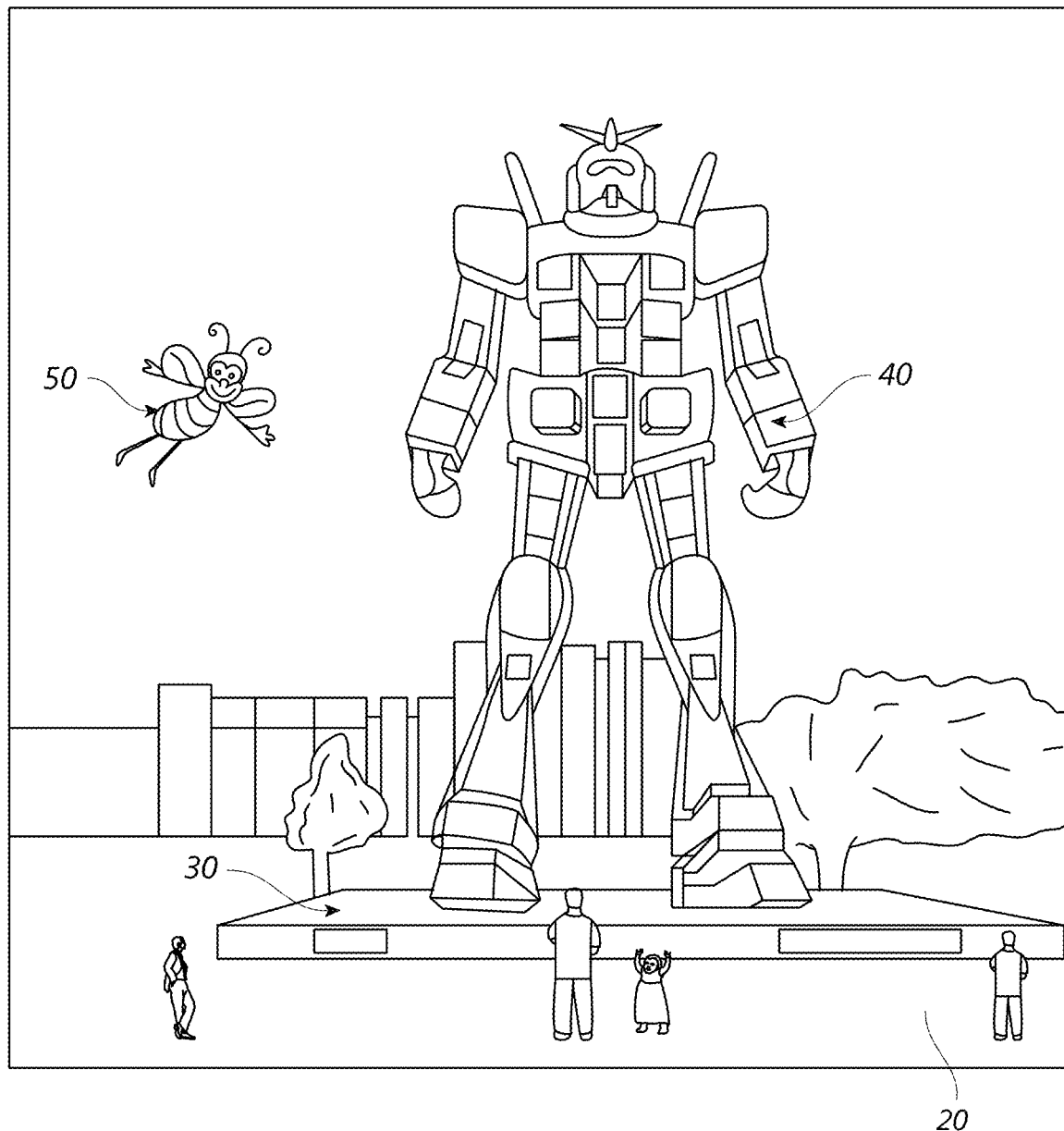
FIG. 1 illustrates a user's view of augmented reality (AR) through an AR device.

As described herein, display systems (e.g., augmented reality or virtual reality display systems) may render virtual content for presentation to a user at different perceived depths from the user. In augmented reality display systems, different depth planes may be utilized to project virtual content with each depth plane being associated with a particular perceived depth from the user. For example, a stack of waveguides configured to output light with different wavefront divergences may be utilized, with each depth plane having a corresponding wavefront divergence and being associated with at least one waveguide. As virtual content moves about the user's field of view, the virtual content may be adjusted along three discrete axes. For example, the virtual content may be adjusted along the X, Y, and Z axes such that the virtual content may be presented at different perceived depths from the user. The display system may switch between depth planes as the virtual content is perceived to be moved further from, or closer to, the user. It will be appreciated that switching depth planes may involve changing the wavefront divergence of light forming the virtual content in a discrete step. In a waveguide-based system, in some embodiments, such a depth plane switch may involve switching the waveguide outputting light to form the virtual content. Undesirably, upon each switch, the user may be able to perceive a flicker or reduction in presentation quality as the display system outputs light to the user with a discrete jump in wavefront divergence corresponding to a different depth plane.

The perceptibility of depth plane switching may be reduced by timing the switch to coincide with various masking events, which mask or otherwise reduce the perceptibility to the user of changes in wavefront divergence during depth plane switching. In some embodiments, the masking events include saccades by the eyes of the user. It will be appreciated that a saccade may be a quick, simultaneous movement of both eyes that abruptly changes the fixation point of the eyes. A saccade may reduce visual acuity or perceptibility while the saccade is being performed, for example causing momentary saccadic blindness as the eyes move rapidly to a new fixation point. The display system may utilize the detection of a saccade as a trigger or precondition to performing a depth plane switch. Thus, the user's ability to perceive the depth-plane switch may be reduced. In some other embodiments, the performance of other display events or changes to displayed content may be timed to coincide with a saccade, so as to "hide" or reduce the perceptibility of the events or changes.

Preferably, the detection and performance of display events (e.g., depth plane switching) are sufficiently quick that they occur while the user is still performing the saccade and/or before the user's visual system returns to perceiving visual content with high visual acuity after a saccade. Thus, early detection of a saccade may advantageously provide additional time to perform the display events, thereby increasing the likelihood that the display event is not perceived and/or allowing larger numbers or types of display events to be performed while being hidden from the user's visual perception.

For example, the display system may utilize one or more sensors (e.g., cameras) to monitor a user's eyes. These sensors may capture information (e.g., images) at a constant, or variable, refresh rate (e.g., 30 Hz, 60 Hz, and so on). With respect to the example of 30 Hz, each sampled information may last for 33 ms. The duration of time of a saccade may vary, for example depending on an angular distance of eye movement. Example saccade durations include 20-200 milliseconds. Thus, for some saccades of shorter durations, if the early portion (e.g., the initiation) of the saccade is missed, then the performance of various display actions (e.g., depth plane switch, reduction in quality of virtual content) may be perceptible as they may, at least in part, be performed after completion of the saccade. Therefore, it is advantageous to detect a saccade at an early point (e.g., an initiation of the saccade).

Advantageously, systems and methods described herein may enable detection of a saccade quickly and preferably prior to completion of the saccade (e.g., at the initiation of the saccade). As noted above, saccades are characterized by quick movements of the eyes and the display system may have one or more sensors that capture images of one or both eyes. It has been found that, due to its rapid movement, individual images of an eye during the saccade may exhibit motion blur. In some embodiments, rather than tracking the movement of the eye across multiple image frames, only one or two frames may be analyzed to determine whether a saccade is occurring. As noted above, the image frames may be captured at a particular frame rate and waiting for multiple frames to be captured undesirably consumes a portion of the duration over which a saccade may occur, thereby reducing the amount of time available to perform a display action. On the other hand, increasing the frame rate may undesirably increase the complexity of imaging systems and/or computing resources devoted to the image capture. Consequently, saccade detection using a single frame (or two frames) may provide advantages for both speed and the efficient utilization of display system resources.

In some embodiments, saccade detection schemes may utilize measures of motion blur of a user's eyes. As an example, a display system may utilize sensors (e.g., cameras) to capture sensor information (e.g., images), and determine particular measures of motion blur based on the sensor information. It will be appreciated that during a saccade both of a person's eyes may correspondingly move, such that either eye may be monitored. Thus, the display system may capture sensor information for one or both eyes of the user. For example, the display system may obtain an image of the user's eyes, with an exposure time (e.g., an effective shutter speed) set at a particular time (e.g., 5 ms, 10 ms, 20 ms). Thus, the obtained image may capture perceived movement of the user's eyes (e.g., the movement may be represented as a streak or blur in the image). During a saccade, the perceived movement may be increased. For example, during a saccade the user's eyes may move at an angular velocity between about 200 degrees per second to about 500 degrees per second. However, during smooth pursuit (e.g., normal vision) the user's eyes may move smoothly and at a reduced angular velocity. Therefore, an image of the user's eyes may include increased motion blur upon initiation of a saccade. This motion blur may be detected according to various schemes described in more detail herein. In some embodiments, the exposure duration may be chosen such that smooth pursuits do not trigger sufficient amounts of motion blur to trigger a saccade detection.

Example schemes to detect motion blur may include frequency spectrum techniques, convolutional techniques, determining elongation of a user's pupil (e.g., the user's pupil may appear elongated or deformed in an image captured during a saccade), deep learning techniques (e.g., neural network-based image analysis), and so on. With respect to frequency spectrum, a display system may perform a Fourier transform, wavelet transform, and so on, to extract frequency information from an image. The display system may then analyze the extracted frequency information to determine magnitude and, optionally, direction associated with movement. For example, a spatial frequency may be lower along a direction in which a user's eye is moving. With respect to convolutional techniques, the display system may convolve an image, or a portion thereof (e.g., a detected pupil), with one or more image kernels to determine measures associated with motion blur.

Through use of motion blur to detect saccades, the display system may more quickly react to such saccades. In contrast, and as will be described below, other example schemes may utilize comparisons between captured images to detect such events. For example, movement of specific features between successive images may be determined. Example features may include portions of a user's pupil, or movement of reflected infrared lights (e.g., 'IR' glints) may be monitored. For these example schemes, the display may detect a saccade at a later point than based on analyzing motion blur included in images. For example, the display system may require a first image illustrating initiation of a saccade, and a second image illustrating the saccade. Thus, in this example the display system may detect the saccade at a later point than based on the techniques described herein.

In some embodiments, the display system may utilize a first sensor to obtain sensor information illustrating motion blur, and a second sensor configured to obtain sensor information at a quicker exposure time than the first sensor. For example, the second sensor may obtain images of a user's eyes using a faster shutter speed, in an effort to obtain images of the eyes frozen (e.g., substantially frozen) in time (e.g., without motion blur). In this example, the obtained images may be utilized to enhance detection of saccades by, e.g., providing a reference by which motion blur may be better determined. Additionally, images of both eyes may be leveraged to improve the detection process. For example, the display system may include an infrared light source configured to output infrared light to the user's eyes. Images obtained via the second sensor may be utilized to determine accurate geometric information associated with infrared light reflected from the user's eyes. Additionally, images obtained via the first sensor may be utilized to determine measures associated with motion blur. Both of these images may be leveraged to improve saccade detection. For example, a first image may be obtained via the first sensor which may illustrate motion blur associated with reflected infrared light. A second image may be obtained at a same time via the second sensor, with the second image illustrating geometrical information associated with the reflected infrared light (e.g., a shape of an IR glint without deformation caused by motion blur). Comparisons between the reflected infrared light between the first image and second image may be performed (e.g., measures of deformation and/or elongation of an IR glint), and the display system may more accurately determine measures of motion blur.

In some embodiments, images obtained via the second sensor may be utilized for disparate purposes, for example determining three-dimensional locations at which the user is fixating. For example, the first sensor may be utilized to monitor for saccades and the second sensor may be utilized to determine locations in three-dimensional space at which the user is fixating. As another example, the images obtained via the second sensor may be utilized for biometric authentication purposes. For example, unique eye features of the user may be identified in these images and utilized to confirm an identity of the user. Example eye features may include iris features (e.g., a texture, pattern, key point in an iris, and so on), scleral features (e.g., a blood vessel), and so on. Example descriptions of eye features and identifying eye features is described in more detail in U.S. Patent Pub. 2017/0109580, which is hereby incorporated by reference in its entirety for all purposes.

In some embodiments, the display system may adjust an exposure time of images obtained via the first sensor and/or the second sensor. As an example, the display system may adjust exposure time of the first sensor to obtain images illustrating motion blur, and then reduce the exposure time to obtain images illustrating the user's eye frozen (e.g., substantially frozen). Thus, the display system may periodically obtain images to detect saccades, and between such detection may obtain images for other purposes (e.g., determining a gaze of the eye). Similarly, the display system may adjust an exposure time to perform biometric authentication. For example, a user may perform an action to log-in or otherwise authenticate himself/herself, the display system may adjust an exposure time of the first sensor (e.g., temporarily) to obtain images for authentication purposes.

Advantageously, as discussed herein, the ability to quickly detect saccades allows the display system to perform various actions during the saccade, preferably without the user being able to perceive those actions. An example such an action may comprise performing a switch between a first depth plane and a second depth plane.

As another example, the display system may reduce a resolution at which virtual content is being rendered during a saccade. It will be appreciated that adjusting resolution of virtual content may include any modification to the virtual content to alter a quality of presentation of the virtual object. Such modifications may include one or more of adjusting a polygon count of the virtual content, adjusting primitives utilized to generate the virtual content (e.g., adjusting a shape of the primitives, for example adjusting primitives from triangle mesh to quadrilateral mesh, and so on), adjusting operations performed on the virtual content (e.g., shader operations), adjusting texture information, adjusting color resolution or depth, adjusting a number of rendering cycles or a frame rate, and so on, including adjusting quality at one or more points within a graphics pipeline of graphics processing units (GPUs). Additionally, hardware characteristics may be adjusted, such as reducing a clock speed of a GPU or central processing unit (CPU).

As yet another example in an action that may be performed during a saccade, the display system may stop presentation of the virtual content based on detection of a saccade.

It will be appreciated that rendering virtual content may be computationally intensive and stopping the display of virtual content or reducing the resolution of that virtual content may enable reductions in the computational resources associated with rendering virtual content. Additionally, the power requirements of the display system may be reduced. With respect to a battery powered display system, the display system's battery life may be improved and/or the display system's weight may be reduced via a reduction in required size of the battery.

In addition to saccades, the display system may be configured to detect various other masking events and to perform depth plane switching upon detection of these events. As discussed herein, the depth plane switching preferably coincides with these events. In some embodiments, the events include movement of the device, which may indicate movement of the user (e.g., movement of the user's head). The events may also include an occurrence of the user not fixating on virtual content; the display system may be configured to switch depth planes when the user is determined to not be fixating on the virtual content. In addition, in some embodiments, even where masking events do not occur, the system may be configured to switch depth planes upon the accommodation-vergence mismatch of virtual content exceeding a threshold, thereby preventing accommodation-vergence mismatches that may be uncomfortable for the user.

It will be appreciated that the display system may be part of an augmented reality display system, or a virtual reality display system. As one example, the display of the display system may be transmissive and may allow the user a view of the real world, while providing virtual content in the form of images, video, interactivity, and so on, to the user. As another example, the display system may block the user's view of the real world, and virtual reality images, video, interactivity, and so on, may be presented to the user.

Reference will now be made to the drawings, in which like reference numerals refer to like parts throughout.

Figure 2:
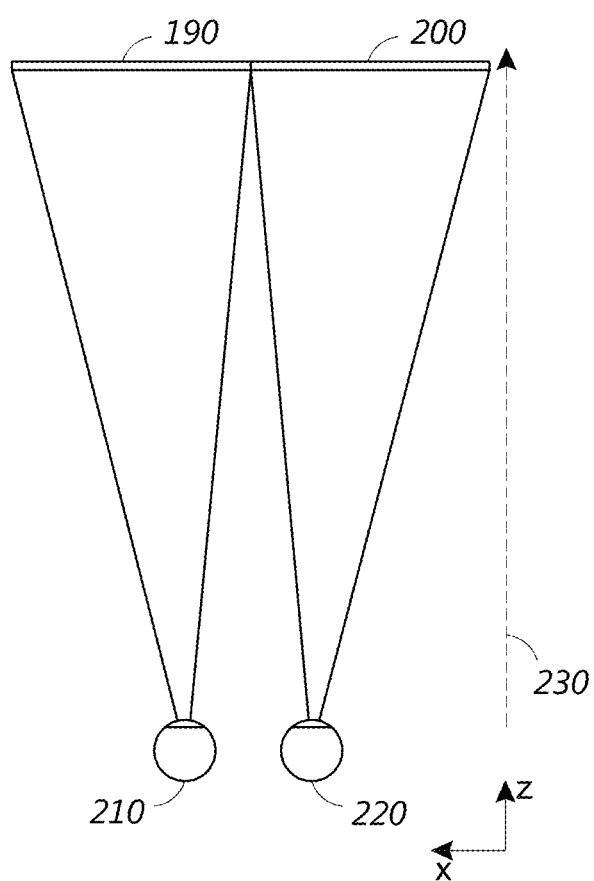
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
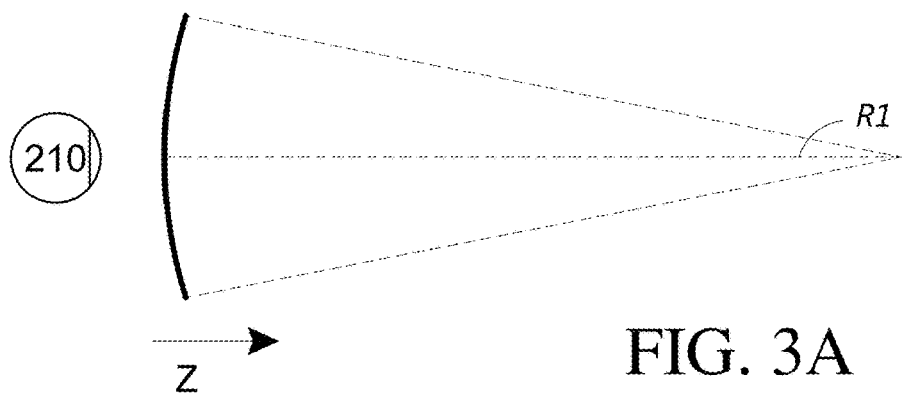
FIGS. 3A-3C illustrate relationships between radius of curvature and focal radius.
Figure 3B:
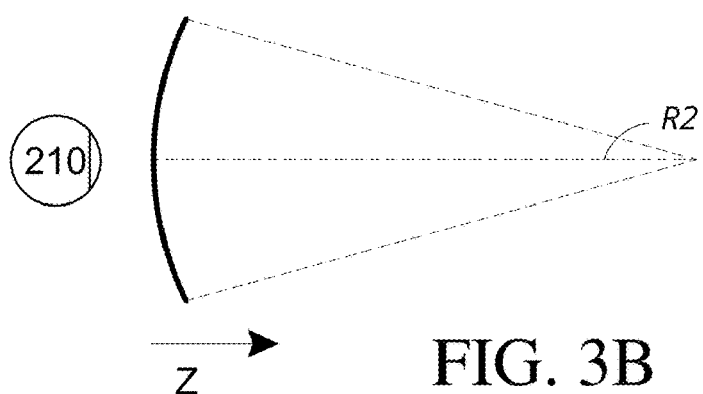
Figure 3C:
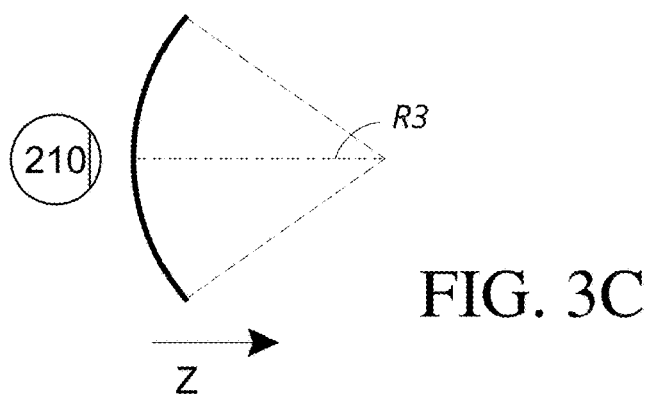

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
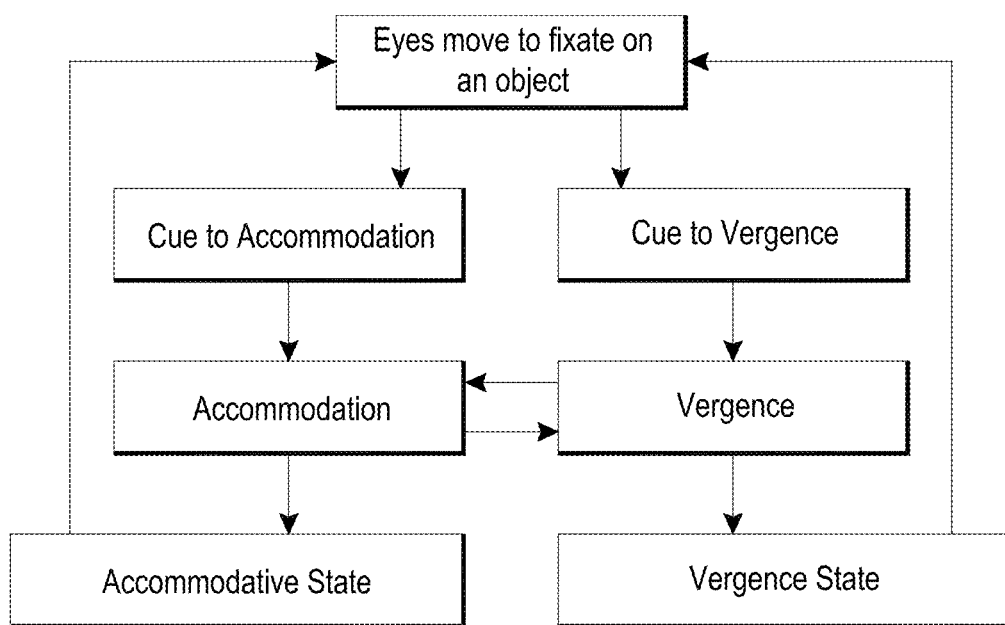
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
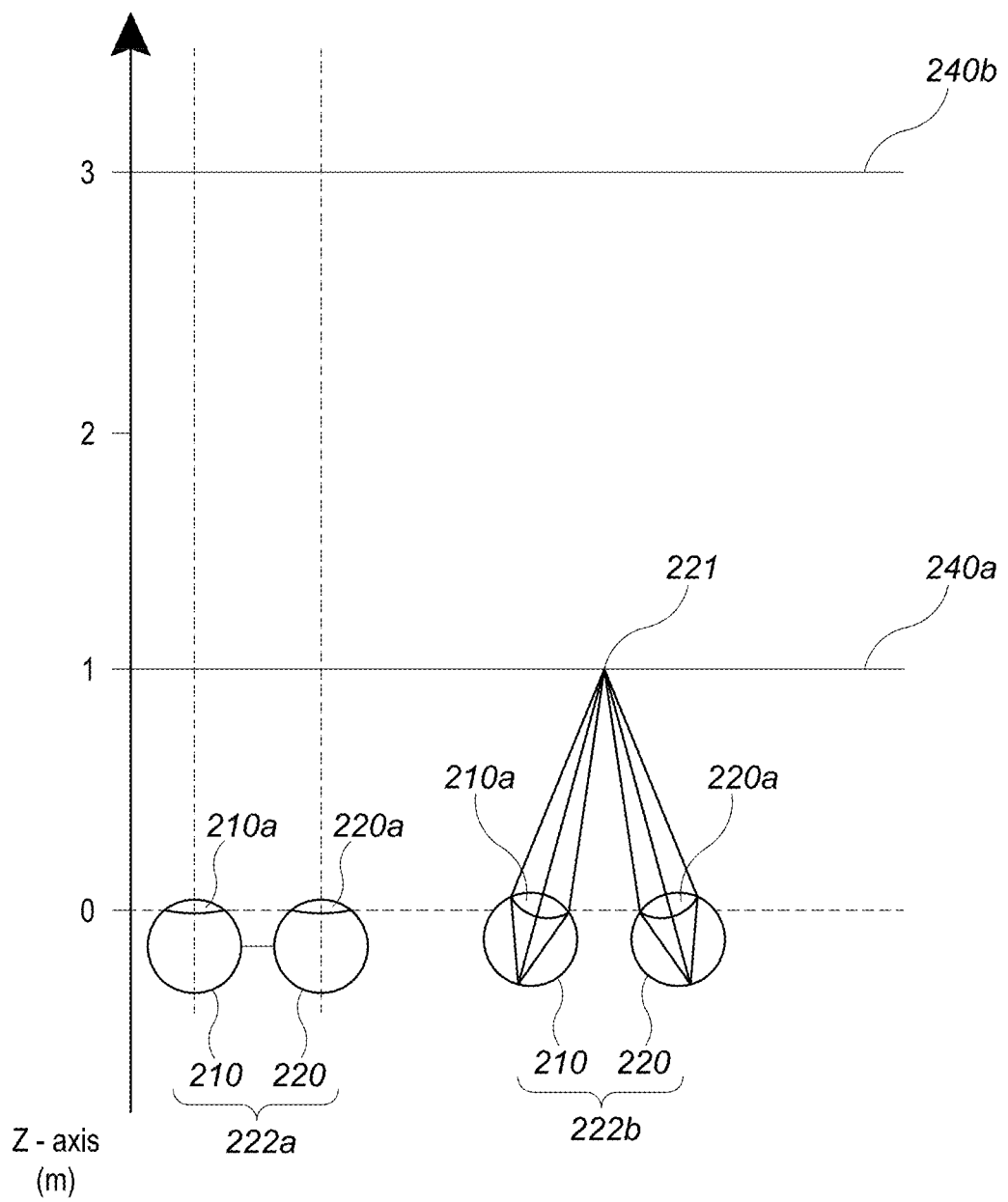
FIG. 4B illustrates examples of different accommodative states and vergence states of a pair of eyes of the user.

With reference now to FIG. 4B, examples of different accommodative and vergence states of the eyes are illustrated. The pair of eyes 222a are fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero point located at the exit pupils of the user's eyes. Thus, a depth plane 240 located at a depth of 1 m corresponds to a distance of 1 m away from the exit pupils of the user's eyes, on the optical axis of those eyes. As an approximation, the depth or distance along the z-axis may be measured from the display in front of the user's eyes (e.g., from the surface of a waveguide), plus a value for the distance between the device and the exit pupils of the user's eyes, with the eyes directed towards optical infinity. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
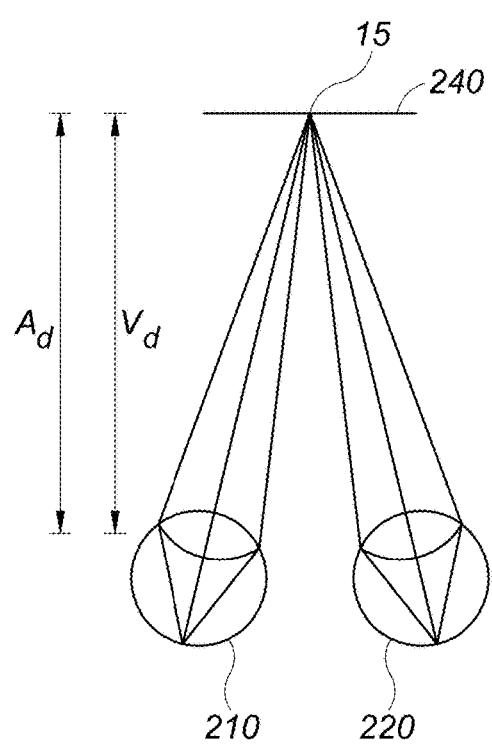
FIG. 4C illustrates an example of a representation of a top-down view of a user viewing content via a display system.
Figure 4D:
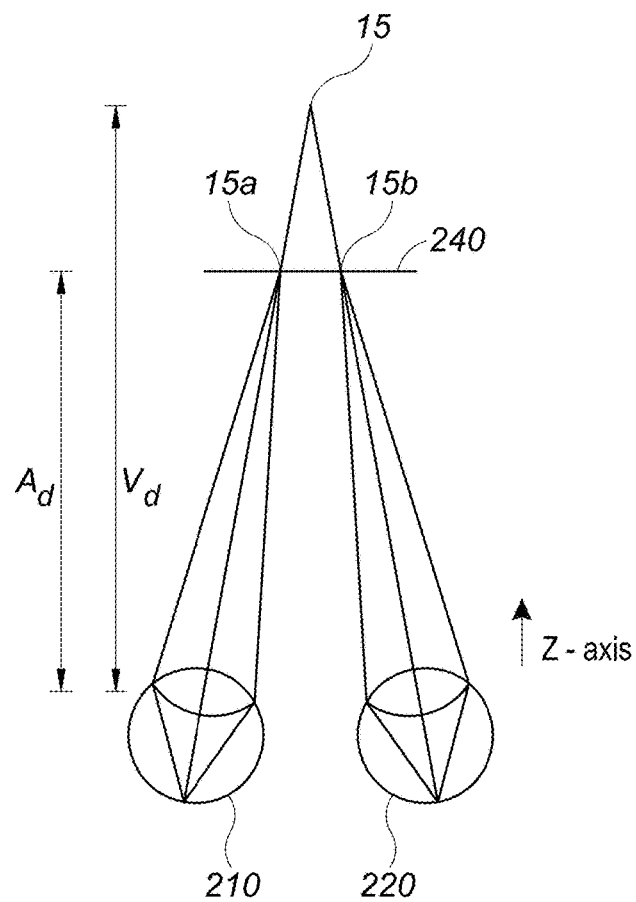
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from a particular reference point of the user (e.g., the exit pupils of the eyes 210, 220) to the depth plane 240, while the vergence distance corresponds to the larger distance from that reference point to the point 15, in some embodiments. Thus, the accommodation distance is different from the vergence distance and there is an accommodation-vergence mismatch. Such a mismatch is considered undesirable and may cause discomfort in the user. It will be appreciated that the mismatch corresponds to distance (e.g., $V_d-A_d$) and may be characterized using diopters (units of reciprocal length, 1/m). For example, a $V_d$ of 1.75 diopter and an $A_d$ of 1.25 diopter, or a $V_d$ of 1.25 diopter and an $A_d$ of 1.75 diopter, would provide an accommodation-vergence mismatch of 0.5 diopter.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
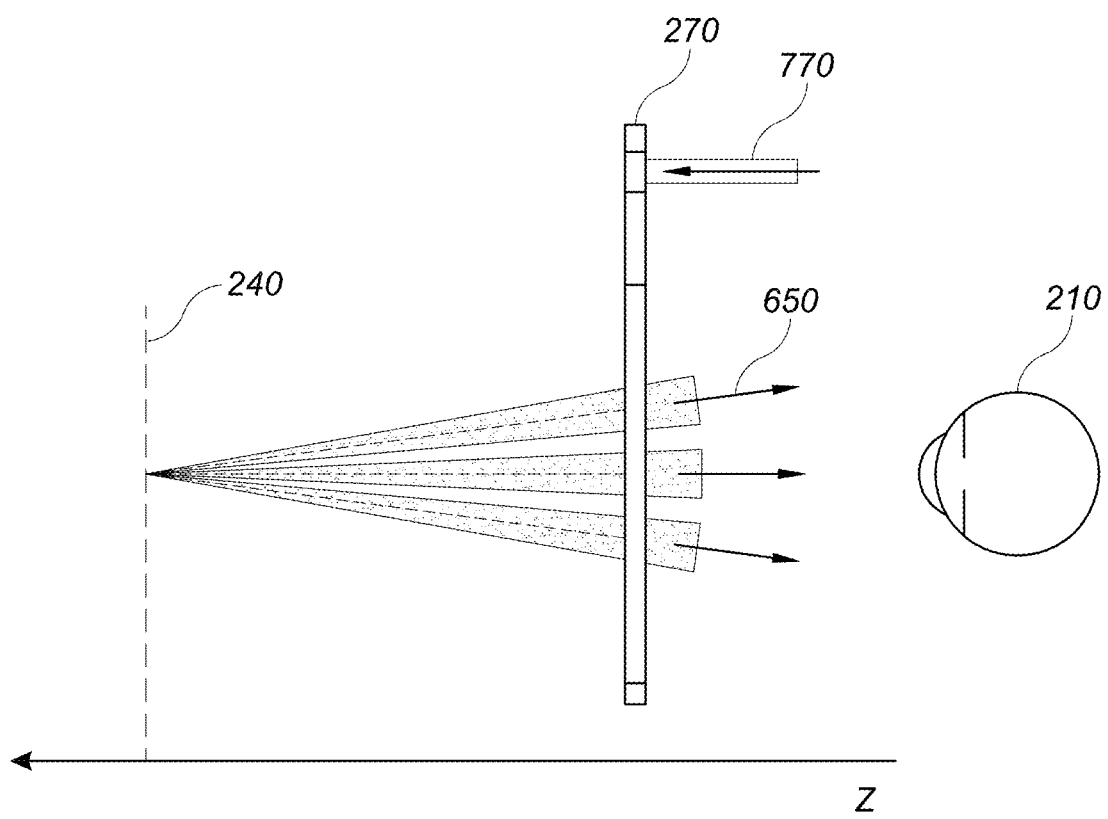
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated at a depth plane may follow the contours of a flat or a curved surface. In some embodiments, for simplicity, the depth planes may follow the contours of flat surfaces.

Figure 6:
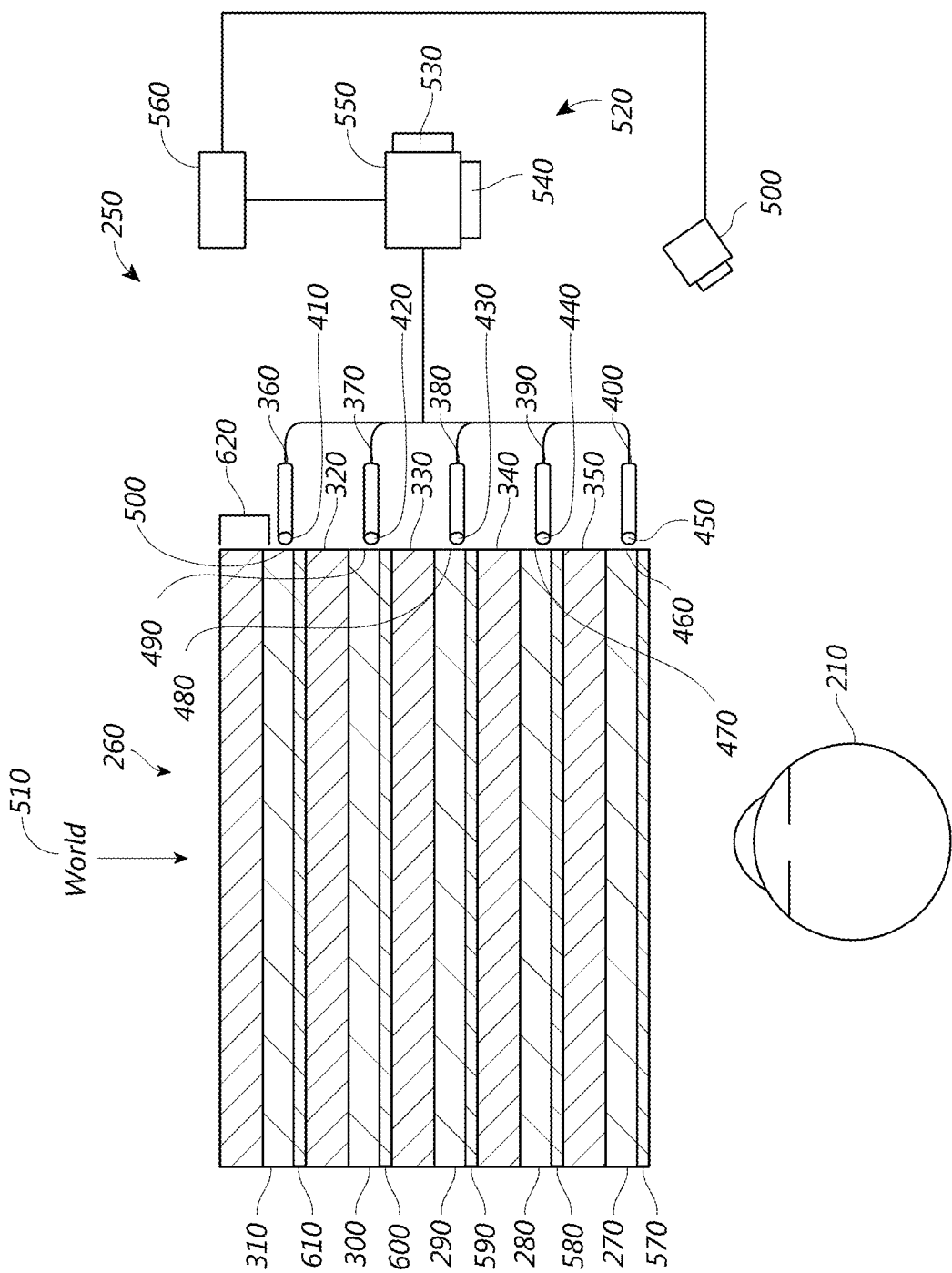
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

Figure 7:
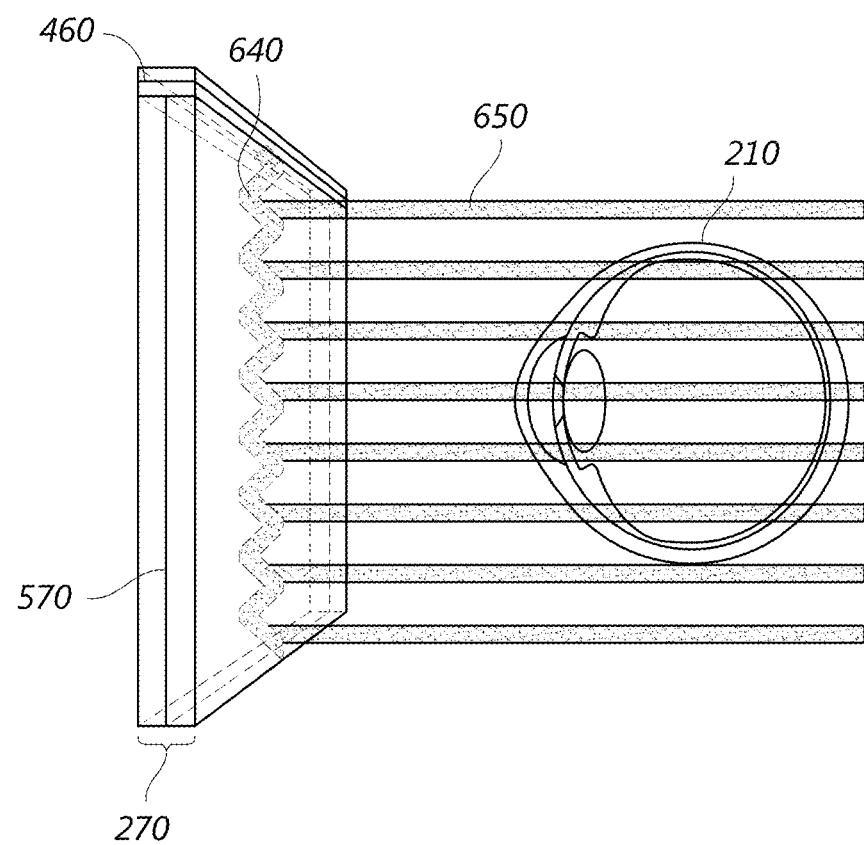
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
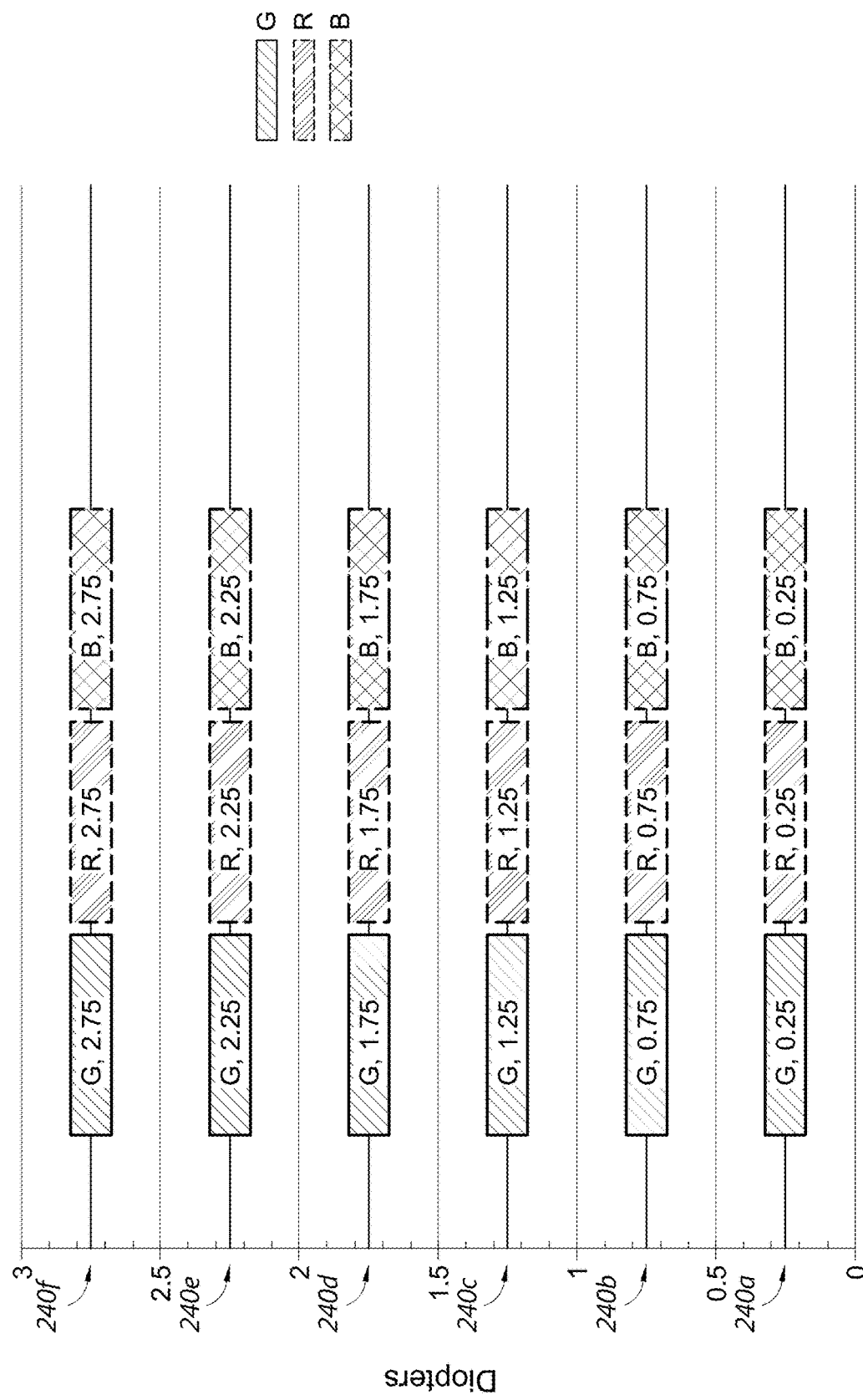
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
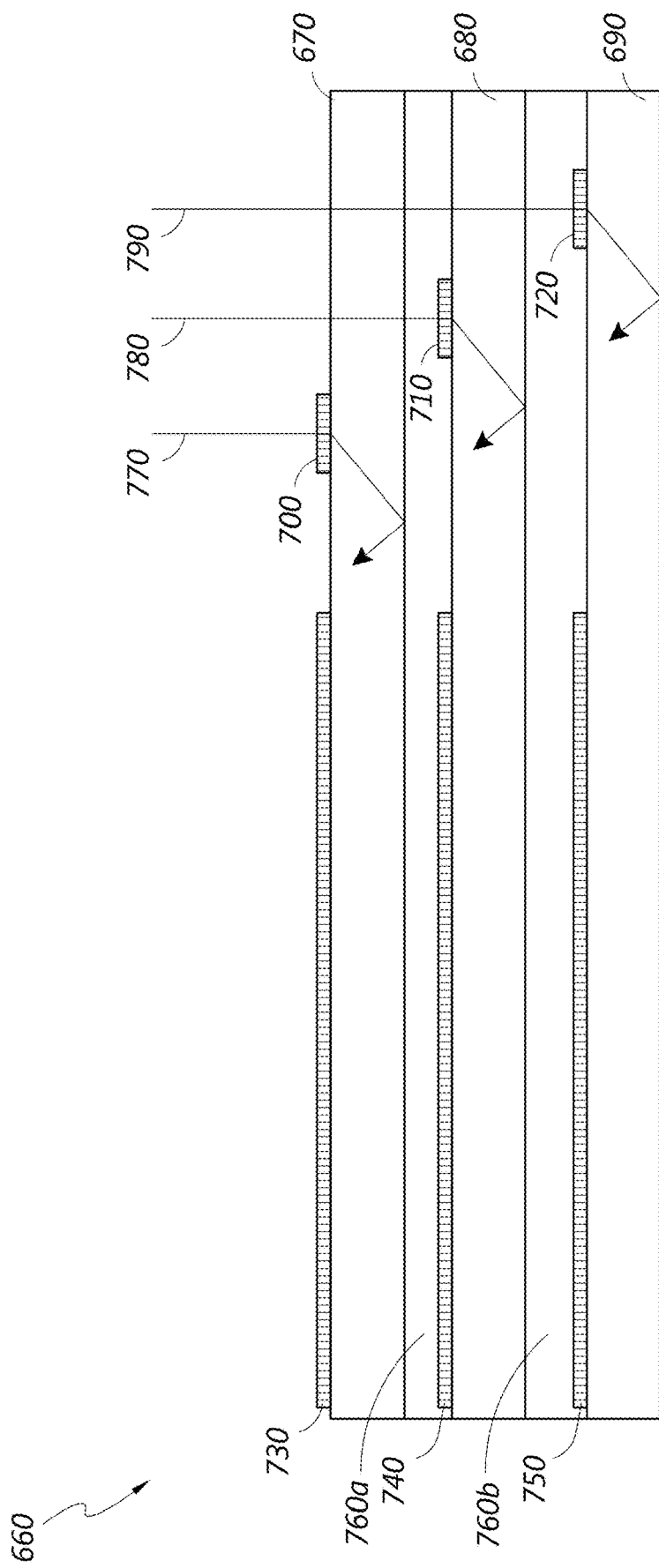
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (for example, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; for example, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
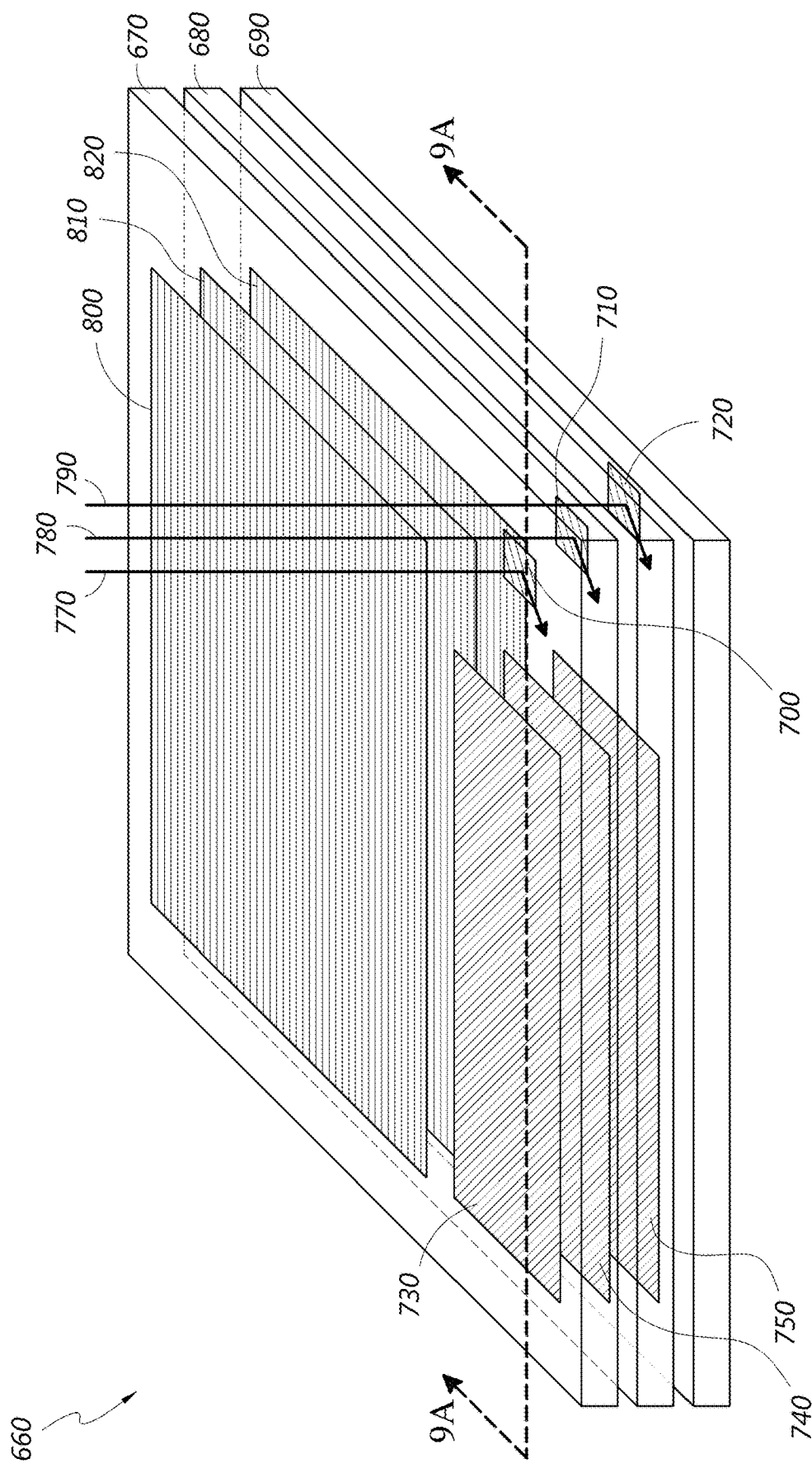
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
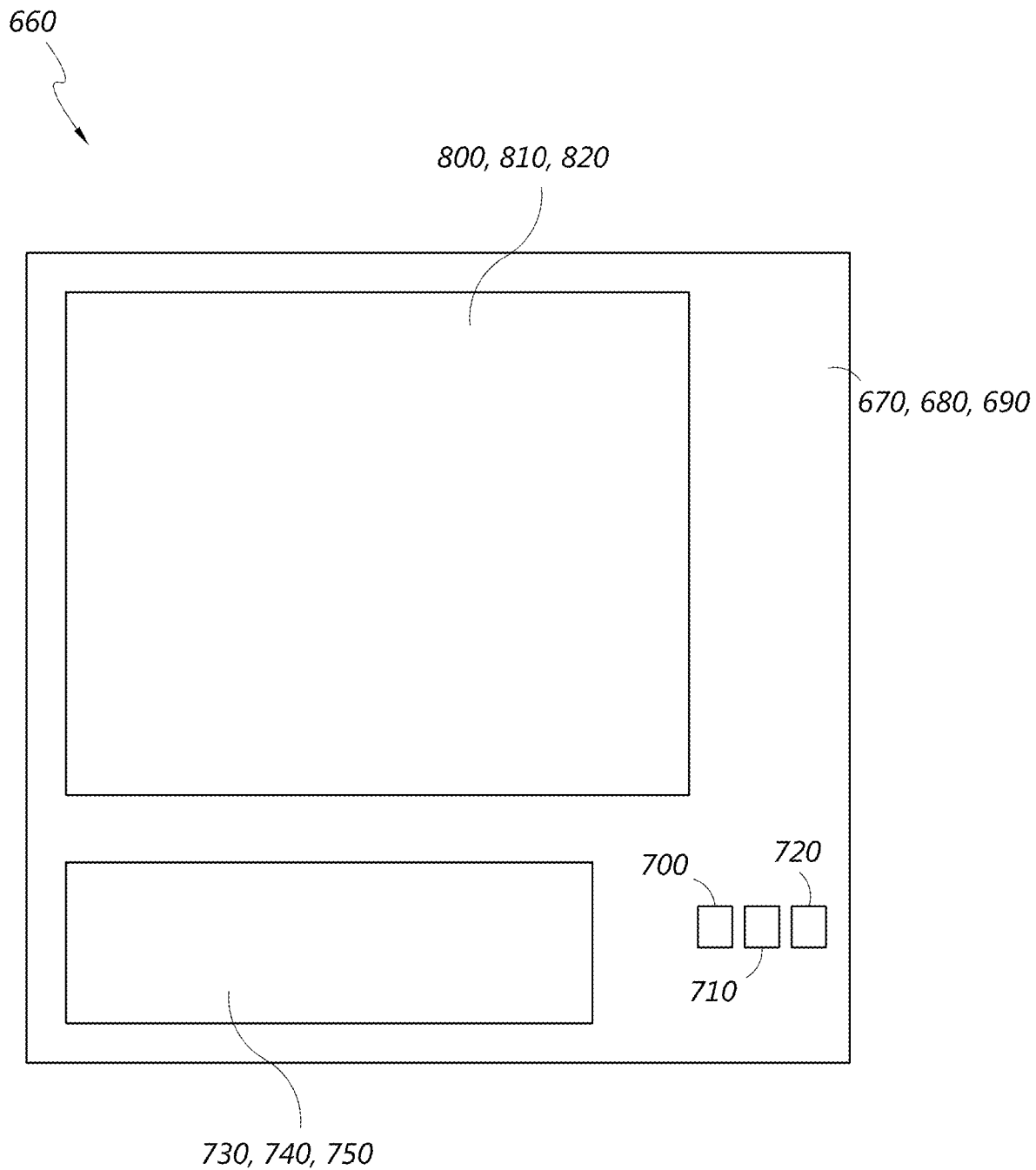
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Figure 9D:
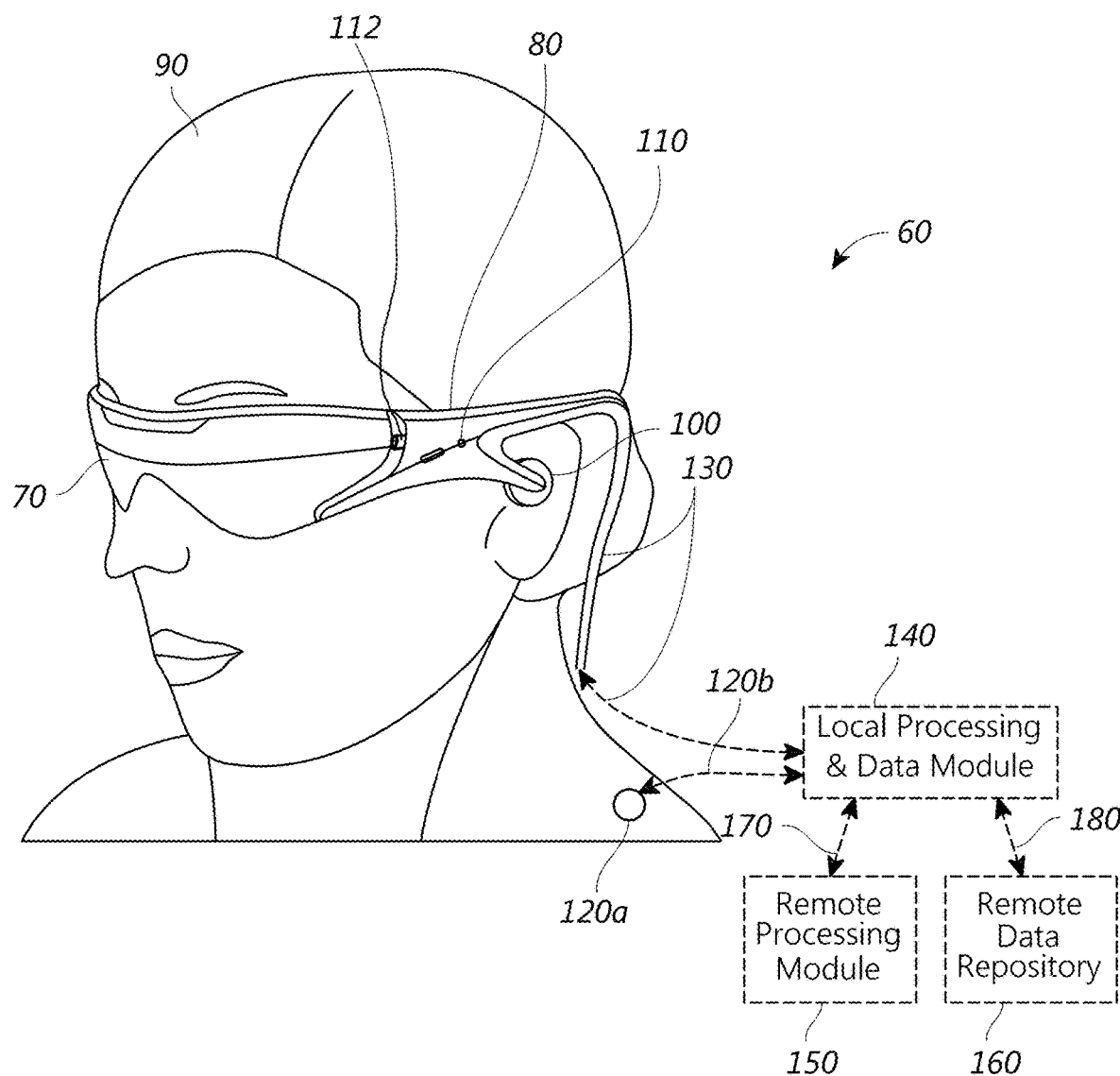
FIG. 9D illustrates an example of a wearable display system.

FIG. 9D illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system 60 may further include one or more outwardly-directed environmental sensors 112 configured to detect light, objects, stimuli, people, animals, locations, or other aspects of the world around the user. For example, environmental sensors 112 may include one or more cameras, which may be located, for example, facing outward so as to capture images similar to at least a portion of an ordinary field of view of the user 90. In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module.

Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Detection of Saccades

As described above, a display system (e.g., display system 60) may be configured to detect saccades during which a user advantageously has reduced visual perceptibility. In response, the display system may be configured to advantageously perform one or more actions to, e.g., (1) improve user experience and/or (2) reduce required computational resources or power usage. For example, the display system may detect an occurrence of a saccade and perform one or more display actions while the user's visual acuity or perceptibility is reduced, thereby effectively providing saccadic masking of the action. Example actions to improve user experience may include switching presentation of virtual content to the user from a first depth plane to a second depth plane, while masking the perceptibility of this switch. As described above, the display system may include a stack of waveguides that are configured to output light with different wavefront divergence. These wavefront divergences may correspond to discrete perceived depths from the user. As virtual content moves within the user's field of view (e.g., within a display frustum), the virtual content may be adjusted in perceived depth from the user. Thus, as virtual content exits depths covered by a first depth plane (e.g., a range of depths, such as measured in diopter), and enters depths covered by a second depth plane, the display system may switch between waveguides. This switching may introduce perceptible flicker to the user. In some embodiments, the display system may mask or hide this switching by performing the switch while the eyes are performing a saccade.

In some embodiments, the display system may reduce the usage of computational resources or power based on detection of saccades. In some embodiments, the reduction may occur for a duration of the saccade. For example, the display system may adjust a virtual content rendering setting (e.g., reduce a resolution at which virtual content is being rendered), a display setting (e.g., reduce a refresh rate of the presented virtual content, a brightness, contrast ratio, color settings, and so on), a power setting (e.g., clock speed of the CPU and/or GPU may be temporarily reduced, the display may be turned off, and so on). In the example of reducing resolution, the display system may reduce a polygon count associated with the virtual content, reduce texture information presented on the polygons, reduce lighting or other post-processing effects, and so on. As another example, the display may turn off presentation of virtual content.

In some embodiments, when reducing resolution, the display system may obtain information identifying a proximity of the virtual content to a gaze of the user. For example, the information may indicate a proximity of virtual content to a three-dimensional fixation point of the user. It will be appreciated that a visual acuity or perceptibility of a user may be reduced based on a distance (e.g., angular distance, three-dimensional distance) from a location at which the user is fixating. For example, visual acuity may be greatest at an immediately proximate a fixation point, and decrease in three dimensions away from the fixation point. Thus, in some embodiments, the display system may render virtual content at different resolutions based on respective distance of the virtual content from the fixation point. During a saccade, the display system may further reduce resolution of the virtual content. For particular virtual content located at greater than a threshold distance (e.g., angular distance) from the fixation point, the display system may stop presentation of the virtual content based on detection of a saccade. Examples of reducing resolution of virtual content are described in more detail in U.S. patent application Ser. No. 15/927,808, which is hereby incorporated by reference in its entirety.

As will be described below, the display system may utilize one or more sensors, such as cameras configured to detect infrared, visible, and/or ultraviolet light, to obtain sensor information, such as images, of the eyes of the user. For example, the sensors may be the camera assembly 630 described above. While reference below is made to use of cameras, it should be understood that additional sensors may be utilized to monitor eyes of the user. The display system may periodically obtain images of one or both of the user's eyes, for example based on a refresh rate of 30 Hz, 60 Hz, 120 Hz, and so on. Without being limited by theory, during a saccade it is believed that both eyes of the user may follow a same trajectory and perform the saccade at a same time. Thus, images of only one eye may advantageously be utilized. As described herein, optionally images of the other eye may be utilized for all other purposes (e.g., gaze detection) or to improve detection of saccades.

Additionally, the display system may set an exposure time (e.g., shutter speed) at a value such that motion of the eye may be captured. For a quick exposure time, the eye may be substantially frozen in the image such that determining blur may be difficult. In contrast, for a long exposure time the image of an eye may have too much motion—thus reducing a likelihood of separating saccades from normal eye movement. In some embodiments, the exposure time may be set at 5 milliseconds, 10 milliseconds, 15 milliseconds, and so on, such that the display system may detect motion blur that may correspond to a saccade. As described herein, the exposure time may optionally be variable and dynamically adjusted by the display system.

The display system may optionally analyze captured images to identify a specific portion of the eye, such as a pupil. For example, the display system may utilize machine learning techniques to identify the pupil. Example machine learning techniques may include neural networks trained to label portions of images that represent pupils. An example label may include an outline presented on an image that corresponds to an outline of a pupil. As another example, the display system may utilize edge detection techniques (e.g., Canny edge detector, and so on) to extract an outline of features of the eye. The display system may then analyze the outlines to determine an outline corresponding to a pupil (e.g., based on geometry information associated with pupils). Furthermore, the display system may utilize a zoom (e.g., optical or digital zoom) to focus on the user's pupils. For example, the display system may identify a location of the user's pupils, and increase the zoom until images obtained of the eyes are substantially of the pupil. Optionally, the display system may filter (e.g., remove) particular portions of the image. For example, the display system may remove eyelashes, skin, and so on, from the images prior to further analysis. In this way, computer vision and/or machine learning techniques employed thereafter may be improved through removal of extraneous information.

To determine whether the user is performing a saccade, the display system may determine measures or metrics associated with motion blur as represented in obtained images. For example, the display system may identify a saccade based on a single image. In other examples, the display system may compare successive images. The display system may compare these determined measures to one or more thresholds and determine whether the user is performing a saccade. For example, the display system may determine a likelihood or confidence score associated with the user performing a saccade.

In some embodiments, the display system may determine a direction and velocity of motion based on the determined motion blur. As will be described below, the direction and velocity may be used to inform a predictive component for eye tracking, such as to estimate how long the saccade might last for and where the saccade might end. Without being constrained by theory, the display system may utilize information describing relationships between saccade velocity and amplitude (e.g., angular distance). For example, a linear relationship may be known between saccade velocity and amplitude. Thus, a single image capture (e.g., one image frame or sampling time) may be indicative of both the position (e.g., current information) and the velocity (e.g., utilize to predict future information, such as where the saccade may end) of the user's eye.

As will be described below, the display system may utilize different schemes to determine measures associated with motion blur. For example, the display system may analyze an image in the frequency domain, and identify blur or rapid movement based on the frequency spectrum. As another example, the display system may perform convolutions of image kernels with the image. These image kernels may be linearly convolved in the time domain, or multiplied in the frequency domain, and results compared to thresholds. As another example, the display system may decompose the image into eigen-images, for example via Singular Value Decomposition. In this example, the decomposition may generate eigen-images, with the eigen-images presenting different scale space analyses of the image. For example, a first few most significant eigen-images (e.g., larger singular values) may represent large scale features of the image, while other eigen-images may represent finer detail. Since blurred portions of an image may preserve large scale features, while discarding finer detail, these eigen-images may be utilized to determine measures of blur.

Additional techniques to determine blur may be utilized, such as techniques based on geometrical information associated with a user's eyes. In this example, the display system may determine measures of elongation associated with a user's pupil. For example, since the exposure time may be set such that motion is obtained, the user's pupil may appear deformed in the image. The display system may determine information indicating a deformation of the pupil, and utilize the information to determine whether a saccade occurred. The deformation may be correlated with an angular distance covered by the saccade, and therefore for saccades of short duration (e.g., angular distance), the deformation may be small (e.g., minimal). Thus, the display system may optionally utilize this deformation information in addition to other techniques described herein (e.g., frequency spectrum techniques, kernel-based techniques, and so on).

As another example, the display system may monitor for changes in a quantity of identifiable eye features of the user between successive images. For example, eye features may comprise particular blood cells, iris pattern (e.g., folds, ridges), and so on. As mentioned above, example descriptions of eye features and identifying eye features is described in more detail in U.S. Publication No. 2017/0109580, which is incorporated by reference herein in its entirety for all purposes. In this example, the display system may determine an occurrence of a saccade if in a particular image the display system may identify less than a threshold number of eye features. As an example, the display system may be able to normally identify a particular number of eye features, such as 20, 25, 30. During a saccade, these eye features may appear blurry and thus may not be identified. Therefore, an image for which 10, 15, and so on, eye features may be identified, may be classified as representing a saccade. While the display system may determine occurrence of a saccade based on a number of identified eye features being less than a threshold, the display system may also determine a saccade based on a difference in eye features identified between successive images being greater than a threshold. For example, the display system may identify a particular reduction in the number of identified eye features as corresponding to a saccade. In this way, the display system may utilize the effects of motion blur (e.g., degradation of fine detail in images) to determine occurrence of saccades. In some embodiments, the display system may compare eye features of a user identified in an image to known eye features of the user, such as those represented in an iris code or a biometric authentication template stored in association with the user. In some of these embodiments, the display system may generate a confidence score indicating a level of confidence that an eye shown in an image matches a known eye of a user based on such an eye feature comparison, and may determine occurrence of a saccade based on the confidence score being less than a threshold. In some examples, the display system may determine occurrence of a saccade based on a relative change in confidence score being greater than a threshold. It follows that, in such embodiments, the set of known eye features of the user may be selected through one or more biometric authentication processes or otherwise ahead of time before saccade detection processes are carried out. Example descriptions of eye features, iris codes, and the generation of confidence scores in association therewith is described in more detail in U.S. Publication No. 2017/0206412, which is incorporated by reference herein in its entirety for all purposes. Furthermore, additional information regarding blur metrics and the effect that motion blur may have on eye feature detection processes can also be found in U.S. Publication No. 2017/0206412.

In some examples, the display system may identify a contour of the pupil or iris using one or more machine learning and/or edge detection techniques. In a manner similar to that which has been described above with reference to eye feature detection, in some embodiments, the display system may generate a confidence score indicating a level of confidence that one or more edges (e.g., along the border of a pupil, along the border of an iris, etc.) have been correctly identified, and may determine occurrence of a saccade based on the confidence score being less than a threshold. In some examples, the display system may determine occurrence of a saccade based on a relative change in confidence score being greater than a threshold. The various thresholds described herein may be fixed values or may be variable values that are dynamically adjusted based on one or more parameters (e.g., user preferences, user identity, preceding images, etc.).

Figure 10A:
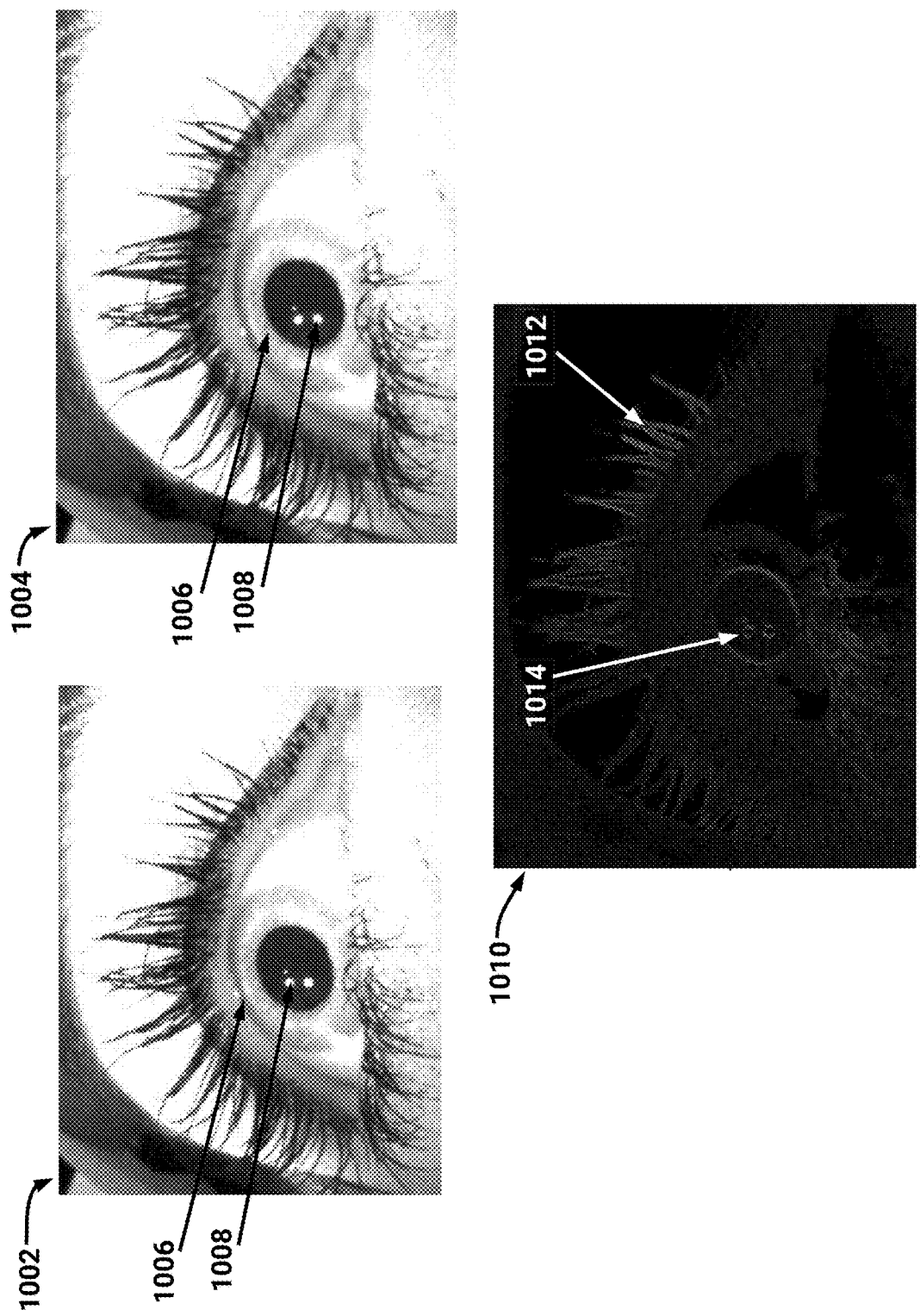
FIG. 10A illustrates example images of a user's eye as obtained by a display system.
Figure 15A:
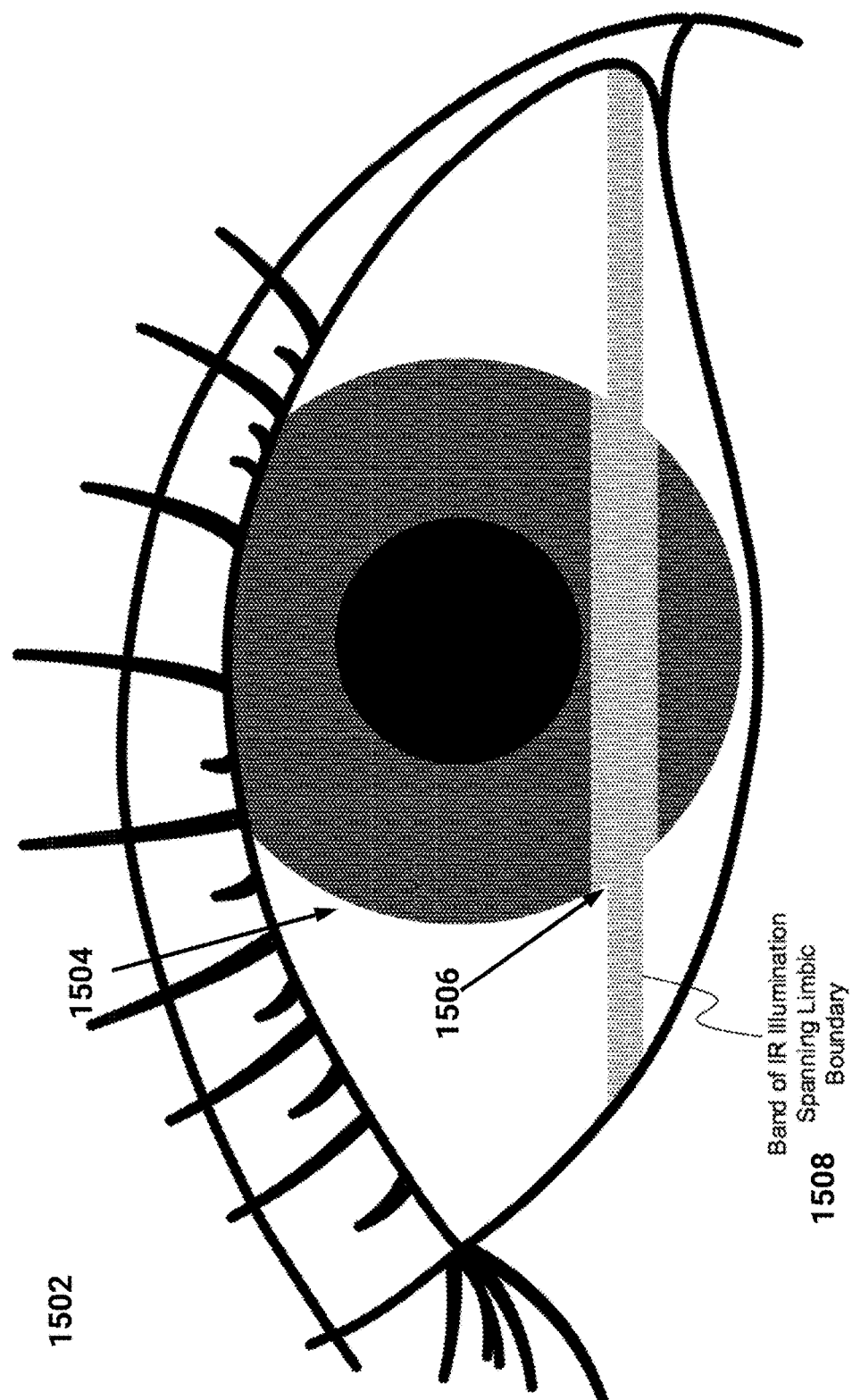
FIGS. 15A-15B illustrate another example scheme to determine performance of a saccade based on reflected infrared light.
Figure 15B:
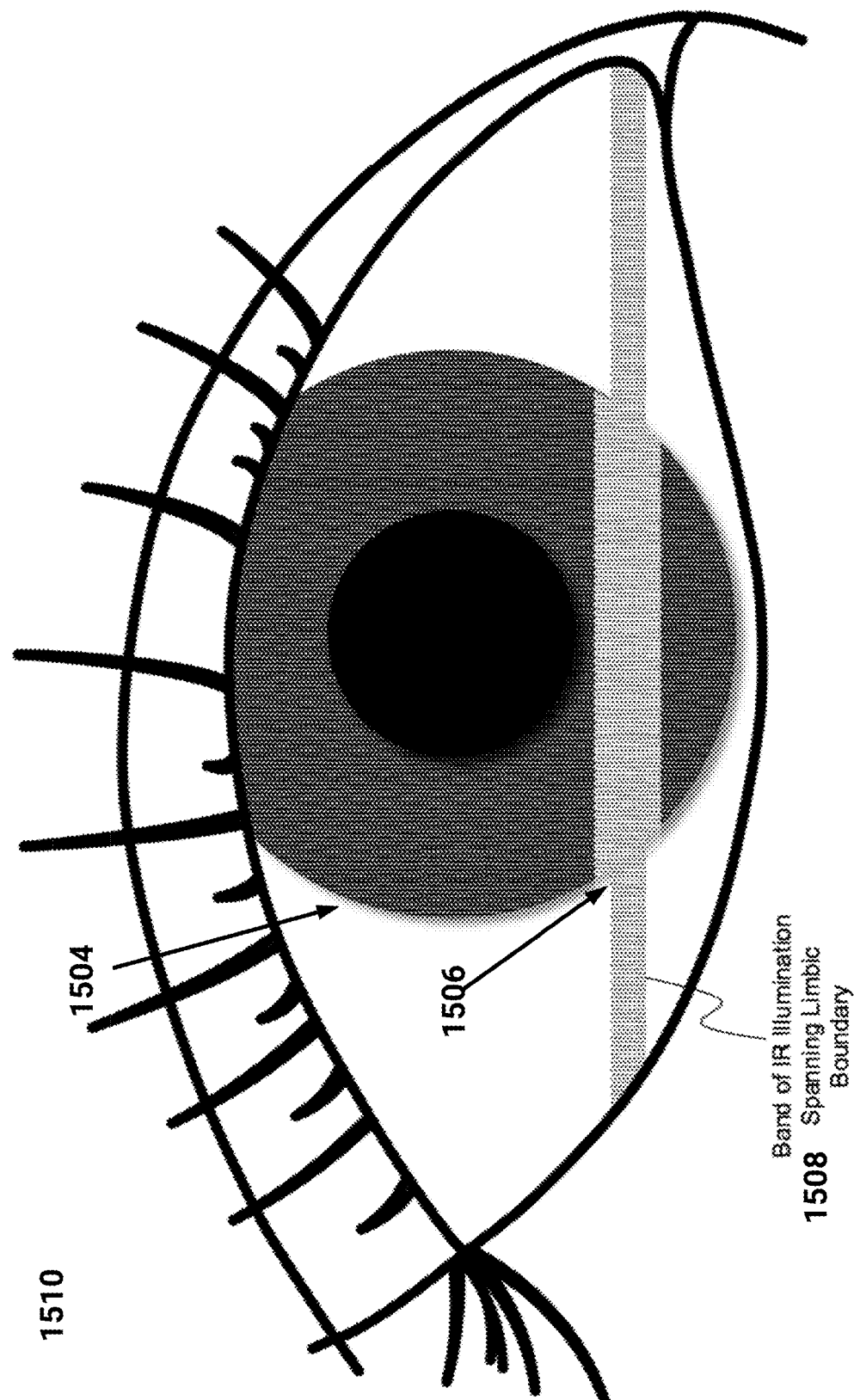

In some embodiments, the display system may output light, such as infrared light, and may detect reflections (e.g., corneal reflections or 'glints') on the user's eyes in obtained images. A shape of these glints may be known to the display system, such that the display system may determine measures of deformity or blur of the glints. If the deformity or blur exceeds one or more thresholds, the display system may determine an occurrence of a saccade. Examples of infrared light images are illustrated in FIGS. 10A-10B. Additionally, the display system may output infrared light as a band or strip of light. The band or strip of light may encompass the user's iris and sclera (e.g., the limbic boundary). For example, FIGS. 15A-15B illustrate images having a band or strip of light on a user's eye. In some embodiments, the angle at which such light is projected onto the user's eye may be substantially uniform across the band or strip. Although primarily described herein with band or strip geometries, it is to be understood that any of a variety of illumination geometries (e.g., an ellipsoid, a square, etc.) and patterns (e.g., an array or row of distinct beams, a series of bands or strips, etc.) may be projected over at least a portion of the limbic boundary of the user's eye. The display system may analyze the limbic boundary for changes (e.g., from a prior image), or to determine measures of motion blur of the limbic boundary. For example, the limbic boundary may deform and/or exhibit motion blur as the user moves his/her eyes (e.g., the user performs a saccade). It will be appreciated that the various techniques described herein for determining whether saccade is being performed may be applied separately or in conjunction with one or more other saccade detection techniques described herein. Utilizing multiple techniques may advantageously increase the accuracy of the determination.

FIG. 10A illustrates example images 1002, 1004, of a user's eye as obtained by a display system (e.g., the display system 60) according to a first example scheme for detecting a saccade. As described herein, the display system may utilize a camera to periodically obtain images of a user's eye. FIG. 10A illustrates a first image 1002 of the user's eye, for example obtained at a particular time associated with a refresh rate set by the display system (e.g., 30 Hz, 60 Hz, and so on as described above). The first image 1002 includes the user's eye 1006 along with infrared glints 1008 reflected from infrared light output by the display system on the eye 1006. As will be described in more detail below, the display system may analyze this first image 1002 to determine whether a saccade is being performed. FIG. 10A further illustrates a second image 1004 of the user's eye 1006. The display device may obtain this second image 1004 after a threshold amount of time (e.g., 0.333 seconds, 0.0166 seconds, and so on). Similar to the first image 1002, infrared glints 1008 are illustrated in the second image 1004.

In the first example scheme, to determine an occurrence of a saccade a display system may compare successive images of the user's eyes 1006 and/or glints 1008. For example, the display system may generate a difference image 1010 representing a difference between the images 1004, 1002. As illustrated, the difference image 1010 highlights distinctions between the images 1004, 1002, with the distinctions between a particular color (e.g., white). These distinctions may therefore represent movement between the images 1004, 1002. For example, the user's eyelashes 1012 are illustrated as having moved. Similarly, movement in the glints 1014 is illustrated. The display system may determine degrees of movement, for example in the glints 1014, and based on the movement determine whether a saccade occurred.

In this example scheme, since the difference image 1010 illustrates small movements, the display system may determine that no saccade is being performed. For example, the display system may include thresholds for the lateral displacement of features in the difference image 1010. If the lateral displacement is less than the threshold, then the display system may be configured to determine that no saccade is being performed by the eyes of the user. Instead, the display system may determine that a saccade is being performed in a third obtained image 1020 illustrated in FIG. 10B.

FIG. 10B illustrates additional example images 1004, 1020, of the user's eye. As illustrated, the third obtained image 1020 includes the user's eye 1006 and glints 1008. In this third image 1020, the glints 1008 appear moved with respect to their positions in second image 1004. The display system may similarly generate a difference image 1022 between the second image 1004 and third image 1020. This difference image 1022 more strongly illustrates movement of eye features between the third image 1020 and second image 1004, as compared to the difference image 1010 illustrated in FIG. 10A.

Thus, based on difference image 1020, the display system may determine an occurrence of a saccade, e.g., because the movement of the glints 1008 have been determined to move more than a predetermined threshold. As described above, the display system may therefore perform actions such as performing a depth plane switch. However, this example scheme may result in detection of a saccade too late, such that the user may complete the saccade during performance of the actions. Thus, and as an example, the user may be able to perceive the depth plane switch. However, based on the techniques described herein, for example at least in FIG. 11A, the display system may advantageously be able to determine performance of a saccade based on the second image 1004 (e.g., one frame sooner), as early signs of saccadic movement may be expressed in the second image 1004. Thus, the display system may perform a depth plane switch thereafter, such that as the saccade is being performed (e.g., represented in the third image 1020) the depth plane switch will not be noticeable. To determine the occurrence of a saccade in the second image 1004, the display system may determine measures associated with blur as described herein.

Figure 11A:
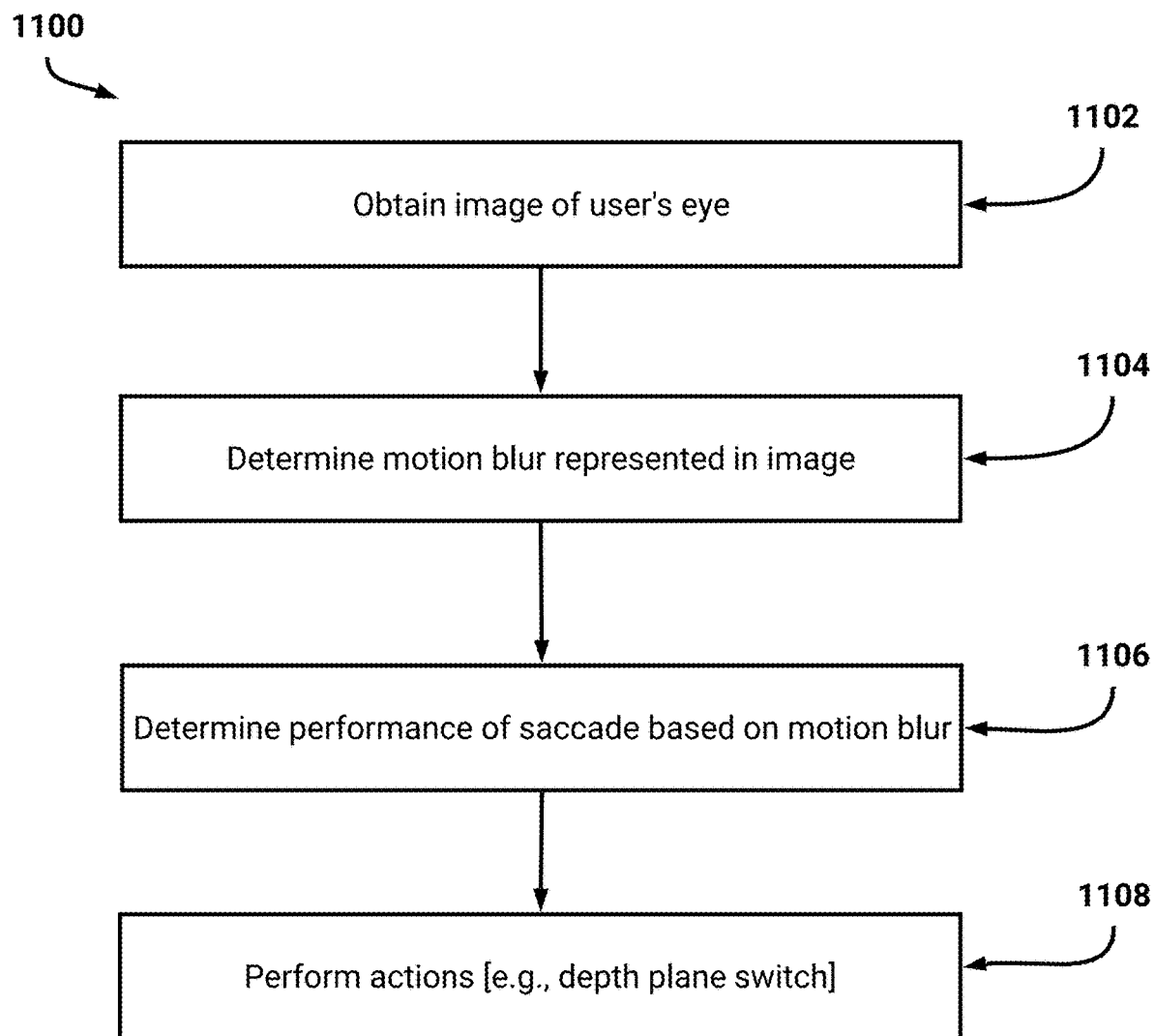
FIG. 11A illustrates an example process for performing display system actions based on user saccades.

FIG. 11A illustrates an example process 1100 for determining occurrence of an event during which a user has reduced visual perceptibility. For convenience, the process 1100 may be described as being performed by a display system (e.g., the display system 60, which may include processing hardware and software, and optionally may provide information to an outside system of one or more computers or other processing device, for instance to offload processing to the outside system, and receive information from the outside system).

At block 1102, the display system obtains an image of a user's eye. As described above, the display system may periodically obtain images for analysis. For example, the display system may trigger a camera (e.g., camera assembly 630) to capture the image and then obtain image information from the camera. The display system may set an exposure time for the image such that motion blur may be evident in the obtained image (e.g., 10 ms, 15 ms, and so on). Optionally, the frame rate at which images are obtained (e.g., 30 Hz, 60 Hz, and so on as described above) may remain static, or constant, while the exposure time may optionally be variable (e.g., dynamically adjustable). Optionally, the frame rate may be dynamically adjusted (e.g., based on operating parameters). For a camera having a shutter (e.g., a digital single lens reflex camera, particular mirrorless cameras, and so on), the camera may expose a digital sensor for the exposure time prior to closing the shutting. For a camera that is shutterless (e.g., a mobile camera), the camera may utilize light exposed on a digital sensor for the exposure time.

In some embodiments, the display system may dynamically adjust the exposure time. For example, an exposure time may be selected by the display system (e.g., from a range of exposure times) based on a type of information being determined. In the example of FIG. 11A, the display system is determining occurrence of a saccade. In other examples however, the display system may obtain an image to determine a gaze associated with the user's eye. For example, the display system may utilize a geometry of the user's eye to determine a vector extending from the user's fovea. The display system may therefore select a shorter exposure time to reduce existence of motion blur. Additionally, the display system may perform a biometric authentication process based on an image of the user's eye. For example, the display system may compare known eye features of the user's user to eye features identified in the image. Thus, the display system may similarly select a shorter exposure time to reduce existence of motion blur.

When dynamically adjusting the exposure time, the display system may alternate between a long exposure time mode and a short exposure time mode. In the long exposure mode, the display system may obtain images using a first exposure time (e.g., 2 ms or more, 5 ms or more, 10 ms or more, or 20 ms or more; including 2 ms, 5 ms, 10 ms, or 20 ms), and in the short exposure mode, the display system may obtain images using a second exposure time (e.g., 1.2 ms or less, 1 ms or less, 0.7 ms or less, 0.2 ms or less, or 0.1 ms or less; including 1.2 ms, 1 ms, 0.7 ms, 0.2 ms, or 0.1 ms) that is shorter in duration than the first exposure time. For example, the display system may obtain an image at the first exposure time to determine whether the user is performing a saccade, and then subsequently obtain an image at the second exposure time. Additionally, particular conditions of the display system or user may inform whether images are to be obtained at the first or second exposure time. For example, the display system may switch from the short exposure mode to the long exposure mode in response to determining that an accommodation vergence mismatch exceeds one or more threshold values. In this way, the display system may begin to obtain images using the first exposure time (e.g., to determine whether the user is performing a saccade) in anticipation of a depth plane switch. In some embodiments, the first exposure time may be greater than 1 ms (e.g., 2 ms or more, 5 ms or more, 10 ms or more, or 20 ms or more; including 2 ms, 5 ms, 10 ms, or 20 ms) and/or the second exposure time may be less than or equal to 1 ms (e.g., 1 ms or less, 0.7 ms or less, 0.2 ms or less, or 0.1 ms or less; including 1 ms, 0.7 ms, 0.2 ms, or 0.1 ms). In some examples, the first exposure time may be greater than 1.2 ms (e.g., 2 ms or more, 5 ms or more, 10 ms or more, or 20 ms or more; including 2 ms, 5 ms, 10 ms, or 20 ms) and/or the second exposure time may be less than or equal to 1.2 ms (e.g., 1.2 ms or less, 1 ms or less, 0.7 ms or less, 0.2 ms or less, or 0.1 ms or less; including 1.2 ms, 1 ms, 0.7 ms, 0.2 ms, or 0.1 ms).

In some embodiments, the display system may dynamically adjust one or more of the exposure times. For example, the display system may increase or decrease the first exposure time used for saccade detection. In this example, the display system may determine that measures associated with motion blur are too high or too low. For example, the measures may not be accurately detecting, or over detecting, saccades due to the exposure time. For example, the display system may be configured to perform saccade detection using both motion blur detection and comparisons between successively-captured image frames. Assuming that the comparisons between image frames provide more accurate determination of the occurrence of saccades, the results provided by comparing multiple imageries may be used as a reference and the motion blur detection may be adjusted until a desired (e.g., high) level of agreement is reached between the results of the two schemes for saccade detection. If the image frame comparison indicates that saccades are being under detected, the display system may be configured to increase the exposure time. Conversely, if saccades are being falsely detected, then the exposure time may be decreased. In some embodiments, the display system may select one or more of the exposure times from a predetermined range of exposure times. For example, the lower bound of such a predetermined range of exposure times may be 0.1 ms or 0.2 ms, and the upper bound of such a predetermined range of exposure times may be 15 ms or 25 ms. In some embodiments, the display system may select one or more of the exposure times from a plurality of different exposure times. For example, the plurality of different exposure times may include exposure times that are greater than or equal to 0.1 ms or 0.2 ms and less than or equal to 15 ms or 25 ms.

In some embodiments, when performing a biometric authentication process, or when determining a gaze of the user, the display system may also adjust the exposure time. For example, the display system may dynamically reduce the exposure time to reduce motion blur, or the display system may increase the exposure time if the obtained images are not properly exposed (e.g., if the images are too dark).

In some embodiments, the display system may utilize the same camera for each image obtained of the user's eye. For example, the display system may comprise a camera pointing at a particular eye of the user. As described above, it may be understood that when a user performs a saccade, both eyes may move in a corresponding manner (e.g., at a similar velocity and amplitude). Thus, the display system may utilize images of the same eye to reliably determine whether a saccade is being performed. Optionally, the display system may comprise cameras pointing at each eye of the user. In such embodiments, the display system may optionally utilize the same camera to obtain images of the same eye or may select a camera to utilize. For example, the display system may select a camera that is not being currently utilized. The display system may obtain images of the user's eyes for purpose other than determining the occurrence of saccades. As an example, the display system may perform gaze detection (e.g., the display system may determine a three-dimensional point at which the user is fixating), biometric authentication (e.g., the display system may determine whether a user's eye matches with a known eye), and so on. In some embodiments, when the display system provides a command that an image is to be taken, one of the cameras may be in use. Therefore, the display system may select a camera not in use to obtain the image to be used for saccade detection.

Optionally, the display system may trigger both cameras to obtain images at the same time. For example, each camera may obtain an image at a respective exposure time. In this way, the display system may obtain a first image of a first eye to determine measures of motion blur, while obtaining a second image of a second eye to determine other information (e.g., information to be used for gaze detection, authentication, and so on). Optionally, both images may be utilized to determine whether the user is performing a saccade. For example, and as will be described in more detail below, the display system may determine deformation of features (e.g., an eye of the user, an infrared glint, and so on) illustrated in the first image as compared to the same features as illustrated in the second image. Optionally, the display system may cause each camera to alternate between two exposure values, for example out of phase from each other. For example, a first camera may obtain an image at a first exposure value, and at the same time a second camera may obtain an image at a second exposure value. Subsequently, the first camera may obtain an image at the second exposure value, and the second camera may obtain an image at the first exposure value. In some embodiments, one or more of the display system architectures and methods of operation described above may be employed to detect excessive movements of the display system and/or user's head (e.g., movements corresponding to reduced visual acuity or perceptibility) and adjust one or more operating parameters on the basis thereof, as described in further detail below with reference to FIGS. 16-19.

At block 1104, the display system determines whether motion blur is represented in the image. The display system may employ one or more schemes to determine whether motion blur is present. The schemes may be applied to portions of the image, such as the pupil, iris, limbic boundary, and so on as described herein. An example of the display system identifying a pupil in the obtained image is described below, with respect to FIG. 11B. As described herein, example schemes may include frequency spectrum-based techniques, convolutional techniques, deep learning or other machine learning techniques, geometrical techniques, techniques that rely on identification of eye features, techniques that utilize infrared reflections from the user's eye, and so on.

The display system may optionally utilize a particular scheme based on particular detected information. For example, one or more schemes may be preferable when the user is in a dark area. In this example, the display system may prefer to utilize techniques that utilize infrared reflections. Thus, prior to obtaining the image (e.g., described in block 1102), the display system may optionally determine a measure of brightness of the ambient environment. The display system may then cause infrared lights to be turned on (e.g., infrared glints, an infrared band or strip), and thus reflected from the user's eye. As another example, the display system may be configured to utilize frequency spectrum-based techniques or convolutional techniques in nominal or bright lighting environments.

Additionally, the display system may request (e.g., periodically) whether the user was able to perceive actions performed in response to detection of saccades. For example, the display system may present information to the user (e.g., virtual content) requesting whether the user perceived a switch between a first depth plane and a second depth plane (e.g., over a period of time). In some embodiments, the user may utilize his/her hands, or an input device, to specify whether the user was able to perceive an action. The display system may therefore identify motion blur determination schemes that are associated with the least perception of depth plane switches, or reductions in rendering quality. User responses may be aggregated, for example, by an outside system, and information determined from the aggregation may be provided to the display system. For example, responses from multitudes of users may be aggregated to determine a most effective scheme.

Optionally, the display system may perform multiple of the schemes to improve determination of motion blur. For example, the display system may perform each scheme (e.g., in parallel) and then compare results generated by each scheme. The display system may optionally assign a weight to each measure, and combine the measures to obtain an average or weighted average measure. The weights may optionally be determined based on user responses to perception of depth plane switches or reductions in render quality (e.g., aggregated user responses). This average or weighted average measure may then be compared to a threshold to determine whether the measured blur is greater than the threshold, and thus indicates occurrence of a saccade. Optionally, the display system may utilize a voting scheme, with each motion blur determination scheme associated with a vote. The display system may determine occurrence of a saccade based on a threshold number of the schemes voting that the determined motion blur is greater than a respective threshold. Optionally, each vote may be augmented according to a confidence associated with the determined measure. For example, the display system may determine measures of confidence for each motion blur scheme. As an example, the display system may determine whether the spectral frequency of the image strongly indicates motion along a particular direction with a particular magnitude. If the frequency spectrum indicates motion along different directions, the display system may assign a lesser confidence and thus a lesser weight to this vote.

At block 1106, the display system determines whether the user performed a saccade based on determined motion blur. As described above, the display system may determine measures of motion blur based on one or more schemes. These determined measures may be compared to respective thresholds to ascertain whether the measures indicate motion blur at a sufficiently high level to correspond to a saccade. Optionally, the display system may determine a confidence score or likelihood associated with the determination. For example, measures closer to respective thresholds may be associated with reduced confidence scores or likelihoods. The confidence score may optionally be determined via machine learning techniques. For example, the display system may provide the determined measures of motion blur (e.g., via one or more motion blur determination schemes), optionally along with other information, to a machine learning model to determine the confidence score. Other information may include environmental characteristics, such as light, temperature, and so on. Additionally, the information may describe the virtual content being presented to the user. For example, the virtual content may be text in which the user is jumping his/her eyes around in. All of these variables may be taken into account by the machine learning model to provide a confidence score, which then may be used to provide different weights to the determinations made by different schemes.

In some embodiments, a user may set information indicating whether the user prefers more or less aggressive saccade determinations. For example, a more aggressive saccade determination may enable a lower confidence score to cause the display system to perform actions, such as depth plane switching or rendering quality reductions. It will be appreciated different levels of aggressiveness for the saccade determination may be tied to, e.g., the sensitivity of the user to depth plane switching and/or rendering quality reductions.

While the description herein has described depth plane switching being performed based on detection of a saccade, the display system may automatically switch a depth plane without detection of a saccade. For example, upon identifying that a switching of depth planes is to occur, the display system may store information (e.g., a flag) indicating that upon detection of a saccade by the user, the display system is to perform the switch to the selected depth plane. If subsequently the display system does not detect a saccade, the display system may automatically switch presentation to a new depth plane based on a threshold amount of time being exceeded.

At block 1108, the display system performs one or more actions in response to a positive determination of an occurrence of a saccade. As described above, the display system may delay switching from a first depth plane to a second depth plane until occurrence of a saccade. Additionally, the display system may reduce a rendering quality (e.g., resolution) of virtual content during occurrence of the saccade.

Figure 11B:
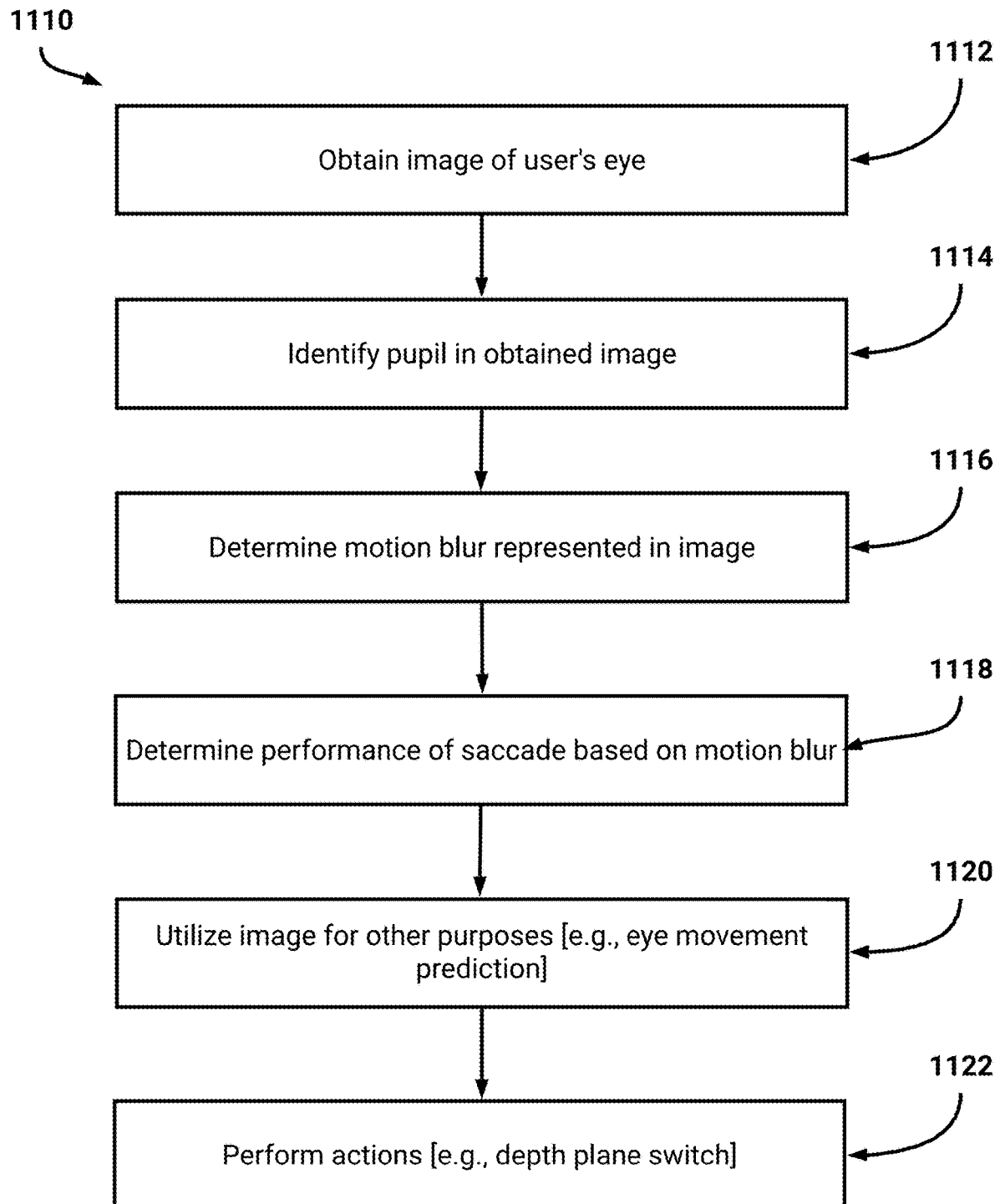
FIG. 11B illustrates another example process for performing display system actions based on user saccades.

FIG. 11B illustrates another example process 1110 for determining occurrence of a saccade. For convenience, the process 1110 may be described as being performed by a display system (e.g., the display system 60, which may include processing hardware and software, and optionally may provide information to an outside system of one or more computers or other processing device, for instance to offload processing to the outside system, and receive information from the outside system).

At block 1112 the display system obtains an image of a user's eye, for example as described in FIG. 11A above regarding block 1102.

At block 1114, in some embodiments the display system identifies a pupil in the obtained image (e.g., an image with an exposure time such that motion blur may be evident). As described above, the display system may utilize machine learning techniques or computer vision techniques to identify the pupil. For example, a trained neural network may be utilized to identify a contour of the pupil. As another example, edge detection techniques may inform the contour of the pupil. Thus, the display system may isolate a region of interest for determining performance of a saccade. As will be described below, the display system may determine a measure of deformation or elongation of the pupil in the image. Additionally, the display system may convolve an image portion illustrating the pupil, or portions thereof, with one or more image kernels to determine measures of motion blur.

At block 1116 the display system determines motion blur represented in the image, for example as described in FIG. 11A regarding block 1104. At block 1118 the display system determines whether the image illustrates performance of a saccade. Block 1118 may be similar to block 1106 of FIG. 11A.

At block 1120, the display system may utilize the obtained image for disparate purposes in some embodiments. For example, different processing modules or routines may opportunistically utilize the image. These different processing modules or routines may utilize the image in parallel with the display system determining whether the image illustrates performance of a saccade by the user's eyes. Additionally, block 1120 may be performed subsequent to obtaining the image without waiting for subsequent blocks to be performed (e.g., measures of motion blur). In some embodiments, block 1120 may be performed subsequent to block 1116 or 1118, for example particular processing modules or routines may utilize the information determined in blocks 1116 and 1118 (e.g., the modules or routines may utilize a determined magnitude and direction of motion blur).

In some embodiments, the display system may be configured to determine, at least in part, a gaze of the user at block 1120. For example, the display system may determine a centroid of a fovea in a captured image. The display system may then identify a vector extending from the fovea as representing a gaze of the user's eye. If the display system has an image of the other eye, the display system may similarly determine a vector extending from the other eye. An intersection in three-dimensional space corresponds to a point at which the user is fixating.

In some embodiments, the display system may be configured to predict eye movement at block 1120. As will be described in more detail below, with respect to FIG. 12A, the display system may determine measures of motion blur based on a frequency spectrum scheme. The display system may determine a magnitude of the motion blur optionally along with a direction associated with the blur based on, for example, a Fourier transform of the image. Based on the magnitude and direction, the display system may estimate a location at which the eye is expected to focus (e.g., subsequent to a saccade).

As described above, the velocity of a saccade may be correlated (e.g., linearly correlated) with the amplitude of the saccade. Thus, based on the exposure time of the image the display system may estimate velocity according to a determined magnitude of motion blur. The display system may correlate the determined magnitude with amplitude (e.g., angular distance) to determine an estimated eye movement caused by the saccade. In this way, the display system may estimate a location at which the user will be fixating subsequent to the saccade. In some embodiments, the location may indicate a vector along with a final three-dimensional fixation point.

At block 1122 the display systems performs one or more actions in response to determining performance of a saccade, for example as described above in FIG. 11A for block 1108. In some examples, the operations described with reference to block 1120 may be performed after those described with reference to block 1122, performed independently from those described with reference to block 1122, or omitted from example process 1110.

Optionally, the display system may obtain a subsequent image (e.g., at the static or fixed frame rate as described above), and analyze the subsequent image. Optionally, the display system may discard the obtained image described in block 1102 (e.g., based on the image being blurry, out of focus, or having one or more quality thresholds be below a threshold). The display system may then utilize the subsequent image.

Figure 12A:
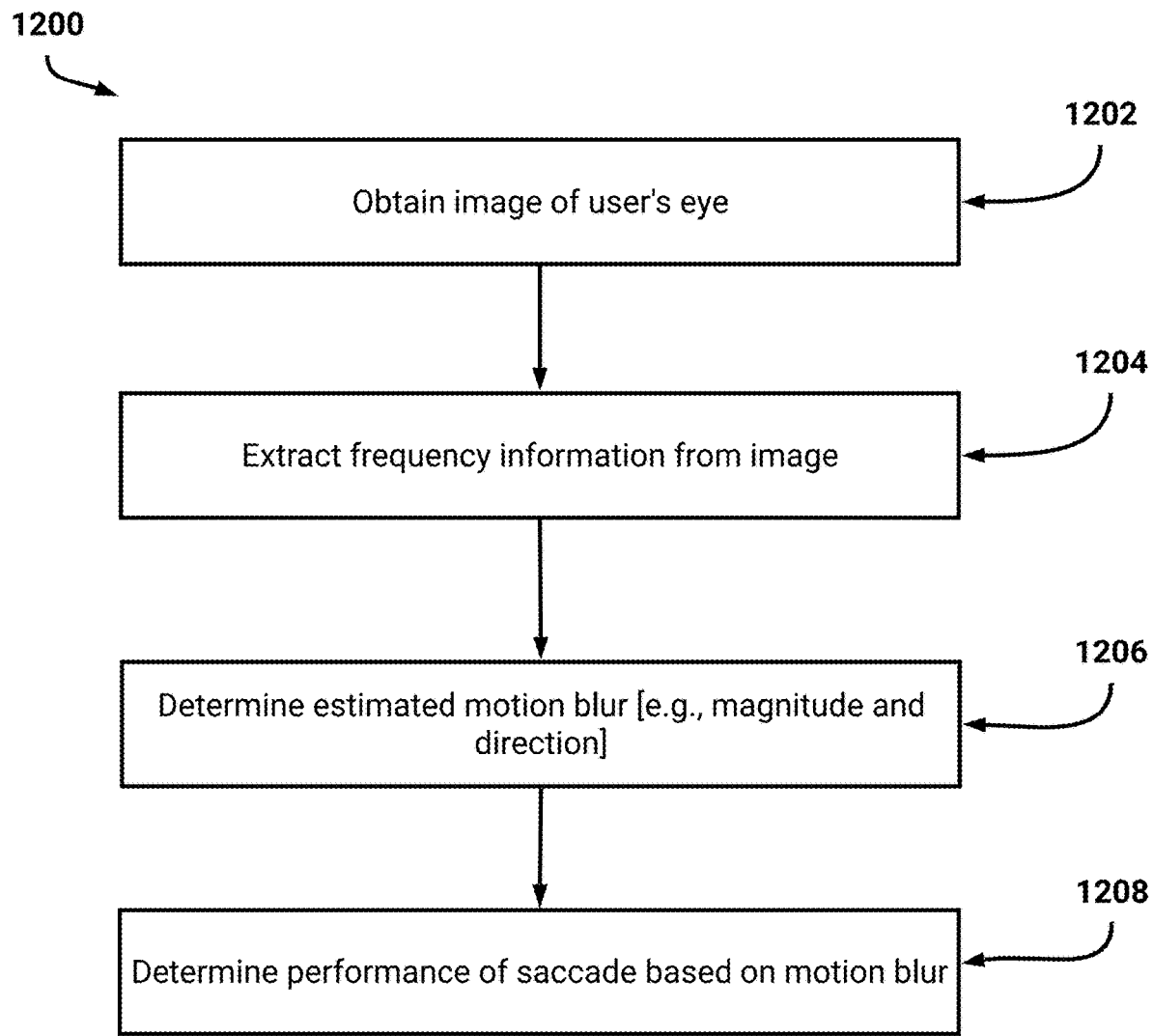
FIG. 12A illustrates a process for an example scheme to determine performance of a saccade by a user's eye.

FIG. 12A illustrates a process 1200 for another example scheme to determine performance of a saccade. For convenience, the process 1200 may be described as being performed by a display system (e.g., the display system 60, which may include processing hardware and software, and optionally may provide information to an outside system of one or more computers or other processing device, for instance to offload processing to the outside system, and receive information from the outside system).

At block 1202, the display system obtains an image of a user's eyes. As described above, with respect to FIGS. 11A-B, the display system may obtain images of the user's eye or eyes periodically. Block 1202 may be similar to block 1102 of FIG. 11A. The display system extracts frequency information from the obtained image at block 1204, for example by performing a Fourier transform or Fast Fourier Transform. At block 1206, the display system determines measures associated with motion blur of the user's eye. For example, the display system may determine a magnitude and direction associated with the motion blur which will be described in more detail below with respect to FIG. 12B.

Figure 12B:
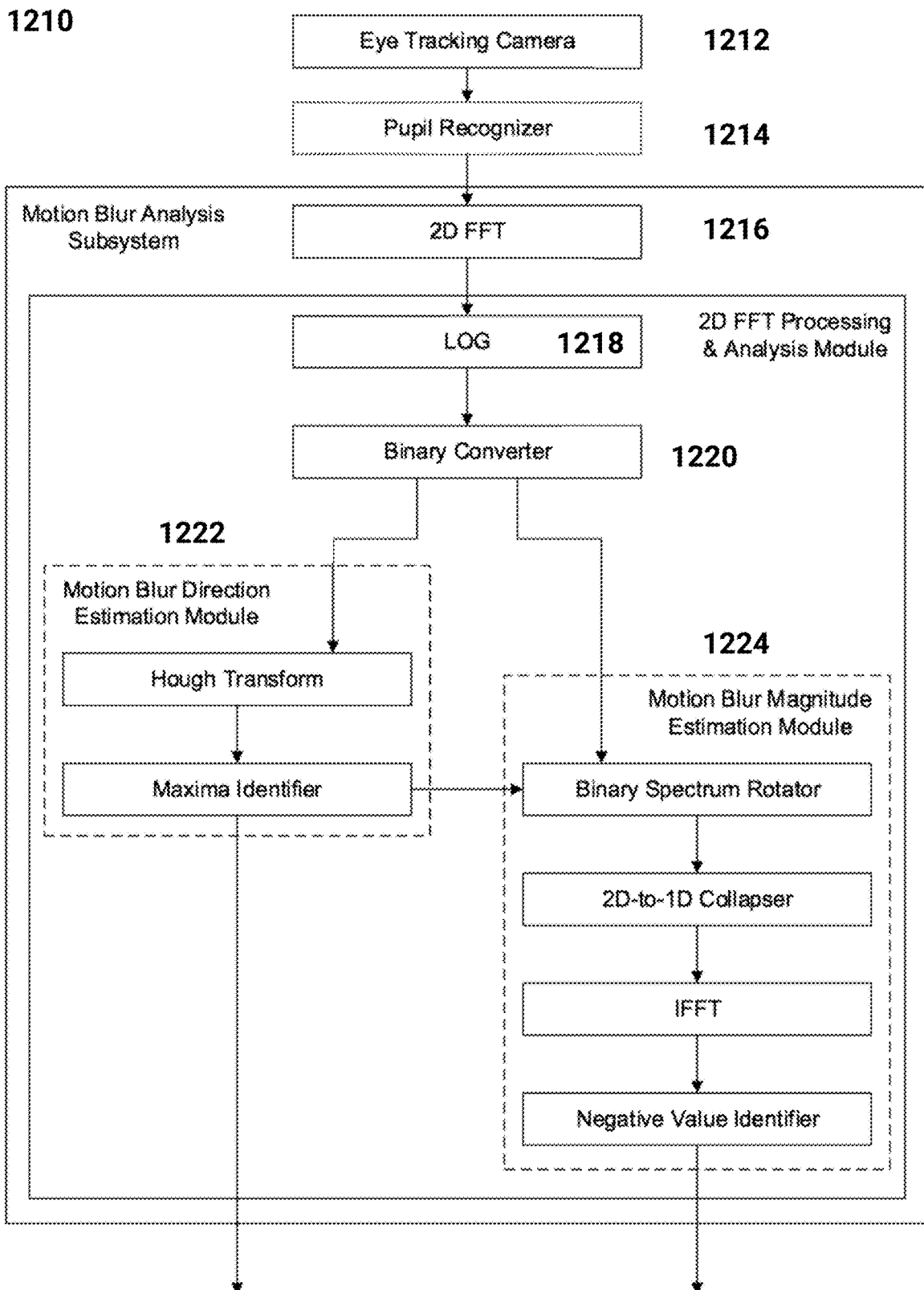
FIG. 12B illustrates an example block diagram of a process to determine a magnitude and direction associated with motion blur.

Reference will now be made to FIG. 12B, which illustrates an example block diagram of a process 1210 to determine a magnitude and direction associated with motion blur. At block 1212, the display system obtains an image of the user's eye and at block 1214 the display system optionally identifies a pupil included in the image. At block 1216, the display system performs a Fast Fourier Transform to obtain frequency components of the image. For example, the display system may generate an adjusted image that includes values corresponding to the frequency components of the obtained image. At block 1218 the display system determines the log spectrum of the Fourier transformed image, and at block 1220 the display system converts the log spectrum into binary.

To determine a direction associated with motion blur in the image, at block 1222 the display system performs a Hough transform to provide an accumulator array. It will be appreciated that the Hough transform may divide the blur parameter space into accumulator cells. A given cell in the accumulator may indicate a total number of curves passing through it. To determine the direction, the display system identifies the maximum value in the accumulator, which corresponds to the direction of the motion blur (and thus the direction of eye movement).

To determine a magnitude associated with motion blur, at block 1224 the display system obtains information identifying the determined direction, and rotates the binary spectrum (e.g., determined in block 1220) in a direction opposite to the blur direction. The display system may then collapse the determined rotated information into one-dimension via taking an average along the columns of the two-dimensional rotated information. Subsequently, the display system may perform an Inverse Fourier Transform on the one-dimensional information and identify a first negative value in a real part. This identified first negative value corresponds to a length associated with the blur, and thus a magnitude.

With reference to FIG. 12A, at block 1208 the display system may determine whether the user performed a saccade based on the determined measures. For example, if the determined magnitude is greater than a threshold the display system may identify occurrence of a saccade.

As described above with respect to FIGS. 11A-B, the display system may opportunistically utilize the obtained image and determined measures associated with motion blur to estimate eye movement of the user. For example, the display system may monitor a user's gaze and determine three-dimensional fixation points at which the user is fixating. If the display system identifies occurrence of a saccade, it may represent that the user's eyes are to rapidly move until the user regains focus at a particular three-dimensional location. As described in FIG. 12B, the display system may determine parameters associated with motion blur of a user's eye (e.g., a user's pupil). For example, the display system may determine a magnitude and direction of the motion blur. In some embodiments, the display system may store and/or access one or more predetermined models to map motion blur to magnitude and direction. Using these determined parameters, the display system may therefore adjust a previously determined three-dimensional fixation point to identify an estimated three-dimensional location at which the user will be fixating upon completion of the saccade. As an example, the magnitude determined in block 1224 may be associated with a velocity of the saccade. As described above, the velocity may be correlated with an amplitude of the saccade (e.g., linearly correlated), and thus the display system may determine an estimated angular distance the user's eye will move during the saccade. The estimated angular distance may be applied in a direction as determined in block 1222.

Advantageously, the display system may utilize an image of one eye of the user. For example, as described above during a saccade both eyes will typically move together. Thus, the display system may adjust a previously determined three-dimensional fixation point with parameters associated with motion blur of a determined magnitude and direction of one of the user's eyes. Since the other eye may be assumed to move similarly, the display system may determine the estimated three-dimensional location at which the user will be fixating after the saccade.

Figure 13:
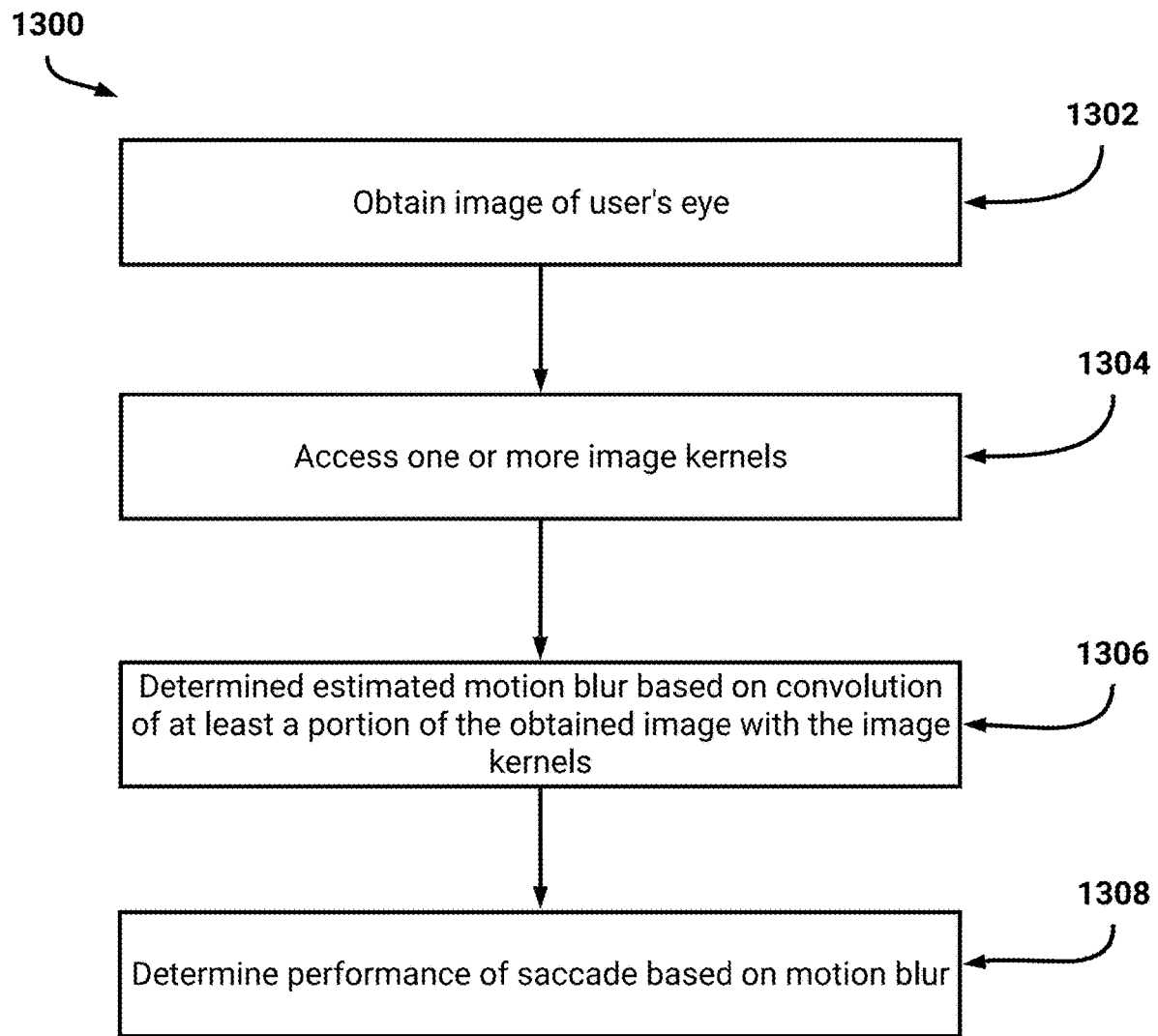
FIG. 13 illustrates a process for another example scheme to determine performance of a saccade by a user's eye.

FIG. 13 illustrates a process 1300 for another example scheme to determine performance of a saccade. For convenience, the process 1300 may be described as being performed by a display system (e.g., the display system 60, which may include processing hardware and software, and optionally may provide information to an outside system of one or more computers or other processing device, for instance to offload processing to the outside system, and receive information from the outside system).

At block 1302, the display system obtains an image of a user's eyes. Block 1302 may be similar to block 1102 of FIG. 11A. As described above regarding FIGS. 11A-B, the display system may obtain images of the user's eye or eyes periodically. Additionally, the display system may identify a particular region of the user's eye, such as a pupil. At block 1304, the display system accesses information identifying one or more image kernels to be convolved with the obtained image. For example, the kernels may comprise a laplacian kernel (e.g., a three by three image matrix), a Gabor filter (e.g., a Gaussian kernel function modulated by a sinusoidal plane wave), directional filter, and so on. Optionally, the display system may perform Singular Value Decomposition of the image to determine estimated motion blur, for example as described above. Optionally the image kernels may be selected based on operating or environmental conditions associated with the display system (e.g., a particular image kernel may be preferred at night time). In some embodiments, the image kernels may be stored in local memory (e.g., in a memory unit, containing e.g. volatile or non-volatile memory, associated with the local processing and data module 140). In some embodiments, the display system may perform processing for block 1304 locally (e.g., on the local processing and data module 140).

At block 1306, the display system convolves the obtained image, or a portion thereof (e.g., the pupil), with one or more of the image kernels. Based on the convolution, the display system may determine estimated motion blur represented in the image. For example, the convolution may result in a measure, which may be a ratio or other dimensionless value. At block 1308, the display system determines occurrence of a saccade based on the determined measure exceeding a threshold.

Figure 14A:
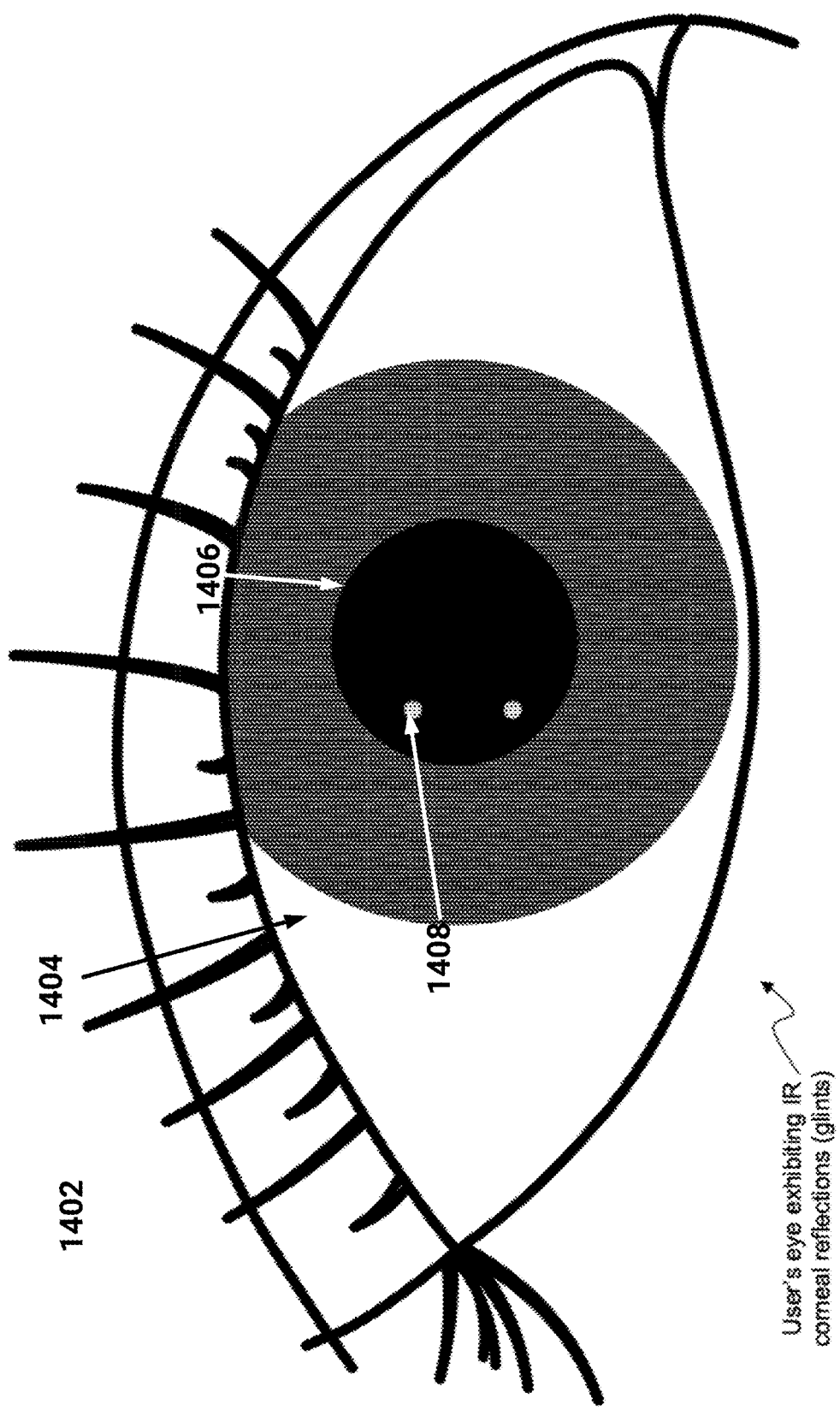
FIGS. 14A-14B illustrate another example scheme to determine performance of a saccade based on reflected infrared light.
Figure 14B:
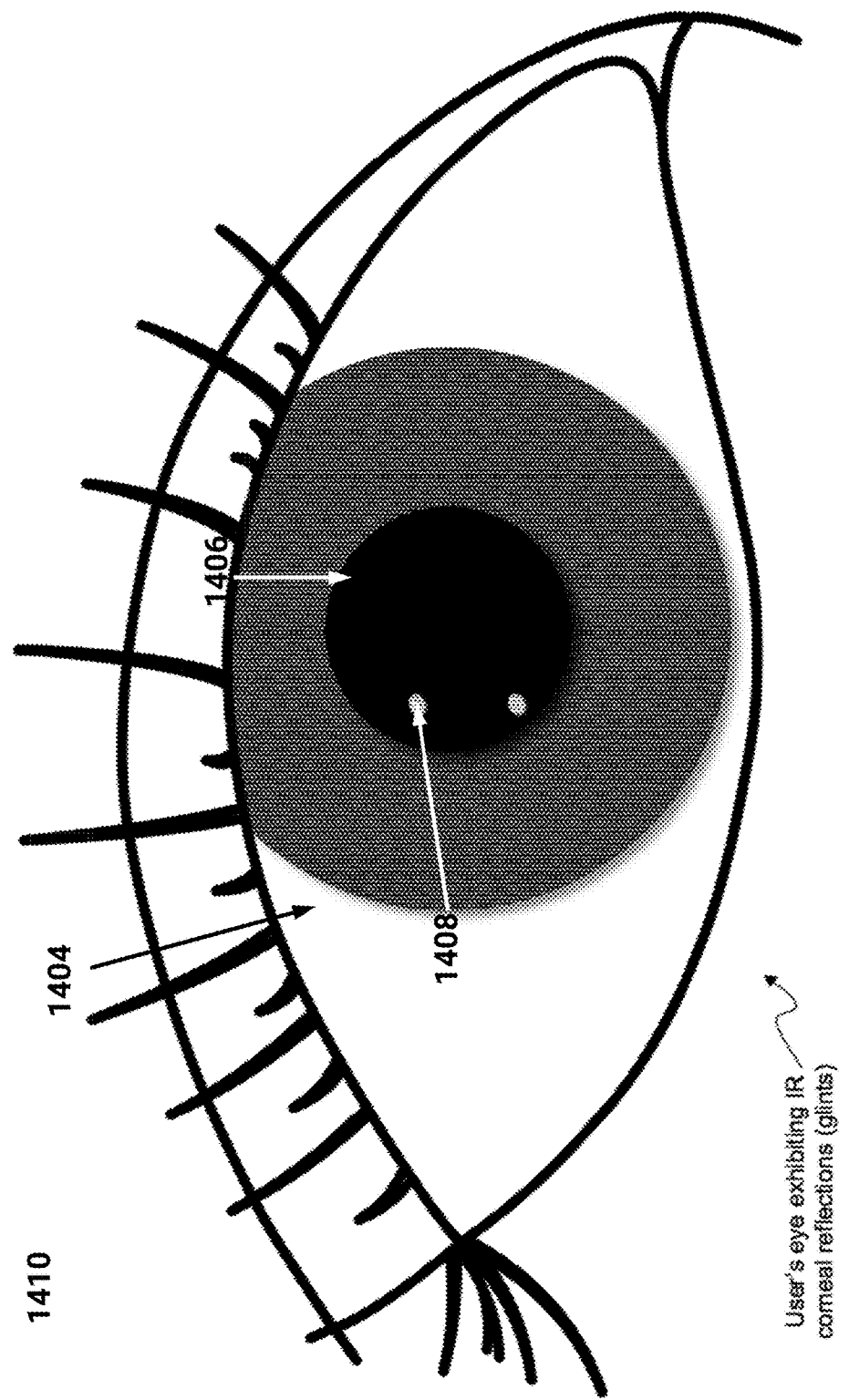

FIGS. 14A-14B illustrate another example scheme to determine performance of a saccade based on reflected infrared light. FIG. 14A illustrates a first image 1402 of an image of a user's eye 1404. For example, the first image 1402 illustrates a pupil 1406 of the eye 1402. Similar to the description above in FIGS. 10A-10B, the display system may project light (e.g., infrared light) onto the user's pupil 1406. When imaging the user's eye 1404, the infrared light may be reflected as one or more glints 1408. For example, four infrared lights may be utilized. In this example, as the user's eye 1402 moves about particular glints may be imaged by the display system while other glints may not be included. In the example of FIG. 14A, two glints 1408 are illustrated. A shape of these glints may be known to the display system, such that the display system may determine measures of deformation (e.g., elongation) when imaged by the display system. Optionally, the shape may be determined based on capture of an image with a short exposure time (e.g., as described above), such that the glints are imaged without motion blur. As described above, the images obtained of the user's eye 1402 may have an exposure time set such that motion blur is evident in the images. Thus, the display system may determine measures of motion blur of the user's eye 1402 based on motion blur of the glints 1406.

FIG. 14B illustrates a second image 1410 of the user's eye 1402. As illustrated, the glints 1408 are illustrated as being deformed and/or exhibiting motion blur. The display system may determine measures associated with the motion blur, for example based on the techniques described herein. As an example, the display system may isolate the glints 1408, and determine measures of motion blur of the isolated glints 1408. The display system may determine a degree to which the glints 1408 appear deformed, for example determine elongation of the glints 1408. In some embodiments, the display system may leverage one or more ellipse-fitting techniques to identify and/or evaluate elongated features (e.g., glints, a user's pupil, a user's iris, etc.) in captured images. Based on the deformation, the display system may estimate motion blur. Additionally, based on a direction of the elongation or deformation the display system may estimate a direction of the motion blur.

FIGS. 15A-15B illustrate another example scheme to determine performance of a saccade based on reflected light, e.g., infrared light. In the example of FIGS. 15A-15B, a band or strip of light 1508 (e.g., infrared light) is projected onto a user's eye 1504. FIG. 15A illustrates a first image 1502 of the user's eye 1504, with a limbic boundary 1506 of the eye 1504 (e.g., a sclera to an iris) illuminated by the band or strip of light 1508. Similar to the description of FIGS. 14A-14B, the display system may analyze the first image 1502 for significant temporal changes and/or the presence of motion blur based on the band or strip of light 1508. Based on a shape of the user's eye 1504 (e.g., which include a corneal bulge), indicia of quick eye movements may be more readily apparent in regions of images within which the limbic boundary 1506 is shown. For example, the user's eye 1504 may reflect portions of band or strip of light 1508 incident the iris or corneal bulge of the user's eye 1504 and portions of band or strip of light 1508 incident the sclera of the user's eye 1504 in different manners (e.g., at different angles). As such, the appearance of a portion of band or strip of light 1508 that spans the limbic boundary 1506 may change relatively drastically as the user's eye 1504 moves. In some instances, the effects of motion blur (e.g., as the user's eye 1504 engages in saccadic movement) may serve to further amplify such changes in appearance. FIG. 15B illustrates a second image 1510 of the user's eye 1504. In this image 1510, the band or strip of light 1508 is imaged as being deformed and/or exhibiting image blur at the limbic boundary 1506. The display system may determine measures associated with blur, as described above, and/or may determine deformation or elongation of the band or strip of light 1508.

Other Example Schemes to Switch Depth Planes

As described above, a display system (e.g., display system 60) may detect saccades, and cause the presentation of virtual content to be adjusted from a first depth plane to a second depth plane upon detection of the saccades, such that the adjustment, or depth-plane switching, preferably occurs during the saccade and is masked by the saccades. For example, the display system may determine saccades via motion blur estimation techniques (e.g., as described in FIGS. 11A-12B). As other examples, the display system may utilize image kernels (e.g., as described in FIG. 13), glints reflected from a user's eye (e.g., as described in FIGS. 14A-14B), or light reflected from the user's eye which spans particular physiological features (e.g., infrared light spanning a limbic boundary as described in FIGS. 15A-15B). Since a user's visual acuity or perceptibility may be reduced during performance of a saccade, the display system may thus advantageously perform a depth plane switch at a time when the perceptibility of the depth-plane switch is reduced.

It will be appreciated that a user may regularly or occasionally not perform saccades over a time scale that coincides with the time scale desired for depth plane switching. When a user is not performing saccades, however, the advantageous masking of depth plane switches by saccades is not available. Optionally, in addition or as an alternative to detecting saccades, the display system may monitor for occurrences of blinks as a masking event. For example, U.S. Patent Pub. 2017/0276948 (the '948 publication) describes detecting blinks and performing depth plane switches during the blink, and is incorporated by reference herein in its entirely. As described in the '948 publication, a depth plane switch that needs to be performed may be flagged (e.g., identified) by the display system. Just as users may not perform saccades, users may avoid blinking for extended durations in some instances. If the user does not blink or perform a saccade for a threshold amount of time (e.g., 10 seconds, 30 seconds, 60 seconds), the display system may perform the flagged depth plane switch.

Additional techniques to cause the switching of depth planes may be employed in addition to detection of saccades, detection of blinks, and switching after the non-detection of blinks and/or saccades (e.g., as described herein) for a threshold amount of time. As a first example, the display system may determine measures associated with its movement. Based on determined movement of the display, the display system may perform a depth plane switch. As will be described, movement of the display may be associated with reduced visual acuity or perceptibility of a user. For example, if the user is moving their head rapidly (e.g., at greater than a threshold velocity, angular velocity, and so on), the likelihood of noticing a depth plane switch may decrease, since the user's eyes are likely also moving.

As a second example, the display system may determine whether an accommodation-vergence mismatch exceeds a threshold. Based on the threshold being exceeded, the display system may perform a depth plane switch. As described in FIGS. 4A-4D, an accommodation-vergence mismatch may be caused by vergence cues associated with displayed virtual content indicating a depth (distance away from a wearer) which is mismatched from the accommodation cues associated with the depth plane on which the virtual content is presented. For example, for situations in which virtual content is to be presented at depths that are outside of a particular threshold depth range (e.g., diopter range) associated with acceptable accommodation-vergence mismatches for a selected depth plane, the display system may perform a depth plane switch. This depth plane switch may improve the viewing comfort of the user by avoiding excessive accommodation-vergence mismatches.

As a third example, the display system may monitor a gaze of the user (to determine a three-dimensional point at which the user is fixating), and may perform a depth plane switch based on whether the user is fixating on virtual content. For example, the display system may determine a three-dimensional distance between the user's fixation point and a three-dimensional location at which virtual content is configured to be presented. As an example, if the display system determines that the virtual content is being presented at greater than a threshold angular distance from the user's fixation point, a depth plane switch may be performed. In this example, the virtual content may be determined to be presented outside of the user's fovea. Without being limited by theory, for such content outside of the fovea, the user's visual acuity or perceptibility may be reduced and the depth plane switch may be less noticeable. As another example, if the display system determines that the virtual content is outside of a zone at which the user is fixating, the display system may perform the depth plane switch. In this example, the user's field of view may be separated into zones of contiguous three-dimensional space. Thus, the display system may determine whether the user is fixating outside of a zone that includes virtual content. As another example, the display system may perform a depth plane switch based on the distance (e.g., three-dimensional distance) between the user's fixation point and virtual content exceeding a threshold distance. Example descriptions of zones in three-dimensional space, as well as systems and techniques for determining and evaluating fixation points and accommodation vergence mismatches relative to zones in three-dimensional space and virtual content and taking action on the basis thereof are described in more detail in U.S. application Ser. No. 16/353,989, which is hereby incorporated by reference in its entirety for all purposes. In some embodiments, one or more the abovementioned systems and techniques may be employed in or included as part of one or more of systems and techniques described herein. Furthermore, in some embodiments, one or more of the zones described herein may correspond to one or more of the above-mentioned zones in three-dimensional space.

One or more of the above-described examples may thus be utilized by the display system to determine a time at which to perform a depth plane switch. These examples may be performed at the exclusion of other techniques for determining the timing of depth plane switching, or one or more of these examples may also be combined with the various techniques described herein. For example, the display system may monitor for the performance of saccades and/or blinks in addition to any of the examples described. In addition, in some embodiments, the display system may monitor the amount of time that has elapsed between a flag indicating that in depth plane switch is desired and the occurrence of a saccade or blink. Once the amount of time has passed the temporal threshold for saccade and/or blink detection, and no saccade and/or blank has been detected, the display system may then proceed to switch depth planes based upon other techniques described herein (e.g., depth plane switching may occur based upon detected movement, potential accommodation-vergence mismatch, or fixation away from virtual content). In some embodiments, the first example described above may be utilized by the display system to determine a time at which to adjust one or more operating parameters thereof. For example, the first example described above may be utilized by the display system to determine a time at which the usage of computational resources and/or power may be reduced. In some embodiments, such a reduction may occur for a duration of a determined movement of the display. For example, the display system may adjust one or more operating parameters, such as a virtual content rendering setting (e.g., reduce a resolution at which virtual content is being rendered), a display setting (e.g., reduce a refresh rate of the presented virtual content, a brightness, contrast ratio, color settings, and so on), and/or a power setting (e.g., clock speed of the CPU and/or GPU may be temporarily reduced, the display may be turned off, and so on). The first example described above may be performed at the exclusion of other techniques for determining the timing of the adjustment of one or more operating parameters of the display system, or the first example described above may also be combined with one or more of the various techniques described herein for determining the timing of the adjustment of one or more operating parameters of the display system.

As will be described, the display system may optionally prefer certain schemes to cause a depth plane switch than other schemes. As an example, the display system may access information indicating a precedence network. The precedence network may inform when to cause a depth plane switch. For example, the display system may prefer switching upon detection of a saccade over switching upon determining that an accommodation-vergence mismatch exceeds a threshold.

Figure 16:
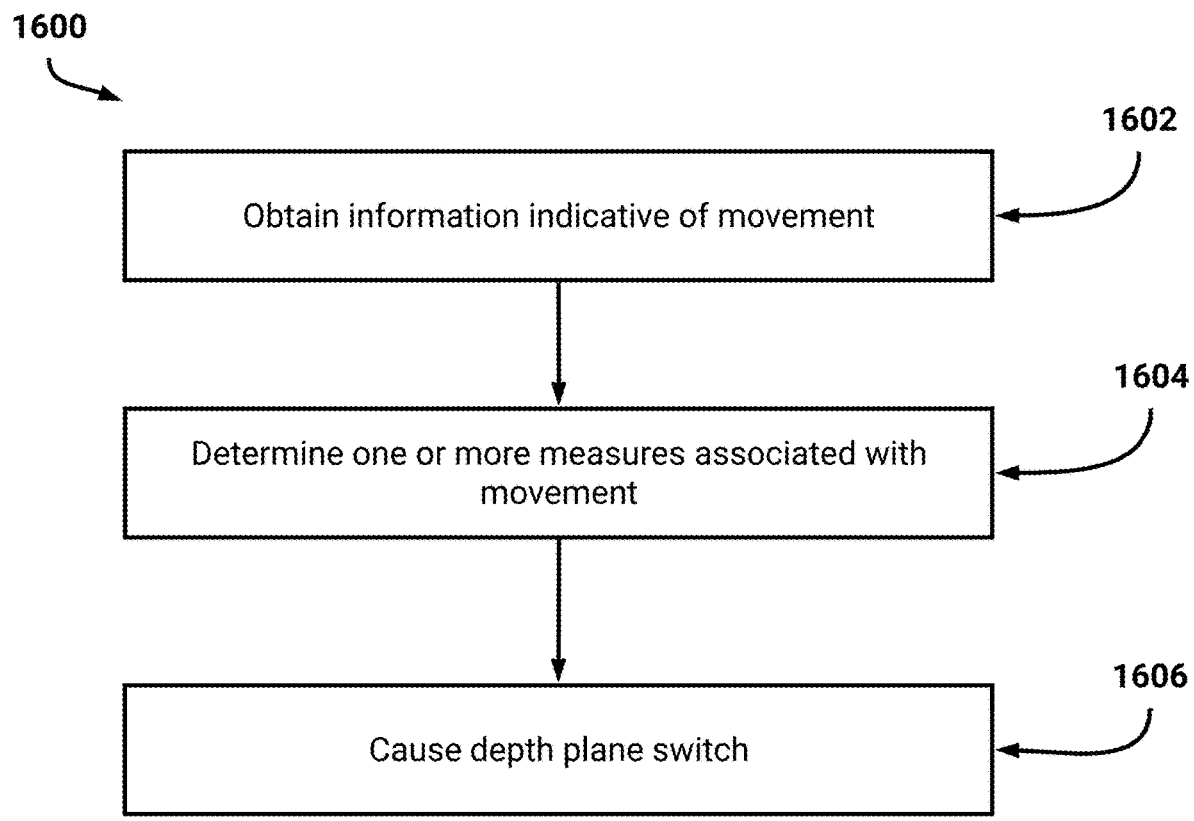
FIG. 16 illustrates an example process for depth plane switching based on detected movement.

FIG. 16 illustrates an example process 1600 for performing depth plane switching based on detected movement. For convenience, the process 1600 may be described as being performed by a display system (e.g., the display system 60, which may include processing hardware and software, and optionally may provide information to an outside system of one or more computers or other processing device, for instance to offload processing to the outside system, and receive information from the outside system).

At block 1602, the display system obtains information indicative of movement. As described above, for example with respect to the FIG. 9D, the display system may include inertial measurement units, accelerometers, compasses, GPS units, radio devices, gyros, and/or other sensors. The display system may obtain information from these sensors to obtain movement information. As an example, the display system may periodically monitor information being received from these sensors. Optionally, the display system may be interrupted by information being provided by the sensors. For example, if the information indicates movement greater than a threshold, or greater than a threshold velocity, the sensors may trigger an interrupt for the display system to process a depth plane switch.

The display system may also utilize cameras to obtain movement information. For example, as described above, the display system may include environmental sensors (e.g., sensors 112). These sensors may include outward facing cameras that can obtain images or video of a real-world environment in which a user is located. The display system may, as described above, be configured to detect light, objects, stimuli, people, animals, locations, or other aspects of the world around the user. Additionally, the display system may detect certain fixed features included in images of the world surrounding the user. For example, the display system may monitor for corners, edges, contours and/or other fixed features which can be tracked. This information may be utilized to determine estimates associated with movement. For example, if certain fixed features moved a threshold three-dimensional distance in a certain period of time, the display system may estimate velocity of movement along with a vector describing the movement. Example descriptions of features of real-world environments, as well as systems and techniques for identifying and mapping real-world environments, generating and accessing models of real-world environments, recognizing or otherwise identifying objects and features of real-world environments are described in more detail in U.S. Publication No. 2015/0302652, U.S. Publication No. 2017/0091996, U.S. Publication No. 2017/0301133, U.S. Publication No. 2018/0045963, and U.S. Publication No. 2018/0268220, all of which are incorporated by reference herein in their entirety for all purposes. In some embodiments, one or more the abovementioned systems and techniques may be employed in or included as part of one or more of systems and techniques described herein. Furthermore, in some embodiments, one or more of the fixed features described herein may correspond to one or more of the abovementioned features of real-world environment.

At block 1604, the display system determines measures associated with movement. As described above, the display system may utilize, as examples, certain sensors and/or cameras to detect movement. For example, the display system may obtain information from an accelerometer and/or inertial measurement unit to estimate movement of the display system. It should be appreciated that an inertial measurement unit may measure the display system's specific force, angular rate, and optionally magnetic field surrounding the display system. The display system may utilize one or more of accelerometers, gyroscopes, and magnetometers, and multiple sensors may be utilized to increase the confidence or accuracy of the movement detection. Thus, the display system may determine estimates as to an extent of the movement (e.g., a three-dimensional distance traveled) and velocity and/or acceleration of the movement.

Additionally, as noted herein, the display system may utilize cameras to determine estimates of movement, velocity, and/or acceleration. For example, the display system may track certain fixed fixtures in a real-world environment surrounding the user. As another example, the display system may utilize one or more of the techniques described above in FIGS. 11A-15. As an example, the display system may determine motion blur in one or more images obtained via outward facing cameras. As described in FIG. 12A, the display system may utilize frequency extraction to determine estimates of motion blur. Other schemes that may be employed in the display system for determining motion blur include convolutional techniques, determining elongation of one or more identifiable objects and features of real-world environments, deep learning techniques (e.g., neural network-based image analysis), and so on. While these estimates may not be utilized to determine the display system's location in three-dimensional space (e.g., as compared to an inertial measurement unit), the estimates may inform an extent to which the system moved. Additionally, the estimates may inform a velocity and/or acceleration of the movement. As another example, the display system may track fixed features in a real-world environment surrounding the user over time to determine whether the display system and/or user's head is engaged in a threshold measure or more of movement in much the same way that the display system may track eye features of one or both of the user's eyes to determine whether one or both of the user's eyes are engaged in a threshold measure or more of movement (e.g., saccadic movement). More specifically, in some embodiments, the display system may monitor for changes in a quantity of identifiable fixed features in the real-world environment (e.g., features that the display system is capable of identifying with a degree of confidence that exceeds one or more thresholds) between successive images captured by one or more outward facing cameras to determine whether the display system and/or user's head is engaged in a threshold measure or more of movement. In such embodiments, the display system may compare fixed features identified in one image of the real-world environment to fixed features identified in a previously-captured image of the real-world environment. For example, the display system may identify a particular reduction in the number of identified fixed features from one image to another as corresponding to a threshold measure of movement. In this way, the display system may utilize the effects of motion blur (e.g., degradation of fine detail in images) to detect excessive movements of the display system and/or user's head (e.g., movements corresponding to reduced visual acuity or perceptibility).

In some embodiments, the display system may compare fixed features identified in an image of the real-world environment to known features of the real-world environment, such as those represented in one or more models stored in association with the user and/or the geographic location of the real-world environment. In some of these embodiments, the display system may generate a confidence score indicating a level of confidence that a fixed feature shown in an image matches a known feature of the real-world environment based on such a feature comparison, and may detect occurrences of excessive movements of the display system and/or user's head based on the confidence score being less than a threshold.

In some examples, the display system may identify a fixed feature (e.g., corner, edge, contour, etc.) of a real-world environment using one or more machine learning and/or edge detection techniques. In a manner similar to that which has been described above with reference to eye feature detection, in some embodiments, the display system may generate a confidence score indicating a level of confidence that one or more fixed features have been correctly identified, and may determine occurrences of excessive movements of the display system and/or user's head based on the confidence score being less than a threshold. In some examples, the display system may determine occurrences of excessive movements of the display system and/or user's head based on a relative change in confidence score being greater than a threshold. In some examples, the display system may determine such occurrences based on a relative change in confidence score being greater than a threshold. The various thresholds described herein may be fixed values or may be variable values that are dynamically adjusted based on one or more parameters (e.g., user preferences, user identity, preceding images, etc.).

As mentioned above, in some embodiments, one or more of the display system architectures and methods of operation described above with reference to FIG. 11 may be employed to detect excessive movements of the display system and/or user's head (e.g., movements corresponding to reduced visual acuity or perceptibility) and adjust one or more operating parameters on the basis thereof. As an example, in such embodiments, one or more outward facing cameras of the display system may be configured to capture images of a real-world environment using a static frame rate and variable exposure time, and the display system may be configured to control such one or more outward facing cameras to dynamically adjust the exposure time based on one or more conditions of the display system or the user. In some examples, such one or more conditions of the display system or the user may include one or more processes to be performed by the display system (e.g., biometric authentication, processes to detect reduced visual acuity or perceptibility, etc.), a determined fixation point of the user, a determined accommodation vergence mismatch, and the like.

As another example, in at least some of these embodiments, the display system may be configured to switch or alternate between a short exposure time mode and a long exposure time mode, as described in further detail above with reference to FIG. 11. In some such embodiments, the display system may be configured to control at least two outward facing cameras to dynamically adjust the exposure time based on one or more conditions of the display system or the user. Other display system architectures and methods of operation described herein may be employed to detect excessive movements of the display system and/or user's head.

At block 1606, the display system causes a depth plane switch. The display system may determine that the movement exceeds one or more thresholds for movement and performs a depth plane switch. For example, the display system may flag, or otherwise identify that depth plane switch is due to be performed. The display system may then perform the switch based on determining that movement of the display system is greater than certain thresholds. The thresholds may optionally be user-selectable, or may be learned over time for a specific user or based on aggregation of information obtained from users. For example, the display system may request information from the user indicating whether the user could see the depth plane switch. As discussed herein, it will be appreciated that switching depth planes involves changing the wavefront divergence of light used to form an image corresponding to virtual content.

As an example, a threshold may indicate that if the movement is being performed at greater than a threshold velocity, then the depth plane switch may be performed. As another example, a threshold may indicate that if the user moved greater than a threshold distance, then the depth plane switch may be performed. As another example, a threshold may indicate that if the movement is being performed at greater than a threshold acceleration, the depth plane switch may be performed. Optionally, one or more of these thresholds may be combined or be required to be satisfied. For example, the depth plane switch may be performed if the movement indicates the display system is moving at greater than at threshold velocity and also increasing in velocity at greater than a threshold acceleration. The thresholds may further require a time element. For example, a depth plane switch may be performed if the display system is moving greater than a threshold velocity for greater than a threshold period of time. Similarly, the display system may perform the depth plane switch if the display system is moving at greater than a threshold acceleration for greater than a threshold period of time.

Figure 17:
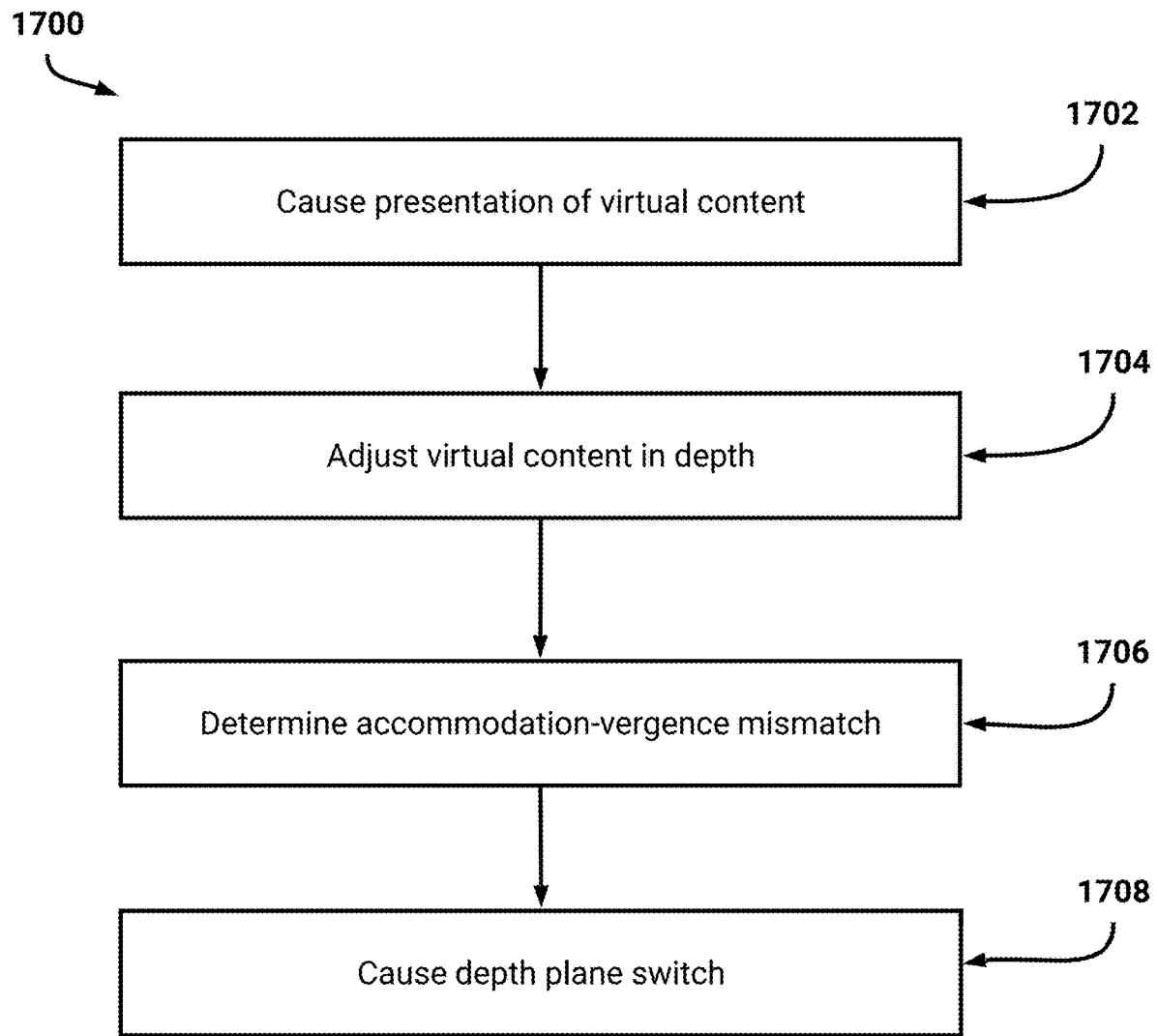
FIG. 17 illustrates an example process for depth plane switching based on an accommodation-vergence mismatch.

FIG. 17 illustrates an example process 1700 for performing depth plane switching based on an accommodation-vergence mismatch. For convenience, the process 1700 may be described as being performed by a display system (e.g., the display system 60, which may include processing hardware and software, and optionally may provide information to an outside system of one or more computers or other processing device, for instance to offload processing to the outside system, and receive information from the outside system).

At block 1702, the display system presents virtual content at a particular depth plane. As described herein, the display system may present virtual content at various depths utilizing different depth planes (e.g., by outputting light from different waveguides that provide different amounts of wavefront divergence).

At block 1704, the display system adjusts virtual content in depth; that is, the display system adjusts the perceived depth or distance of the virtual content from the user. For example, vergence cues may be adjusted to cause the user to perceive the virtual content at the adjusted depth.

While the vergence cues may be adjusted, the accommodation cues may remain the same until the display system switches depth planes from one depth plane (corresponding to one set of accommodation cues) to another depth plane (corresponding to another set of accommodation cues). Consequently, depending upon the distance from the user that virtual content is placed, the changes in vergence cues may cause mismatches with accommodation cues.

At block 1706, the display system determines the degree of the accommodation-vergence mismatch. As described with reference to FIGS. 4A-4D, the display system may monitor a mismatch between the vergence cues and accommodation cues for virtual content being fixated on by the user. The mismatch may be measured in diopters, as also described herein.

At block 1708, the display system performs a depth plane switch upon determining that the accommodation-vergence mismatch threshold has been exceeded. It will be appreciated that the human visual system may tolerate limited levels of accommodation-vergence mismatches and that, above certain thresholds (e.g., 0.25 diopter, 0.33 diopter, or 0.5 diopter), the user may experience significant discomfort. The display system may determine whether the accommodation-vergence mismatch for particular virtual content has exceeded a predefined accommodation-vergence mismatch threshold. If the threshold is exceeded, the display system performs the depth plane switch. The switch may be performed irrespective of whether a masking event is occurring. While the user may, as an example, be able to perceive the switch, the switch may be advantageous to the performance of the display system. For example, without being limited by theory, perception of depth plane switching may negatively impact the realism or immersion of the user in a viewing experience, but high levels of accommodation-vergence mismatches is more undesirable since it made cause sufficient discomfort to stop the user from using the display system.

In some embodiments, the accommodation-vergence mismatch thresholds that trigger depth plane switching may be set at constant values for all users. In some other embodiments, the thresholds may vary between users. For example, certain users may be more able to tolerate higher mismatch levels than others. Thus, the threshold may be adjusted for these users (e.g., the users may adjust the threshold in some embodiments). In some embodiments, the thresholds may vary depending on the depth of virtual content from the user. For example, for distances closer to the user, the thresholds may be smaller as these mismatches may be more detectable to the user.

Figure 18:
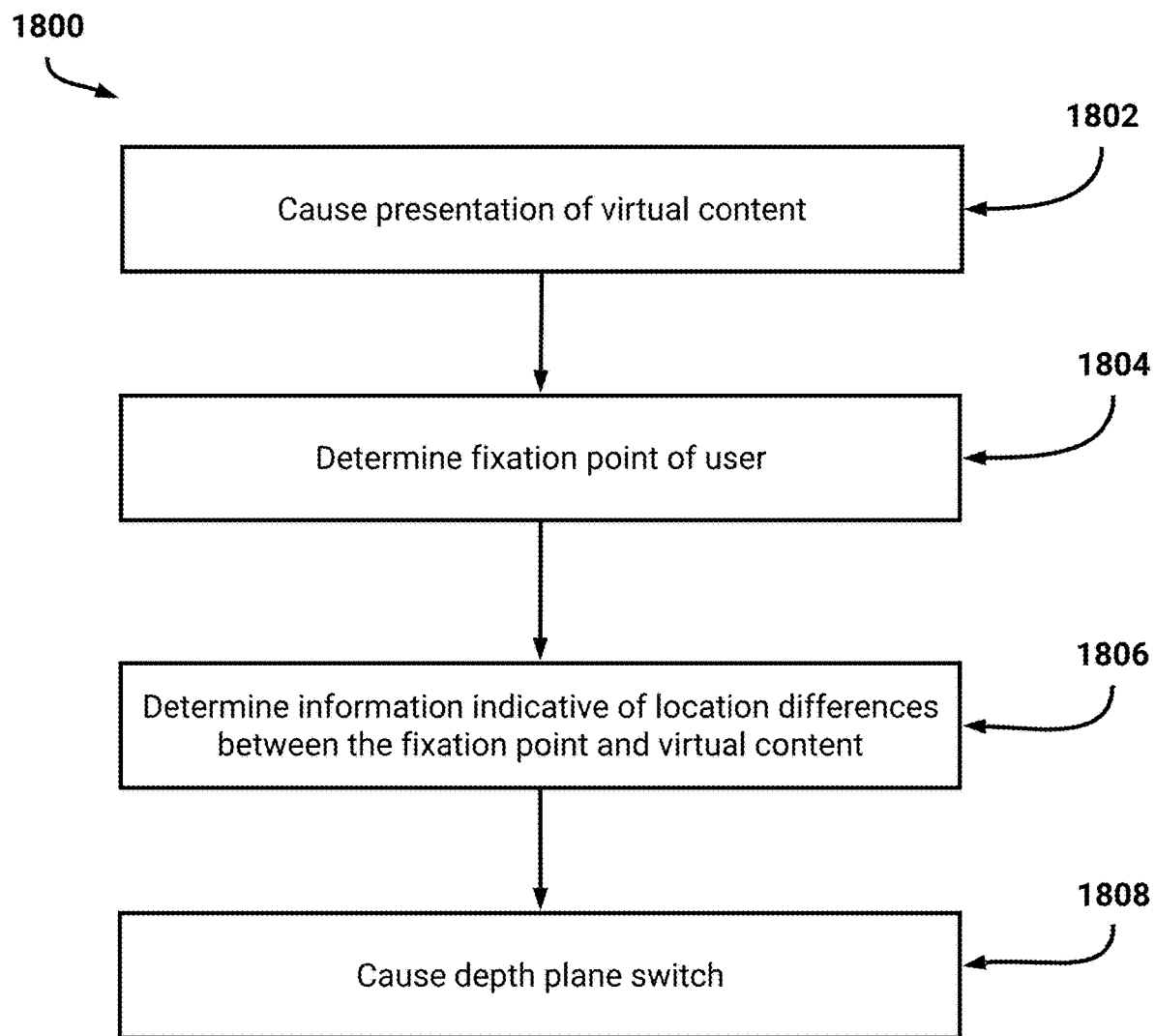
FIG. 18 illustrates an example process for depth plane switching based on a determined fixation point of a user.

FIG. 18 illustrates an example process 1800 for performing depth plane switching based on a determined fixation point of a user. For convenience, the process 1800 may be described as being performed by a display system (e.g., the display system 60, which may include processing hardware and software, and optionally may provide information to an outside system of one or more computers or other processing device, for instance to offload processing to the outside system, and receive information from the outside system).

At block 1802, the display system causes presentation of virtual content. Similar to blocks 1602, 1702, the display system may present virtual content to be perceived at different three-dimensional locations from the user.

At block 1804, the display system determines a fixation point of the user. As described above, the display system may be configured to determine, at least in part, a gaze of the user. For example, the display system may determine a centroid of a fovea in a captured image. The display system may then identify a vector extending from the fovea and through the pupil as representing a gaze of the user's eye. If the display system has an image of the other eye, the display system may similarly determine a vector extending from the other eye. An intersection in three-dimensional space may thus correspond to a point at which the user is fixating.

At block 1806, the display system determines information indicative of location differences between the fixation point and virtual content. The display system can access information identifying three-dimensional locations of virtual content. The display system may then compare these locations to the determined fixation point. As an example, the display system may determine an angular difference (e.g., with respect to the user's eyes) between the fixation point and virtual content. As another example, the display system may determine whether the virtual content falls on a fovea of the user. As another example, the display system may determine a three-dimensional distance (e.g., based on a vector norm) between the virtual content and fixation point. Thus, these examples may thus inform whether the user is actually looking at, or fixating on, the virtual content.

Additionally, the display system may utilize images of the user's eyes to determine a likelihood that the user is fixating on some real-world feature. For example, if the user is focusing within a certain volume of three-dimensional space, and is not moving, or is barely moving, his/her eyes outside of the volume, then the display system may increase the likelihood. Thus, the user may be determined to not be fixating on, or be much aware of, the virtual content may be, e.g., moving. This likelihood may inform whether to cause the depth plane switch. For example, if the user is determined to be likely focusing on a stationary real feature, then the display system may perform a depth plane switch for virtual content, which may be at other locations.

As described above, the user's field of view may optionally be separated into different zones of space. For example, the field of view may be separated into three-dimensional polygons. Example polygons may include, cubes, hyperrectanges, toruses, spheres, and so on. The display system may determine a polygon in which the user is fixating, and a polygon in which the virtual content is presented.

At block 1808, the display system performs a depth plane switch. The display system may compare the determined information in block 1806 to one or more thresholds or rules and determine whether to perform a depth plane switch. As an example, the display system may cause a depth plane switch if an angular distance between the virtual content and fixation point exceeds a threshold. As another example, the display system may cause a depth plane switch if the virtual content is located in a different zone than the fixation point, or at greater than a threshold number of zones from the fixation point. Optionally, the threshold number may be required to be along a certain direction, such that the virtual content falls outside of the user's fovea.

Figure 19:
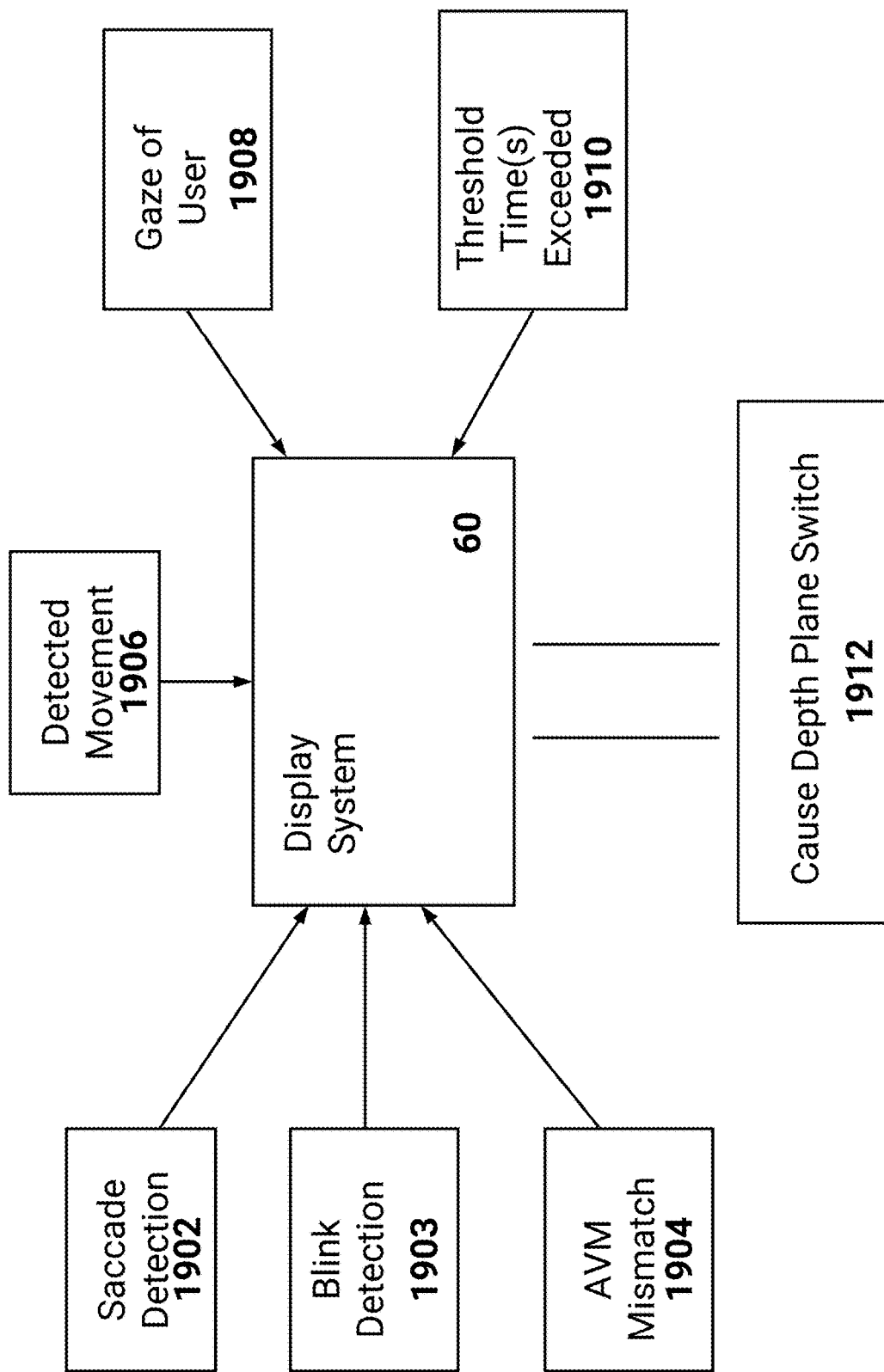
FIG. 19 illustrates an example block diagram of the display system configured to determine a time at which to perform a depth plane switch.

FIG. 19 illustrates an example block diagram 1900 of a display system configured to determine a time at which to perform a depth plane switch using the various techniques disclosed herein. For example, the display system may be the display system 60 described herein.

As illustrated in FIG. 19, to determine whether to cause a depth plane switch, the display system may:
  perform saccade detection 1902 (e.g., as discussed with reference to FIGS. 10A-15B),
  perform blink detection 1903,
  determine the presence of excessive accommodation-vergence mismatches 1904 (e.g., as discussed with reference to FIG. 17),
  detect movement 1906 that may mask a depth plane switch (e.g., as discussed with reference to FIG. 16),
  determine the gaze of a user 1908 and whether the user is fixating on virtual content (e.g., as discussed with reference to FIG. 18), and
  determine whether a threshold amount of time as elapsed since the display system indicating a depth plane switch should occur 1910 (e.g., a time since the system 60 flagged the switch).

The display system 60, upon identifying that a switch is flagged to occur, may thus monitor for these example schemes to cause a depth plane switch 1912. As described above, the display system may prefer certain example schemes over others. For example, the display system may prefer a saccade 1902 over the remaining schemes. As another example, the display system may prefer a blink over the other schemes 1902-1910. Alternatively, the display system may be configured detect and act upon other masking events before detecting saccades and/or blinks. As another example, the display system may traverse a precedence network. The precedence network may inform which schemes are favored over other schemes, preferentially performing certain schemes before other schemes (e.g., performing saccade or blink detection fora set amount of time before performing the other schemes).

Optionally, the display system may learn preferences of the user. For example, the display system may request information from the user regarding whether the user could perceive a depth plane switch. Optionally, the display system may utilize machine learning models to learn the user's behavior. The display system may further receive aggregated information from multitudes of users to learn preferences. For example, the precedence network may be updated based on the learning. The display system may periodically connect to an outside system for updates to the precedence network. In this way, the display system may cause depth plane switches 1912 while increasing likelihood that the user is not able to perceive the switches.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings. The specification and drawings are, accordingly, to be regarded in an illustrative rather than restrictive sense.

The various aspects, implementations, or features of the described embodiments may be used separately or in any combination. Various aspects of the described embodiments may be implemented by software, hardware or a combination of hardware and software. The described embodiments may also be embodied as computer readable code on a computer readable medium for controlling manufacturing operations or as computer readable code on a computer readable medium for controlling a manufacturing line. The computer readable medium is any data storage device that may store data, which may thereafter be read by a computer system. Examples of the computer readable medium include read-only memory, random-access memory, CD-ROMs, HDDs, DVDs, magnetic tape, and optical data storage devices. The computer readable medium may also be distributed over network-coupled computer systems so that the computer readable code is stored and executed in a distributed fashion.

Thus, each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include computers (e.g., servers) programmed with specific computer instructions or special purpose computers, special purpose circuitry, and so forth. A code module may be compiled and linked into an executable program, installed in a dynamic link library, or may be written in an interpreted programming language. In some embodiments, particular operations and methods may be performed by circuitry that is specific to a given function.

Further, certain embodiments of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. In some embodiments, the non-transitory computer-readable medium may be part of one or more of the local processing and data module (140), the remote processing module (150), and remote data repository (160). The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner. Tasks or events may be added to or removed from the disclosed example embodiments. Moreover, the separation of various system components in the embodiments described herein is for illustrative purposes and should not be understood as requiring such separation in all embodiments. It will be understood that the described program components, methods, and systems may generally be integrated together in a single computer product or packaged into multiple computer products.

It will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. An augmented reality system comprising:
 a head-mounted display configured to present virtual content to a user;
 an imaging device facing away from the head-mounted display, the imaging device configured to capture images;
 at least one processor communicatively coupled to the head-mounted display and the imaging device, the at least one processor configured to:
 obtain a first image captured by the imaging device;
 in response to obtaining the first image:
  detect a first quantity of identifiable features in the first image;
 obtain a second image captured after the first image by the imaging device;
 in response to obtaining the second image:
  detect a second quantity of identifiable features in the second image, the second quantity being different from the first quantity;
  identify image blur caused by rapid movement of an eye of the user based on changes in the quantity of identifiable features by determining whether the second quantity of identifiable features is less than the first quantity of identifiable features by at least a predetermined threshold quantity of identifiable features; and
 in response to an identification of image blur caused by rapid movement of the eye of the user by determining that the second quantity of identifiable features is less than the first quantity of identifiable features by at least the predetermined threshold quantity of identifiable features, adjust one or more operating parameters of the head-mounted display associated with a reduction in visual perceptibility.

2. The augmented reality system of claim 1, wherein the imaging device faces the user, the imaging device configured to capture images of the eye of the user.

3. The augmented reality system of claim 2, wherein the identifiable features comprise identifiable eye features.

4. The augmented reality system of claim 3, wherein the eye features include one or more iris features.

5. The augmented reality system of claim 4, wherein the one or more iris features include a texture, a pattern, a key point in the iris, or a combination thereof.

6. The augmented reality system of claim 3, wherein the eye features include one or more scleral features.

7. The augmented reality system of claim 6, wherein the one or more scleral features include a blood vessel.

8. The augmented reality system of claim 1, wherein the first and second images comprise first and second consecutively-captured images.

* * * * *